(12) United States Patent
Lindsey et al.

(10) Patent No.: US 7,113,489 B2
(45) Date of Patent: Sep. 26, 2006

(54) METROPOLITAN AREA NETWORK SWITCHING SYSTEM AND METHOD OF OPERATION THEREOF

(75) Inventors: Lonnie Lindsey, Torrance, CA (US); Allen Panahi, Sierra Madre, CA (US); Tomasz P. Jannson, Torrance, CA (US)

(73) Assignee: Physical Optics Corporation, Torrance, CA (US)

( * ) Notice: Subject to any disclaimer, the term of this patent is extended or adjusted under 35 U.S.C. 154(b) by 876 days.

(21) Appl. No.: 09/777,970

(22) Filed: Feb. 6, 2001

(65) Prior Publication Data

US 2001/0010694 A1 Aug. 2, 2001

Related U.S. Application Data

(60) Division of application No. 08/861,438, filed on May 21, 1997, now Pat. No. 6,226,296, which is a continuation of application No. 08/784,351, filed on Jan. 16, 1997, now abandoned.

(51) Int. Cl.
*H04B 1/56* (2006.01)
(52) U.S. Cl. ............... 370/276; 370/465; 370/535; 398/41.68
(58) Field of Classification Search ............... 398/3, 398/5, 7, 68, 83, 41.68; 370/294, 400, 465, 370/535, 536, 537, 538, 540, 542, 543, 544, 370/276
See application file for complete search history.

(56) References Cited

U.S. PATENT DOCUMENTS

| | | | | | |
|---|---|---|---|---|---|
| 5,272,555 | A | * | 12/1993 | Suzuki | 398/41 |
| 5,278,687 | A | * | 1/1994 | Jannson et al. | 398/79 |
| 5,408,350 | A | * | 4/1995 | Perrier et al. | 398/168 |
| 5,488,500 | A | * | 1/1996 | Glance | 398/85 |
| 5,493,432 | A | * | 2/1996 | Yoneda | 398/5 |
| 5,647,035 | A | * | 7/1997 | Cadeddu et al. | 385/24 |
| 5,923,449 | A | * | 7/1999 | Doerr et al. | 398/7 |
| 5,959,749 | A | * | 9/1999 | Danagher et al. | 398/83 |
| 6,208,441 | B1 | * | 3/2001 | Jones et al. | 398/87 |

* cited by examiner

Primary Examiner—Alpus H. Hsu
Assistant Examiner—Steven Blount
(74) Attorney, Agent, or Firm—Leonard Tachner

(57) ABSTRACT

Systems and methods for connecting and configuring a communication network are described. A network includes a first router; a tie-line having a plurality of full duplex dedicated router interconnects connected to said first router; a second router connected to said plurality of full duplex dedicated router interconnects; a first user connected to said first router with a first full duplex loop; and a second user connected to said second router with a second full duplex loop. The systems and methods provide advantages in that bursty control information can be multiplexed with time sensitive laminar data.

4 Claims, 38 Drawing Sheets

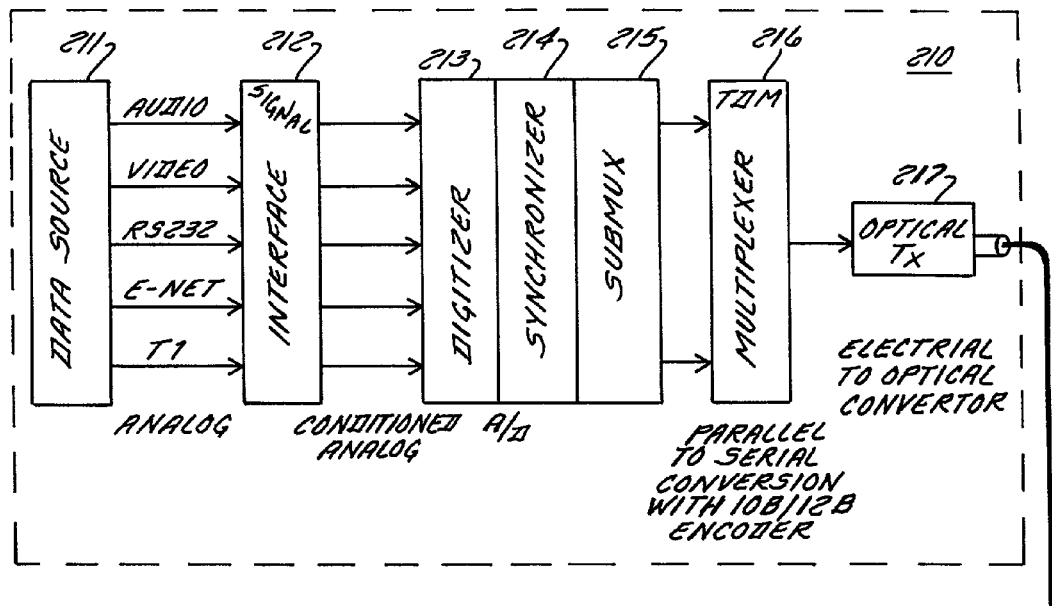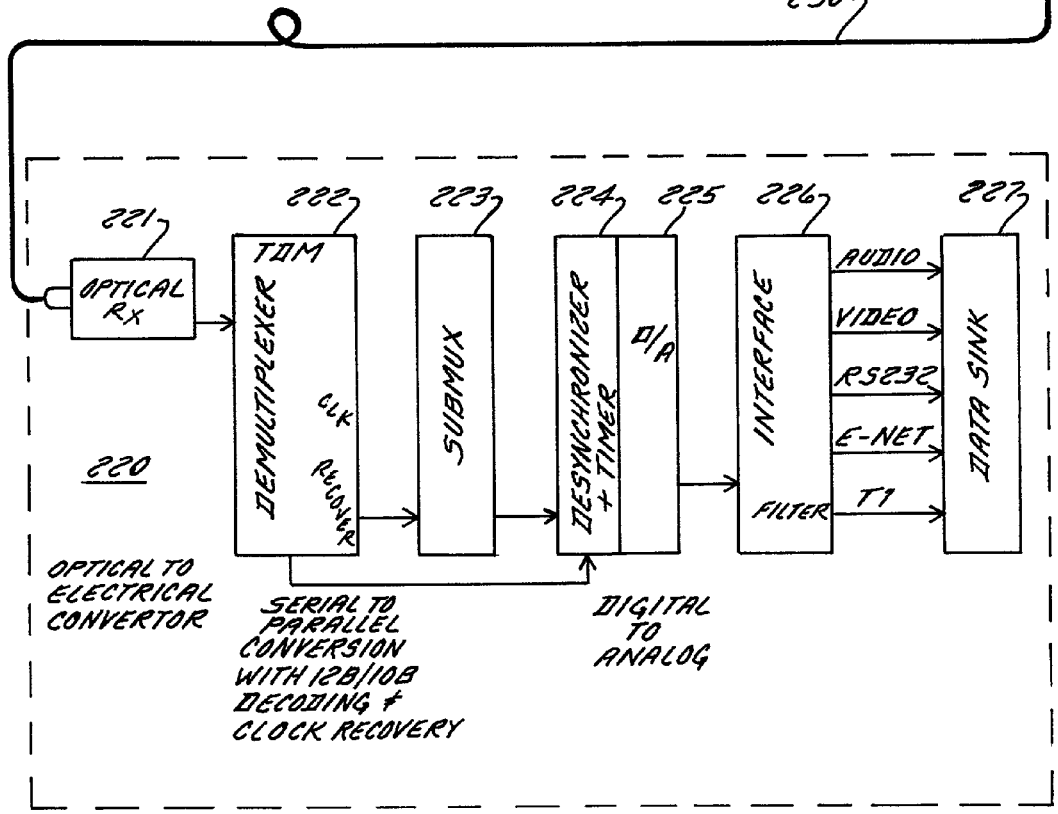
FIG. 2

| DATA TYPE | MULTIPLEXER/ DEMULTIPLEXER INTERFACE REQUIREMENT | DATA RATE | TIMING SENSITIVITY |
|---|---|---|---|
| AUDIO/ VIDEO MULTIMEDIA | • CONTINUOUS SAMPLING<br>• LOCK MATCHING<br>• MINIMUM BUFFERING | VARIABLE BIT RATE IN COMPRESSED MODE<br>UNCOMPRESSED DEPENDS ON RESOLUTION & SAMPLING RATE | AUDIO/ VIDEO SYNCHRON- IZATION |
| RS232/422/485 SERIAL ASYNCHRONOUS<br><br>SCSI PARALLEL<br><br>BUS SYNCHRONIZED | CAN USE BUFFER OR LOW SPEEDS<br><br>USE OVERSAMPLING<br><br><br>REQUIRE FIFO MEMORY | VARIBLE 10 kb/s → 10 Mb/s<br><br><br>VARIABLE → 40 MBYTE/s | BAUD RATES NEED MATCHING<br>— — — — —<br><br>INTERLOCKED HANDSHAKE BUS TIMING SYNCHRON- IZATION |
| T1 | NEED DIRECT MATCHING OF T1 CLK WITH MUX SYNCHRONIZATION OF MASTER CLOCK | 1.544 Mb/s | CLOCK/RECOVERY VERY STRICT TIMING REQUIRE CLK 1.544 ± 32 PPN |
| LAN  FDDI<br><br>LAN  10 BASE T<br><br>NET- WORK  100 BASE T | NEED CLOCK RECOVERY<br><br>MINIMUM BUFFER AND STRICT DATA RATE MATCHING USING SHALLOW FIFO | 100 Mb/s<br><br>10 Mb/s<br><br>100 Mb/s | CLOCK RECOVERY REQUIRED ELASTIC BUFFER<br>CLOCK RECOVERY NEEDED<br>CLOCK RECOVERY NEEDED |
| WIDE AREA<br>ST1/ST3<br><br>ATM | PRECISE NEED CLOCK RECOVERY AND DEFRAMING WITH TRANSFER TO PACKET | 51.84/155.5<br>OC1/OC3 Mb/s | TIME/STAMP REQUIREMENT<br><br>CLOCK CORRECTION |

_FIG. 13A_

| DELAY/LATENCY SENSITIVITY | TRAFFIC TYPE | DATA STREAM | APPLICATIONS | REMARKS TYPE OF CHANNEL |
|---|---|---|---|---|
| CONSTANT FOR MINIMUM JITTER | CONSTANT BIT RATE | LAMINAR BIT STREAM | MULTIMEDIA TELECONFERENCING VIDEO CONFERENCING SECURITY | ISOCHRONOUS |
| JITTER REQUIREMENT (NOT VERY TIGHT) | VARIABLE BIT RATE | | COMPUTER TO COMPUTER / PERIPHERAL COMPUTER TO MEMORY | ASYNCHRONOUS BUS SYNCHRONOUS |
| MINIMUM JITTER REQUIREMENT FOR VOICE MIN. ACCEPTABLE LATENCY ~150 ms | CONSTANT BIT RATE | | TELEPHONY WIDE AREA | SYNCHRONOUS |
| MAX. ELASTICITY FUNCTION OF NETWORK/TOKEN ROTATING TIMES | BURSTY ASYNCHRONOUS PACKETIZED | | OPTICAL NETWORK IN BACKBONES | BURSTY PACKETIZED |
| COLLISION DOMAIN LIMITED | ASYNCHRONOUS | | LAN | ASYNCHRONOUS |
| COLLISION DOMAIN LIMITED | ASYNCHRONOUS | | LAN | ASYNCHRONOUS |
| VARIABLE LATENCY DEPENDING ON TRAFFIC MIN. LATENCY AND JITTER REQUIREMENT FOR VOICE/TELEPHONE AND MULTIMEDIA TRAFFIC | VBR: VARIABLE BIT RATE CBR: CONSTANT BIT RATE ABR: AVAILABLE BIT RATE ASYNCRONOUS TRANSFER MODE ASYNCHRONOUS | | WIDE AREA NETWORK | CAN MAP ATM CELLS TO FDDI PACKETS AND THE TRANSFER SYNCHRONOUSLY |

*FIG. 13B*

METROPOLITAN AREA NETWORK SWITCHING SYSTEM AND METHOD OF OPERATION THEREOF

This application is a divisional of U.S. patent application Ser. No. 08/861,438, filed May 21, 1997, now U.S. Pat. No. 6,226,296, which is a continuation of U.S. patent application Ser. No. 08/784,351, filed Jan. 16, 1997 now abandoned.

BACKGROUND OF THE INVENTION

1. Field of the Invention

The present invention relates generally to the field of routing switcher networks. More particularly, the present invention relates to metropolitan area networks. Specifically, a preferred embodiment of the present invention relates to a network where at least two routing switchers are connected together with a tie-line composed of a plurality of full duplex dedicated router interconnects. This configuration results in a contention free environment as long as the number of users along a given tie-line at a given moment does not exceed the number of dedicated routing switcher interconnects that compose that tie-line. The present invention thus relates to a metropolitan area network of the type that can be termed almost contention free (i.e., nearly latency free).

2. Discussion of the Related Art

Within this application two publications are referenced by superscripts composed of arabic numerals within brackets. Full citations for both of these publications may be found at the end of the specification immediately preceding the claims. The disclosures of both of these publications in their entireties are hereby expressly incorporated by reference into the present application for the purposes of indicating the background of the present invention and illustrating the state of the art.

Historically, it was known in the prior art to connect routing switchers together in networks.[1] Such networks are referred to as local area networks (LANs), metropolitan area networks (MANs), or wide area networks (WANs), depending on their geographic extent. WANs generally extend over distances greater than approximately 150 Km. MANs generally extend over distances of from approximately 2 Km to approximately 150 Km. LANs generally extend over distances less than approximately 2 Km.

As is known to those skilled in the art, routing switchers can be connected together with tie-lines in order to assemble a network. Prior art routing switchers sometimes called routers, are well-known to those skilled in the art. A conventional routing switcher is typically a cross bar switch which can be represented as a matrix having a size of from (2)×(2) to (128)×(128), or even larger. For example, a (4)×(4) cross bar switch permits an incoming signal on one of four different incoming interconnects to be routed to any one of, any two of, any three of, or all of the four different outgoing interconnects. The cross bar feature permits the signal to be routed to any combination of the outgoing interconnects, without any mutual exclusivity. The interconnects themselves can be ordinary twisted pair, optical fiber, or even a free-space radio connection such as, for example, a microwave link.

As is also known to those of skill in the art, time sensitive data must be transferred with laminarity to avoid distortion. For example, if a real-time video signal is transferred intermittently, the received image will appear jittery. Similarly, real-time audio must be transferred with laminarity to avoid distortion. Thus, there is a need for real-time multi-media data to be transferred with laminarity. Such real-time data can be termed continuous data.

As is also known to those of skill in the art, the operation of networks that transfer continuous data has in the past been inefficient. This is because the control information that is used to configure and reconfigure the routing switchers is intermittent (i.e., bursty). In more detail, such control data only needs to be transferred when a configuration, or reconfiguration, of the network is required. Typically, such a requirement is instigated by one or more users who desire to establish a new connection through the network, for example, when a new user desires to join a multi-media conference that is already in progress.

Thus, a problem has been that the control information cannot be transmitted between routing switchers on interconnects that are being used by the network to transfer time sensitive user data such as, for example, the real-time video and/or real-time audio that composes a multi-media conference. Where such time sensitive data must be transferred, asynchronous transfer mode (ATM) is of no use because the packetization that is inherent to the ATM technique disrupts the laminarity of the time sensitive data.

One unsatisfactory approach, in an attempt to solve the problems referred to above, involves providing a parallel control network between the routing switchers in a network. However, a major disadvantage of using such a parallel control network is all the attendant costs of the parallel control network (e.g., control tie-lines, control routers and control terminals) that must be incurred. Another disadvantage of using such a parallel control network is the users themselves cannot directly reconfigure the routing switchers unless every user site is provided with a parallel control terminal. Instead, the users must typically request that a reconfiguration be carried out by the parallel control network. Some parallel control networks even require a human operator to be telephoned and requested to manually input the reconfiguration information. This type of situation can lead to lengthy delays when an operator is not available, or is otherwise busy, at the time a user wants to affect a configuration or reconfiguration.

Another unsatisfactory approach involves dedicating some of the interconnects to control data duty. However, a disadvantage of dedicating some of the interconnects to control data duty is that a fraction of the interconnects are consequently unavailable for user data transfer. This can be a significant drawback when the number of users desiring to use a particular tie-line exceeds the number of interconnects available for user data transfer through that particular tie-line (i.e., contention). Another disadvantage of dedicating some of the interconnects to control data duty is that the control interconnects themselves are often idle. Control information is often not needed for long periods, particularly when the number of users is relatively constant. So dedicating interconnects to control data duty, particularly where a large fraction of the interconnects must be so dedicated, is a tremendous waste of bandwidth.

SUMMARY AND OBJECTS OF THE INVENTION

Therefore, there is a particular need for a system which can transfer continuous data (e.g., video and audio) with bursty data (e.g., Ethernet) and/or packetized data (e.g., asynchronous transfer mode (ATM)) through a routing switcher in the form of a single bit stream and without disrupting the laminarity of the continuous data.

Such a system provides a multi-format adaptive plesiochronous network (MAP). A plesiochronous network multiplexes multiple sources of isochronous data together such that two or more signals are generated at nominally the same digital rate and their significant instances occur at nominally the same time. Multi-format means multiprotocol. Adaptive means that the multiplexer can handle the different formats, or streams, of data.

Where at least two such systems are combined, they can be connected with topology adaptive tie-lines (TAT). Topology adaptive tie-lines can be reconfigured to be in accord with user demands. Thus, it is rendered possible to simultaneously satisfy the above-discussed requirements of time sensitive data laminarity, low cost, user actuated re-configuration, and high bandwidth utilization, which are, in the case of the prior art, mutually contradicting.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore nonlimiting, embodiments illustrated in the drawings accompanying and forming a part of this specification.

FIG. 2 illustrates a high level block diagram of a time division multiplexer connected to a time division demultiplexer with a fiber optic tie-line, representing an embodiment of the present invention;

FIGS. 13A and 13B illustrate a plurality of different protocols which can be used in conjunction with the present invention;

DESCRIPTION OF PREFERRED EMBODIMENTS

Figures 1, 9:
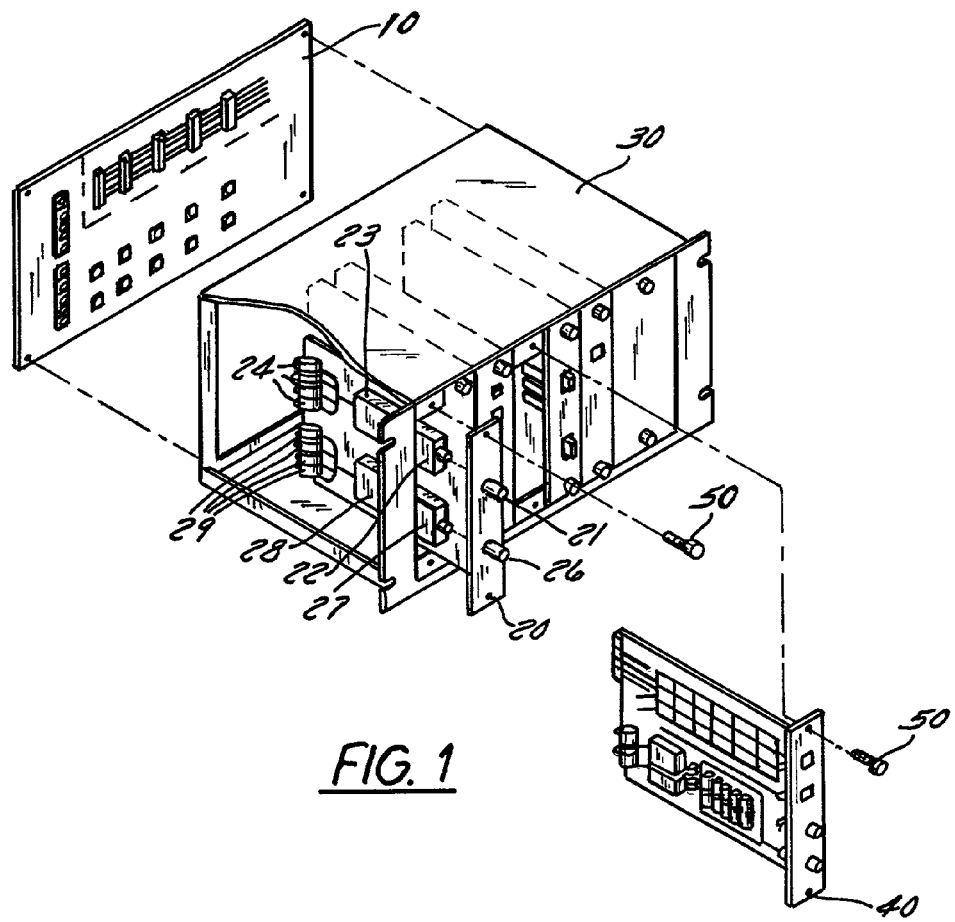
FIG. 1 illustrates a perspective view of a time division multiplexer-demultiplexer system, representing an embodiment of the present invention.
FIG. 9 illustrates a schematic block diagram of a time division multiplexer-demultiplexer system with a drop-add switch, representing an embodiment of the present invention.

The present invention and the various features and advantageous details thereof are explained more fully with reference to the nonlimiting embodiments that are illustrated in the accompanying drawings and detailed in the following description. It should be noted that the features illustrated in the drawings are not necessarily drawn to scale. Descriptions of well known components and processing techniques are omitted so as to not unnecessarily obscure the present invention in detail.

Time Division Multiplexer/Demultiplexer

Referring to FIG. 1, a rack mounted embodiment of the invention is depicted. An electrical backplane 10 provides data transmission power, ground and management control functions. A mux/demux card 20 is removably installed in a chassis 30. The mux/demux card 20 is electrically connected to the electrical backplane 10. The mux/demux card 20 includes an optical input 21 and an optical output 26. Tracing the input subcomponents, the optical input 21 is optically connected to an optical-electronic transducer 22. The optical-electronic transducer 22 is electrically connected to a time division demultiplexer 23, which in turn is electrically connected to a plurality of connectors 24. The plurality of connectors 24 are electrically connected to the electrical backplane 10. Tracing the output subcomponents backwards, the optical output 26 is optically connected to an optical-electronic transducer 27. The optical-electronic transducer 27 is electrically connected to a time division multiplexer 28, which in-turn is electrically connected to a plurality of electrical connectors 29. The plurality of electrical connectors 29 are electrically connected to the electrical backplane 10.

Still referring to FIG. 1, a data-channel card 40 is also removably installed in the chassis 30. The data channel card 40 is electrically connected to the electrical backplane 10 and thereby indirectly connected to the optical input 21 and the optical output 26. The function of the data-channel card 40 is to connect a specific user (not shown) to the optical input 21 and the optical output 26. Both the mux/demux card 20 and the data-channel card 40 are retained in chassis 30 by a bolt 50.

Referring now to FIG. 2, a time division multiplexer system 210 is connected to a time division demultiplexer system 220 with a fiber optic tie-line 230. The time division multiplexer system 210 includes a data source 211 that is generating continuous audio, continuous video, RS232, Ethernet and T1 data. The data source 211 is electrically connected to a signal interface 212 which can condition the data, for example, by filtering. The signal interface 212 is electrically connected to a digitizer 213 that performs an analog to digital conversion of the data types that are not already digital (e.g., the continuous audio and video). The digitizer 213 is electrically connected to a synchronizer 214 that performs timing functions and buffering. More specifically, synchronizer 214 can include a first-in-first-out memory buffer. The synchronizer 214 is electrically connected to a submux apparatus 215. The submux apparatus 215 is electrically connected to a time division multiplexer 216. After parallel to serial conversion with 10 B/12 B encoding, the data is electrically transmitted to an electrical-to-optical convertor 217. (The 10 B/12 B encoding maps ten input bits to twelve output bits. During decoding, the twelve output bits are then decoded to the original ten input bits. This encoding/decoding operation is performed in order to assist synchronization and clock recovery by preventing long strings of 0's and 1's.) The electrical-to-optical convertor 217 is optically connected to the optical fiber tie-line 230. Tie-line 230 can be many miles long so the invention is applicable to wide area networks as well as metropolitan area networks and local area networks.

Still referring to FIG. 2, the time division demultiplexer system 220 is connected to tie-line 230 via an optical-to-electrical convertor 221. The convertor 221 is electrically connected to a time division demultiplexer 222 wherein serial to parallel conversion with 12B/10B decoding and clock recovery takes place. (The clock recovery is an important part of the invention and particular embodiments of the clock recovery process will be described in more detail below.) The resulting parallel data is electrically conveyed to a subdemultiplexer 223. The subdemultiplexer 223 is electrically connected to a desynchronizer and timing apparatus 224. Apparatus 224 can include a FIFO and a computing device, such as, for example, a state machine. Apparatus 224 is electrically connected to a digital to analog convertor 225 which converts the data that is to be used in analog form (e.g., the continuous audio and video data). Convertor 225 is electrically connected to an interface 226 where the parallel data is reconstructed and conditioned and the analog components thereof can be filtered. Interface 226 is electrically connected to a data sink 227. Data sink 227 can be a terminal, a personal computer, a file server or even a router switcher that can be a conduit to one or more networks.

The functionality of the time division multiplexer 216 and the time division demultiplexer 222 can be provided by standard off-the-shelf components. Although almost any commercial mux-demux set can be used, an example of a specific pair of time division mux-demux chips that are suitable for use with the invention are the Am7968/Am7969 transparent asynchronous Xmitter-Receiver Interface (TAXI) integrated circuits which are readily commercially available from Advanced Micro Devices (AMD). The Am7968/Am7969 circuits can provide a data transfer rate of up to 175 Mbaud, serially in point-to-point communication with up to 12 bits. In a specific embodiment of the invention, the Am7968/Am7969 circuits are used to perform a 10 bit mux/demux with clock recovery and 10 B/12 B encoding/decoding. In this embodiment, a 12 MHz sampling of 10 bit data requires a data transfer rate of 120 Mbits/second (Mb/s) for transfer of all ten bits. With 10B/12B encoding the resulting serial baud rate that is required increases to 144 Mbaud.

If one of the bits to be transferred includes a T1 signal, the sampling rate should be phase locked to 1.544 MHz (the T1 standard rate). So instead of a 12 MHz sampling rate, a sampling rate that is a multiple of 1.544 MHz should be used. Choosing an oversampling rate of 8 results in a data transfer rate of 12.352 Mb/s for the T1 bit stream. Again using 10B/12B encoding, the resulting optical transfer rate that is required in this case increases to 148.2 Mbaud.

Another example of a specific pair of time division mux-demux chips that are suitable for use with the invention are the HDMP-1000 Tx/Rx Pair gigabit rate transmit receive chips which are readily commercially available from Hewlett Packard. The HDMP-1000 Tx/Rx circuits can provide a data transfer rate of up to 1400 Mbaud, serially in point-to-point communication with up to 21 bits.

Figure 3:
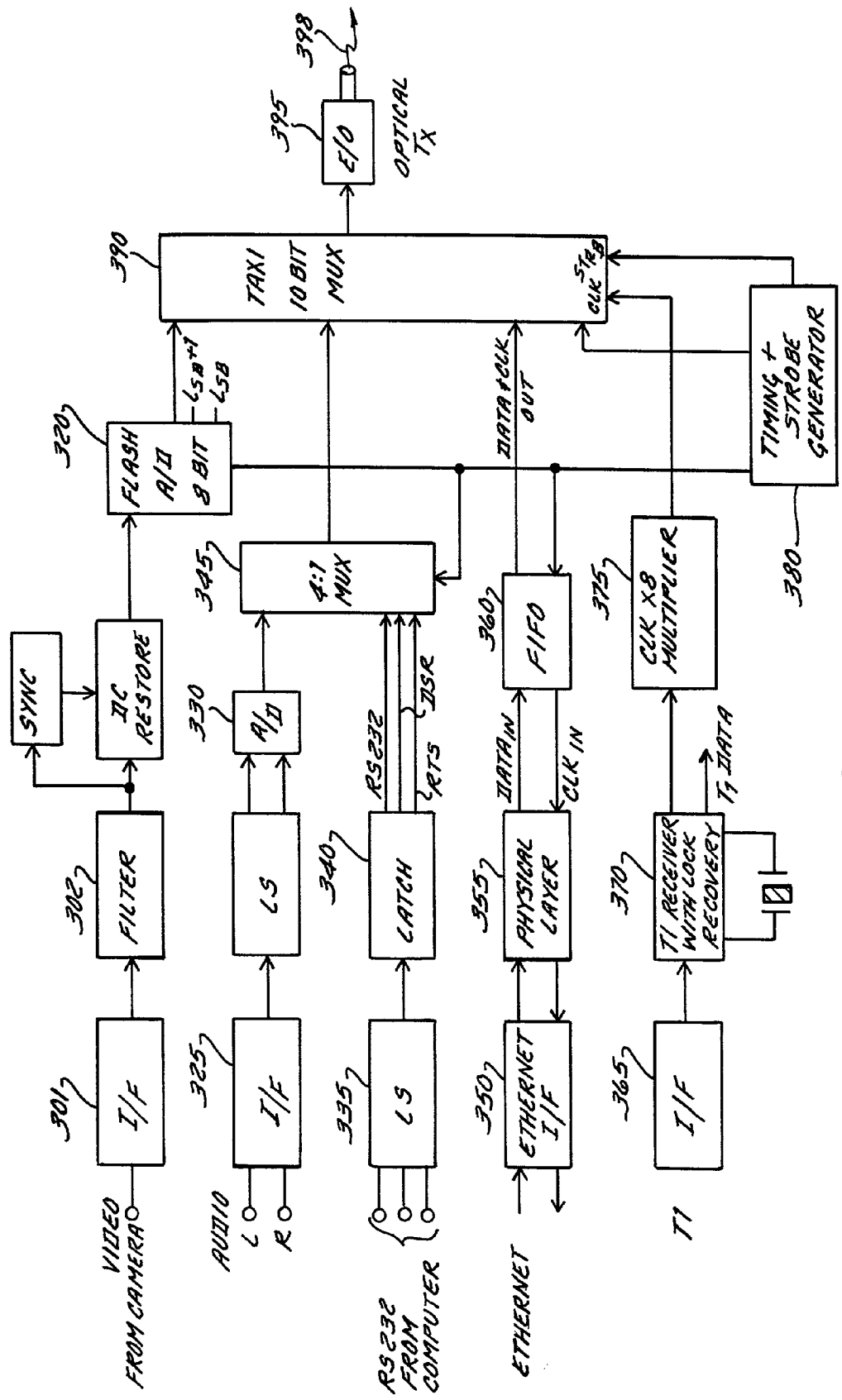
FIG. 3 illustrates a block diagram of a time division multiplexer, representing an embodiment of the present invention.

Referring now to FIG. 3, a time division multiplexer system includes an Am7968 time division multiplexer circuit 390 and is configured to transmit continuous video, continuous audio, RS232, Ethernet and T1 signals. A video signal enters the system at a video interface 301 that is electrically connected to a filter 302. The video is then routed to a flash analog-to-digital convertor 320 which connects the filter 302 to the time division multiplexer 390. The audio signal enters the system at an audio interface 325 that is connected to an analog-to-digital convertor 330. Convertor 330 is connected to a 4:1 parallel-to-serial convertor 345. RS232 data enters the system through an RS232 interface 335 that is connected to a latch 340. The latch 340 is connected to the 4:1 parallel-to-serial convertor 345 which combines the audio and RS232 signals and sends them to the multiplexer 390. The Ethernet signal enters the system at an Ethernet interface 350 that is connected to a physical layer structure 355 which sends a data signal and a clock signal to a first-in-first-out (FIFO) memory buffer 360 having an almost empty flag. The function of buffer 360 is to permit the build-up of 10 MHz data for transmission at 12 MHz. Buffer 360 is connected to multiplexer 390. The operation of the buffer 360 is how the bursty Ethernet data (which is very useful for network control functions) can be transferred on a single tie-line with the continuous audio and video without disrupting the laminarity of the continuous signals. The T1 signal enters the system at a T1 interface 365 that is connected to a T1 transceiver 370. The transceiver 370 is connected to the multiplexer 390 through a clock multiplier 375. A timing and strobe generator 380 is connected to convertor 320, to buffer 360 and to multiplexer 390. Timing and strobe generator 380 includes a timing control block. The multiplexer 390 is electrically connected to electrical-to-optical convertor 395. Electrical-to-optical convertor 395 is optically coupled to optical fiber 398.

Figure 4:
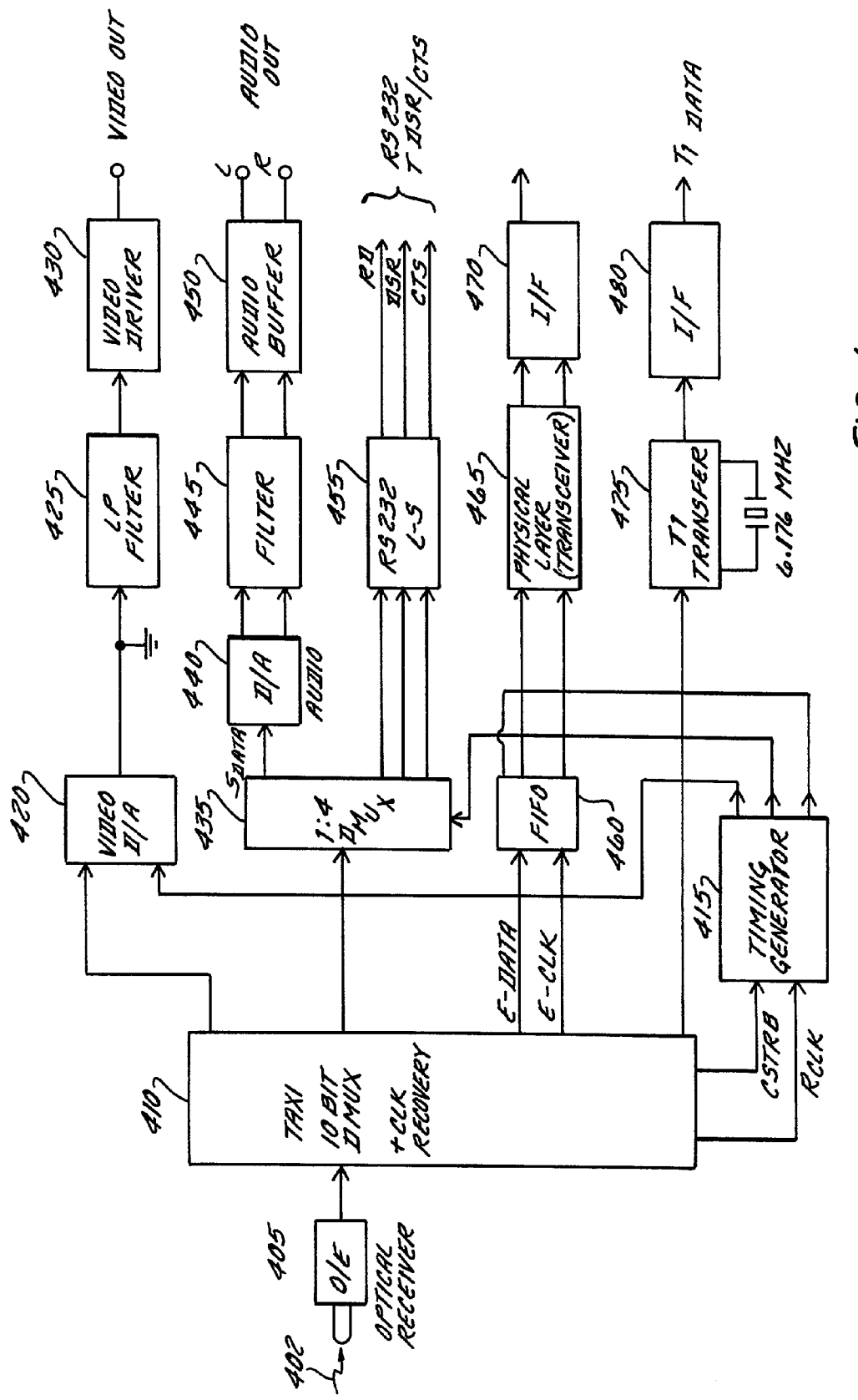
FIG. 4 illustrates a block diagram of a time division demultiplexer, representing an embodiment of the present invention.

Referring now to FIG. 4, a time division demultiplexer system includes an Am7969 demultiplexer circuit 410 and is configured to receive continuous video, continuous audio, RS232, Ethernet and T1 data. An optical data stream from an optical fiber 402 is received by an optical-to-electronic convertor 405. Convertor 405 is electrically connected to the demultiplexer 410. The video signals from demultiplexer 410 are routed to a video digital-to-analog convertor 420. The video signal then passes to an LP filter 425 and thence to a video driver 430 for output. The audio and RS232 signals are routed to a 1:4 serial-to-parallel convertor 435. The audio signals are then routed to a digital-to-audio convertor 440, thence to a filter 445 and finally to an audio buffer 450. The RS232 signals from the convertor 435 are output through an RS232 L-S 455. The Ethernet data and clock are routed from the demultiplexer 410 to a first-in-first-out memory buffer 460 having an almost empty flag. The Ethernet output from buffer 460 is routed to a physical layer 465, which is an Ethernet transceiver with clock recover. The physical layer 465 is responsible for interfacing with the Ethernet I/F section (low pass filter and transformer) and provides NRZ Ethernet data, packet indicator status line, and clock recovery (10 MHz clock) for Ethernet packetized data. The Ethernet output is then routed to an Ethernet interface 470. The T1 data is routed from the demultiplexer 410 to a T1 transceiver 475. Transceiver 475 is connected to a T1 interface 480.

Still referring to FIG. 4, the demultiplexer 410 is connected to a timing generator 415. The timing generator 415 is connected to convertor 420, to convertor 435 and to buffer 460. Generator 415 includes a state machine that permits the recovery of the Ethernet clock without disrupting the laminarity of the continuous video and audio data.

Figure 5:
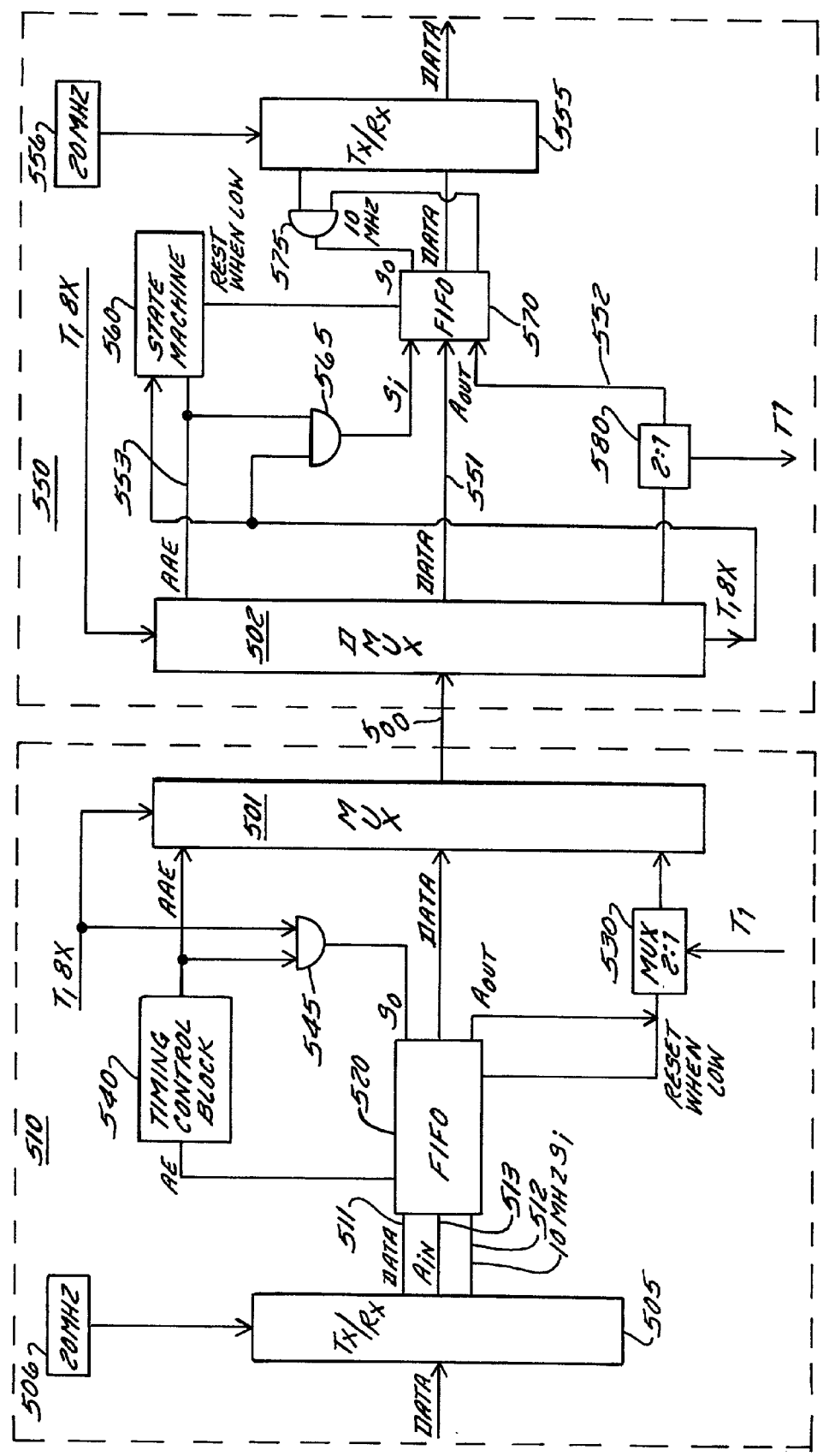
FIG. 5 illustrates a high level schematic view of a portion of a time division multiplexer-demultiplexer system, representing an embodiment of the present invention.

Referring now to FIG. 5, the operation of the FIFO memory buffers will be described in more detail. A signal transmitting system 510 is connected to a signal receiving system 550. The signal transmitting system 510 includes an Am7968 multiplexer 501. Data to be transmitted from system 510 to system 550 is first sent to a Tx/Rx 505. A 20 MHz clock 506 is provided to Tx/Rx 505. Bursty Ethernet data, when present, is conveyed along a line 511 to a first-in-first-out memory buffer 520 having an almost empty flag AE. The almost empty flag AE is ON when the buffer 520 contains no more than 8 bits. The AE signal is sent to a timing control block 540. The timing control block 540 is connected to the multiplexer 501 and to the So terminal of buffer 520 and functions through latch 545 to slow down the AE signal so that all of the data in buffer 520 is conveyed to multiplexer 501. The timing control block 540 is illustrated in greater detail in FIG. 6, discussed below.

Still referring to FIG. 5, the corresponding Ethernet clock (10 MHz $S_i$), is conveyed along a line 512 to the buffer 520. A signal $A_{in}$ is conveyed along a line 513 to the buffer 520. Signal $A_{in}$ is ON when Ethernet data is present. The outputs of interest from the buffer 520 are the Ethernet data and a signal $A_{out}$. The Ethernet data from the buffer 520 is conveyed directly to the multiplexer 501 In this particular embodiment, the $A_{out}$ signal is multiplexed with a T1 signal with a 2:1 multiplexer 530. However, the $A_{out}$ signal could be multiplexed onto any bit where space is available and need not be multiplexed at all if open bits on the multiplexer 501 are available.

Still referring to FIG. 5, the receiving system 550 includes an Am7969 demultiplexer 502. The demultiplexer 502 is connected to multiplexer 501 with a tie-line 500. Line 500 can be twisted pair, coaxial or optical fiber. The Ethernet data from the demultiplexer 502 is conveyed along a line 551 to a first-in-first-out memory buffer 570. The $A_{out}$ signal from the demultiplexer 502 is then further demultiplexed from the T1 signal by a 2:1 demultiplexer 580 and conveyed along a line 552 to buffer 570. The AAE signal (discussed below in conjunction with FIG. 6) from demultiplexer 502 is conveyed along a line 553 to a state machine 560. It is the state machine 560 that permits recovery of the Ethernet clock by the receiving system 550. State machine 560 is connected to a latch 565 and to the buffer 570. Buffer 570 is connected to a Tx/Rx 555 in part through a latch 575 which provides a 10 MHz clock. A 20 MHz clock 556 is connected to the Tx/Rx 555.

Figure 6A:
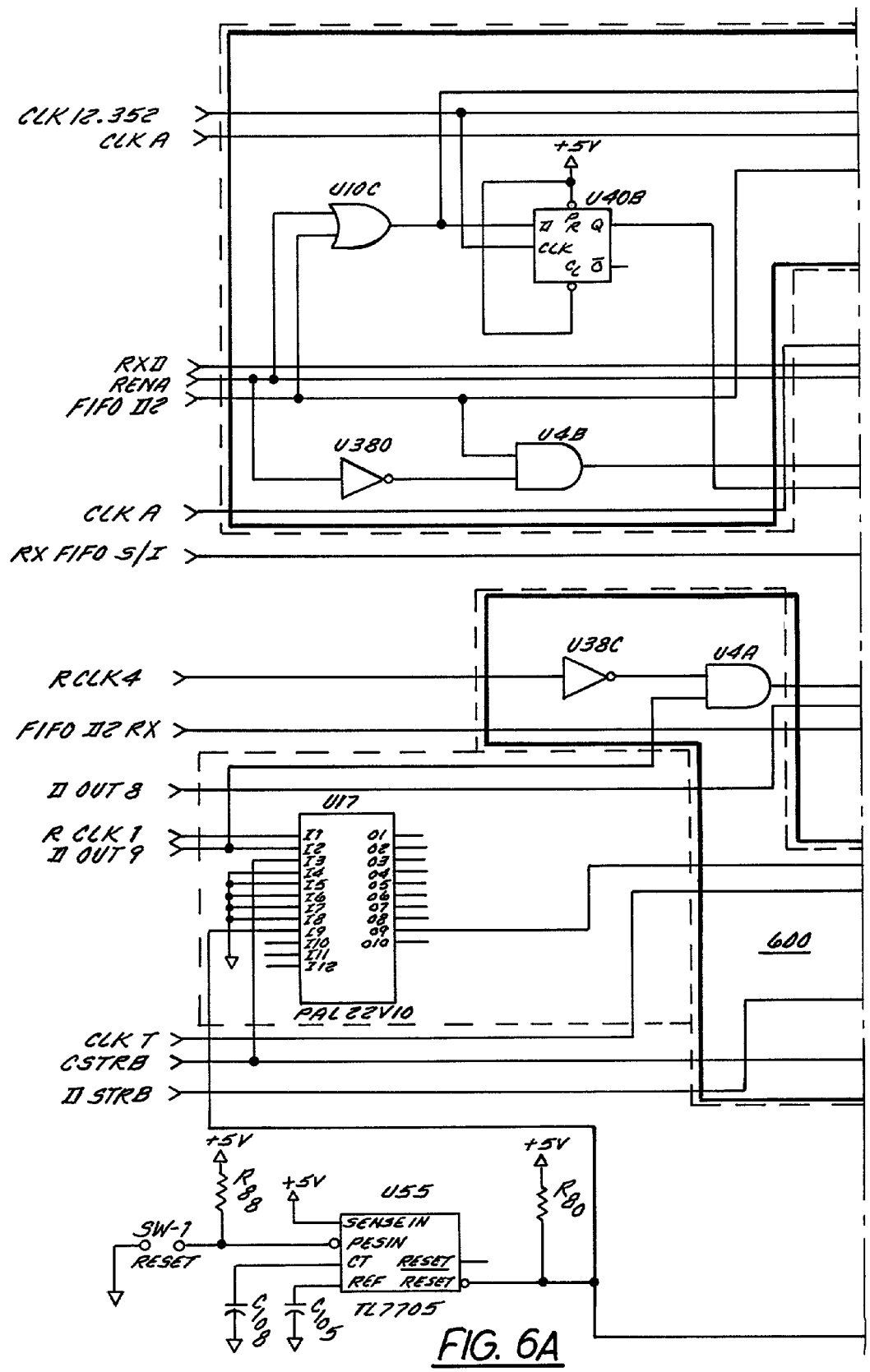
FIGS. 6A, 6B and 6C illustrates a schematic view of a timing block, representing an embodiment of the present invention.
Figure 6B:
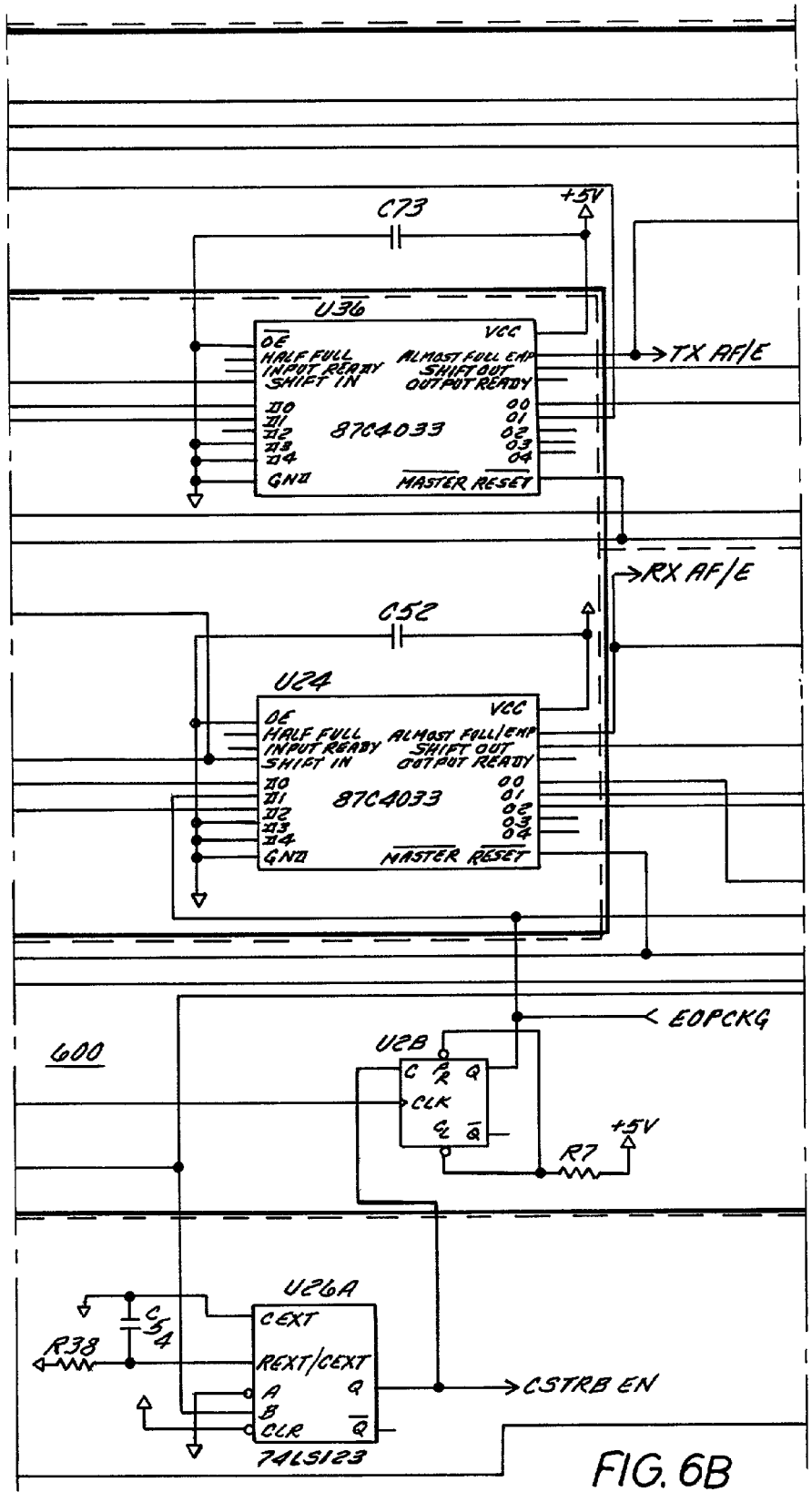
Figure 6C:
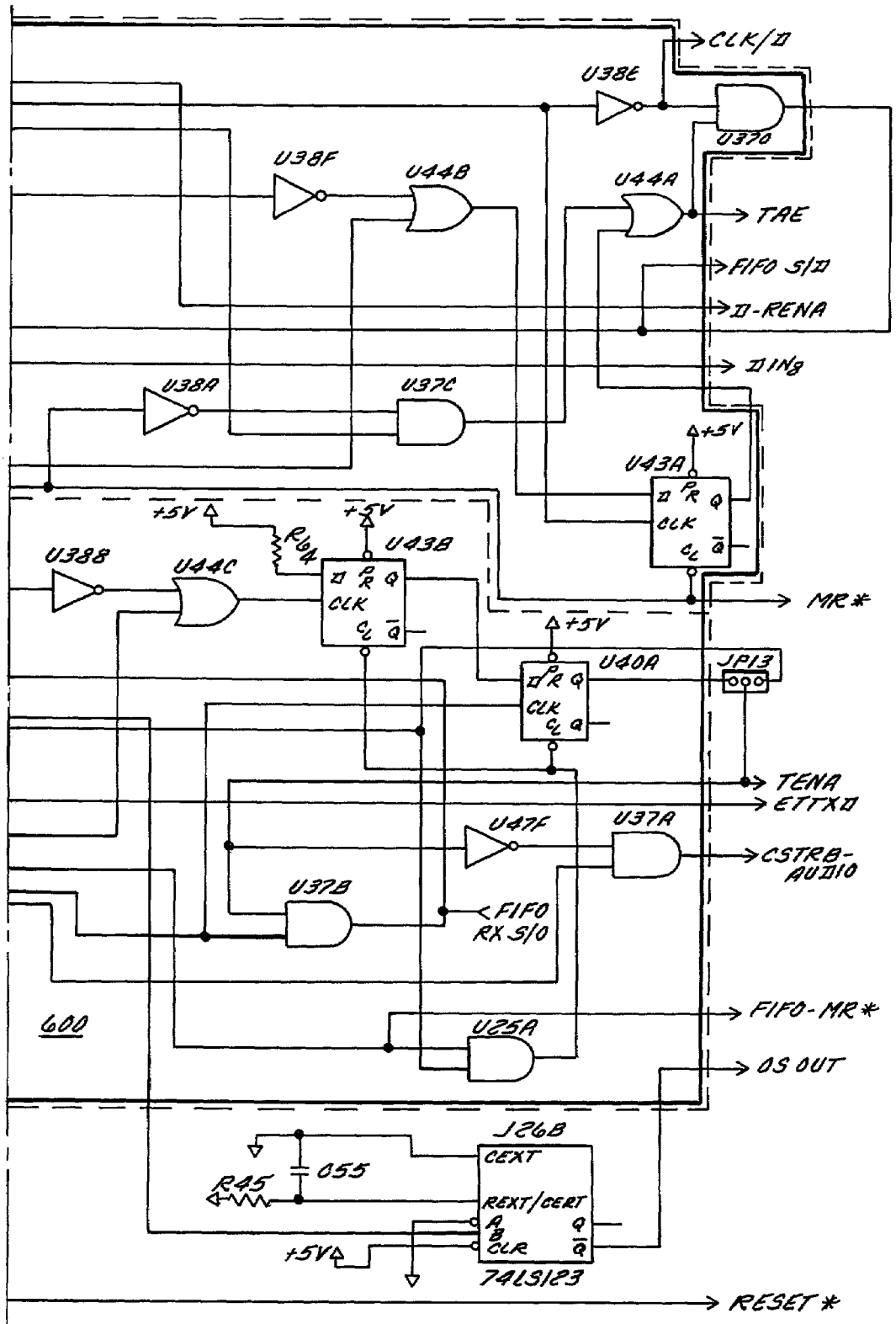

Referring now to FIGS. 6A, 6B and 6C, a timing control block 600 includes a number of interrelated circuits. As noted above, the timing block operates to slow down the almost empty flag from the FIFO memory buffer of the transmitting system so that all of the data from the FIFO memory buffer is conveyed to the multiplexer for transfer to the receiving system.

The timing block 600 is responsible for creating an altered almost empty flag, or AAE flag. As previously noted, the AE flag indicates that there are more than eight bits in the FIFO 520 (AE=1) or that there are less than eight bits remaining in the FIFO 520 (AE=0). The AE flag is used to match the 12 MHz clock of the multiplexer 501 with the 10 MHz clock of the Ethernet packet data. When AE=1 data is taken out of the FIFO 520, and when AE=0 no more data is taken out and the FIFO 520 is allowed to fill up with more than eight bits. The AE flag needs to be communicated to the receiver side so that a properly gated clock signal can be made available to the input of the FIFO 570 in the receiver section 550.

In order for the Ethernet data to be properly recovered in the receiver section 550, the AE signal needs to be further processed. By modifying the AE flag to an AAE flag, a state machine 710 (See FIGS. 7A–7B) can be designed to control the receiver FIFO 570. The state machine 710 can effectively identify the presence or absence of the Ethernet packet data and thus provide the FIFO reset signal and clock enable control circuit for the Ethernet transceiver section 555.

The AE flag is modified into the AAE flag as follows: When there are no packets (AE =0), the AAE flag is modified to comprise an alternating sequence of 0's and 1's. As soon as packets arrive, then the AAE flag is set equal to the AE flag. Initially, this means that the AAE flag (as well as the AE flag) will comprise a sequence of eight 0's as the initially empty FIFO 520 is being filled with packetized Ethernet data. When AAE=1, data is taken out of the FIFO 520 and is sent to the receiver 550. (The AAE and AE signals may appear as follows when packets are present: 01111100111101111101111101111 . . . and so on.) At the instant the signal $A_{in}$ becomes zero, then the AAE flag is again set equal to an alternating sequence of 0's and 1's.

FIGS. 6A, 6B and 6C illustrate illustrates in detail the circuitry used to implement the Ethernet/FIFO packet data processing and control functions as described above. All of the circuit components which are inside the heavy black box (i.e., the AND gates, the OR gates, the NOT gates, and the flip-flops, as opposed to the two 87C4033 chips, the two 74LS123 chips, the PAL22V10 chip, and the TL7705 chip) pertain to the logic required to control the transmission and reception of data in the FIFOs and the filling and emptying signalling of the FIFOs and the generation of the AAE signal. The PAL22V10 chip is used to implement a state machine 710, as now described.

Figure 7A:
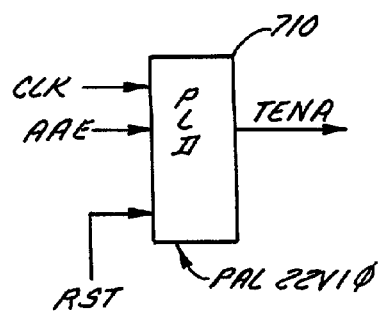
FIG. 7A illustrates a schematic view of a state machine, representing an embodiment of the present invention.

Referring now to FIG. 7A, the state machine 710 includes inputs CLK, AAE and RST. The state machine can be the PAL22V10 illustrated in FIG. 6 or other similar commercially available programmable chip. The output of the state machine is TENA. As noted above, the state machine permits recovery of the Ethernet clock by the receiving system.

Figure 7B:
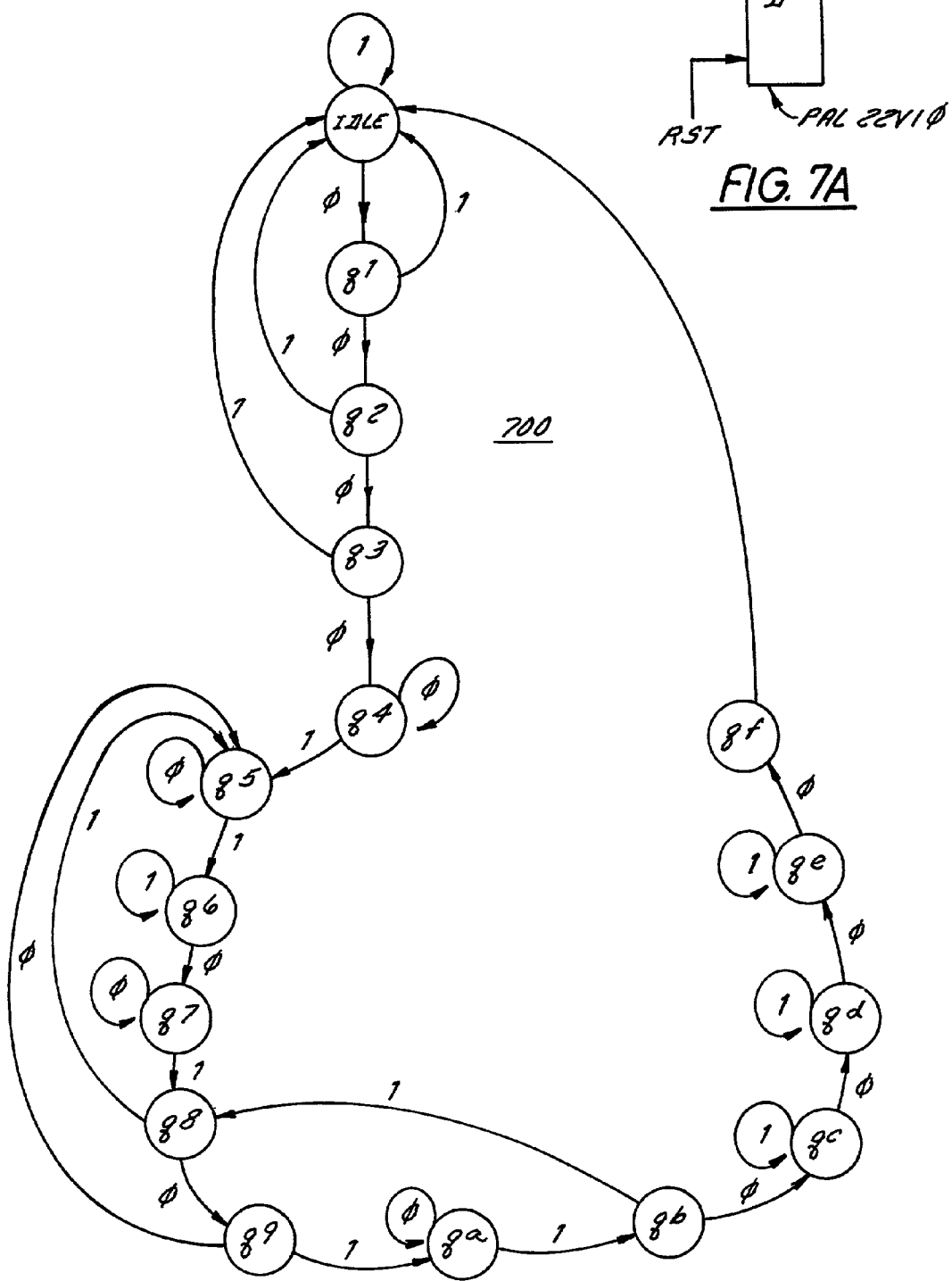
FIG. 7B illustrates a state diagram for the state machine shown in FIG. 7A.

Referring now to FIG. 7B, a state diagram for the state machine 710 after undergoing a specific programming is shown. The state diagram 700 is defined by PAL computer code which validates the AAE signal and generates a TENA signal. The validation scheme follows. If more than four consecutive 0's are detected then TENA is turned ON. Once TENA is turned ON, it is kept ON so long as $A_{in}$=1. When $A_{in}$ becomes zero (i.e., when the packet data ends), following a few "01" sequences it will turn off and reset the FIFO 570. The exact beginning and ending of the packet data is derived from $A_{in}$ which is multiplexed with T1 data on the transmit side 510 and received on the receiver side 550. This signal is passed through the FIFO as if it were data and is used to provide the presence and absence of packets $A_{out}$ indicator in the transceiver 555, which will process the packet information before passing it to the filter/transformer (Ethernet I/F) section.

The PAL computer code used to implement the state diagram 700 is given below:

```
INPUT
    1:CLK,
    2:AAE,
    9:RST, |reset
OUTPUT
    15:TENA,
    16:AEO,
    23:Q0, 22:Q1, 21:Q2, 20:Q3
HIGH: CLK,AAE,Q[3⁻0],TENA,AEO
REGISTERS: Q[3⁻0],TENA,AEO
TYPE: "22V10"
TITLE: "FILENAME: TXIAE2.PLD"
Value: "TXIAE2"
PART: "LATTICE 'GAL22V10A-15L"
TENA = RST' & ( ( TENA' & (Q[3⁻] == 4)) #
            (TENA & ! (Q[3⁻0] == 15))
       )
AEO = AAE
procedure: RST, Q[3⁻0]
    {States: IDLE=0,q1 = 1,q2 = 2,q3 = 3,q4 = 4,q5 = 5,q6 = 6,q7 = 7,
    q8 = 8,q9 = 9,
        qa = 10,qb = 11,qc = 12,qd = 13,qe = 14,qf = 15
IDLE.   AEO' ?      ->q1
                    ->IDLE
q1.     AEO' ?      ->q2
                    ->IDLE
q2.     AEO' ?      ->q3
                    ->IDLE
q3.     AEO' ?      ->q4
                    ->IDLE
q4.     AEO' ?      ->q4
        AEO ?       ->q5
q5.     AEO' ?      ->q5
        AEO?        ->q6
q6.     AEO' ?      ->q7
        AEO?        ->q6
q7.     AEO' ?      ->q7
        AEO?        ->q8
q8.     AEO' ?      ->q9
        AEO?        ->q5
q9.     AEO' ?      ->q5
        AEO?        ->qa
qa.     AEO' ?      ->qa
        AEO?        ->qb
qb.     AEO' ?      ->qc
        AEO?        ->q8
```

```
                -continued qc.     AEO' ?      ->qd
        AEO?        ->qc
qd.     AEO' ?      ->qe
        AEO?        ->qd
qe.     AEO' ?      ->qf
        AEO?        ->qe
qf.                 ->IDLE
}
VECTORS:
{ D (RST,CLK)c,AAE, "=>",AEO,(Q[3¯0])d,(TENA)c
T RST = 1; CLK = 0,1
C RST,AAE
T AAE = 0; CLK = 2(0,1)
T AAE = 1; CLK = 1(0,1)
T AAE = 0; CLK = 3(0,1)
T AAE = 1; CLK = 1(0,1)
| RENA TURNS ON
T AAE = 0; CLK = 8(0,1)
T AAE = 1; CLK = 3(0,1)
T AAE = 0; CLK = 1(0,1)
T AAE = 1; CLK = 4(0,1)
T AAE = 0; CLK = 1(0,1)
T AAE = 1; CLK = 5(0,1)
T AAE = 0; CLK = 1(0,1)
T AAE = 1; CLK = 3(0,1)
T AAE = 0; CLK = 2(0,1)
T AAE = 1; CLK = 1(0,1)
T AAE = 0; CLK = 1(0,1)
T AAE = 1; CLK = 1(0,1)
T AAE = 0; CLK = 1(0,1)
T AAE = 1; CLK = 1(0,1)
T AAE = 0; CLK = 1(0,1)
T AAE = 1; CLK = 1(0,1)
T AAE = 0; CLK = 1(0,1)
T AAE = 1; CLK = 2(0,1)
T AAE = 0; CLK = 1(0,1)
T AAE = 1; CLK = 1(0,1)
T AAE = 0; CLK = 3(0,1)
END}
```

It should therefore be apparent that the state machine 710 illustrated in FIG. 7A whose state diagram is illustrated in FIG. 7B is a sequence detector. The output of the state machine 710 (TENA) is turned on (TENA=1) if a minimum of four consecutive 0's are detected, and remains on so long as there is packet data. When the packet data ends, it will be on for a few additional clock cycles.

Figure 8A:
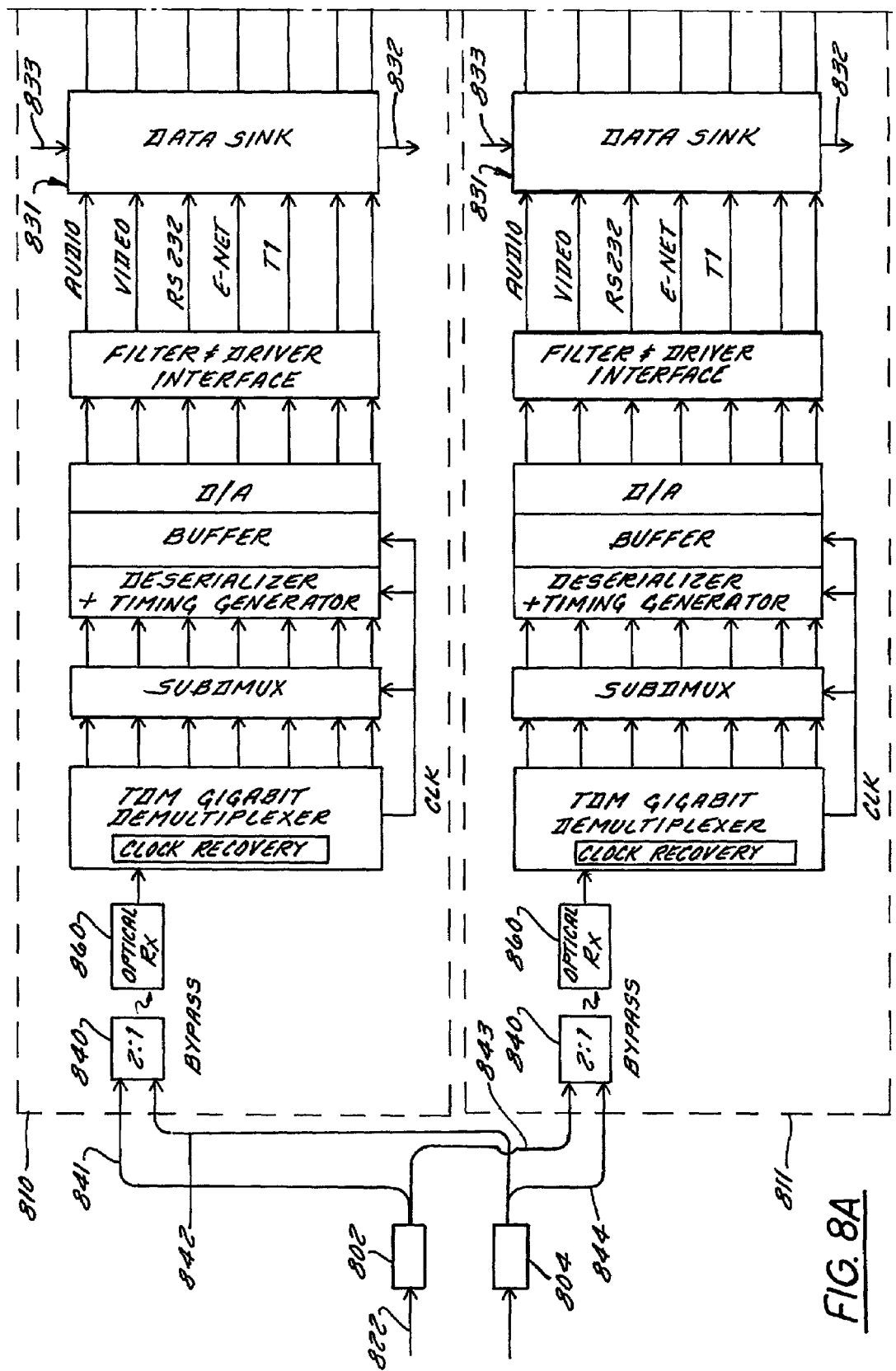
FIGS. 8A and 8B illustrate a high level block diagram of a time division multiplexer-demultiplexer system with a drop-add switch, a 2:1 bypass switch and wavelength division multiplexing, representing an embodiment of the present invention
Figure 8B:
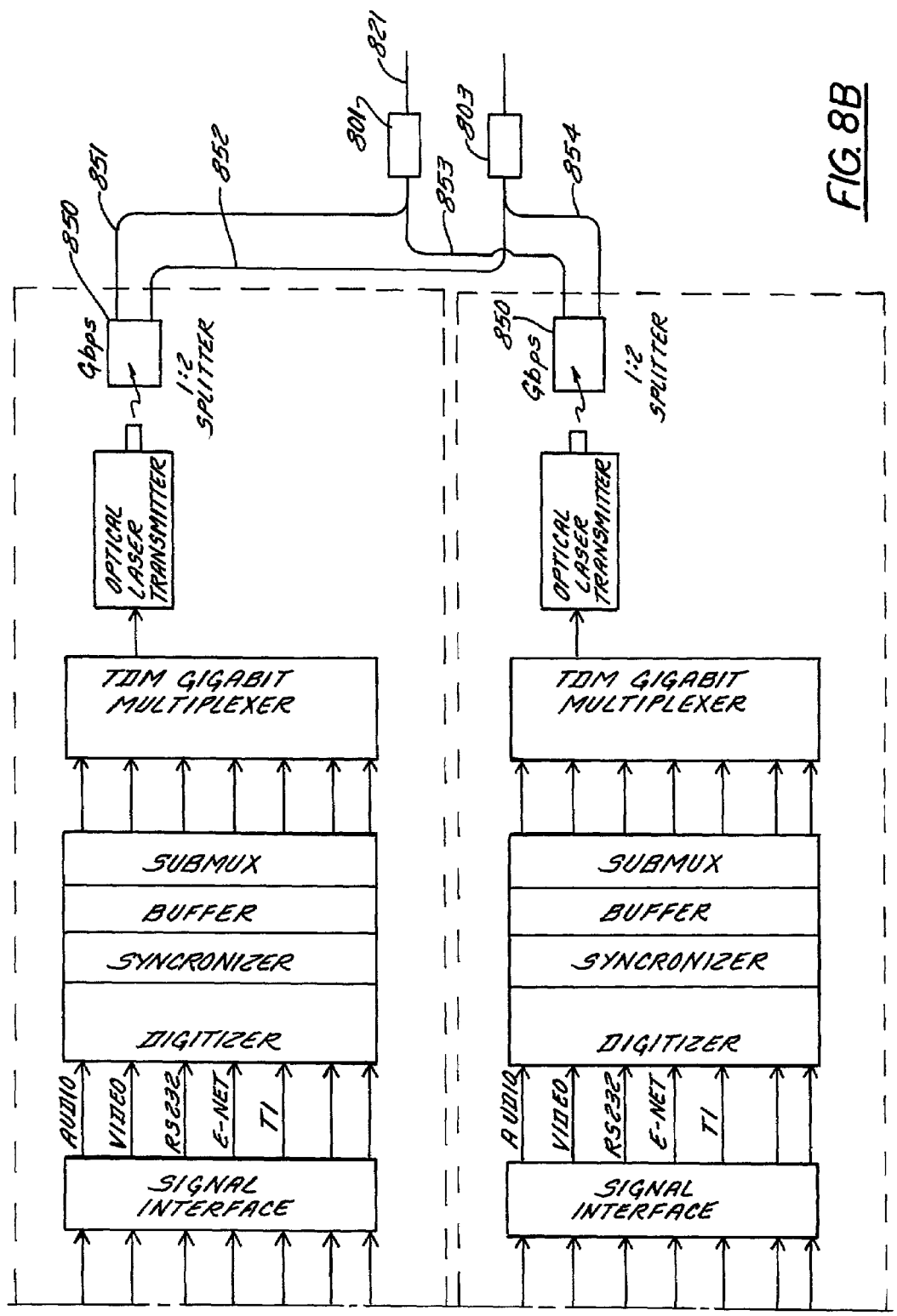

Referring now to FIGS. 8A and 8B, three different optional features of the invention will be described in a single embodiment. Please carefully note that FIGS. 8A and 8B shows two parallel systems 810 and 811. Note that each of the systems is provided with a drop/add switch 831. Note also that, each of the systems functions with redundant tie-lines through 2:1 bypass switches 840 and 1:2 splitters 850. Finally, the two systems are connected together with wavelength division multiplexers 801 and 803 and wavelength division demultiplexers 802 and 804. Thus, the three optional features are combined in one embodiment.

Still referring to FIG. 8, to reiterate, the apparatus that implements the three optional features includes: (1) drop/add switches 831, (2) 2:1 bypass switches 840 and 1:2 splitters 850, and (3) wavelength division multiplexers 801 and 803 and wavelength division demultiplexers 802 and 804. The functions provided by these three optional features are: (1) drop-add switching for networkability, (2) 2:1 bypass switching for tie-line redundancy, and (3) wavelength division multiplexing of parallel mux/demux systems for increased throughput (bandwidth). It should be noted that these three optional features are completely independent, and do not require the presence of one another, but are disclosed as part of a single embodiment for the sake of brevity and to emphasize that these optional features can cooperate together in providing a high capacity, robust and flexible network.

Still referring to FIGS. 8A and 8B, the drop-add switching feature will now be described. A first mux/demux system 810 can include a drop-add switch 831. The presence of drop-add switch 831 permits any combination of demultiplexed signals to be dropped to a user (not shown) through a drop line 832. In addition, the drop-add switch permits signals to be added through an add line 833, if unused bits on the bus are available. Although lines 832 and 833 are depicted as single lines, they can be any number of twisted pairs, coaxial cables or optical fibers. Together, lines 832 and 833 can compose a full duplex loop that connects the user to a network though the system 810. The function of the drop-add switch 831 can be provided by off-the-shelf routing switchers, such as, for example, cross-bar switches, that are readily commercially available.

Still referring to FIGS. 8A and 8B, the 2:1 bypass switching feature will now be described. The system 810 includes a 2:1 bypass switch 840. The 2:1 bypass switch 840 is optically connected to a first fiber 841 and a second fiber 842. If fiber 841 is designated as the primary fiber, then switch 840 will convey the signal carried by fiber 841 to optical-electrical converter 860. If fiber 841 is cut, or otherwise falls silent, switch 840 will actuate and thereafter couple fiber 842 to converter 860. Assuming that fibers 841 and 842 are carrying the same (broadcast) signal, receiving redundancy is thereby provided. System 810 also includes a 1:2 splitter 850 that is optically connected to optical fibers 851 and 852. Splitter 850 always functions in broadcast mode and fibers 851 and 852 both carry the same signal. Together, switch 840 and splitter 850 provide full duplex redundancy. In more detail, the 2:1 bypass switch 840 can be an emitter coupled logic multiplexer chip. This chip senses the lack of optical energy from a main receive line (e.g., fiber 841) and quickly switches the optical input to a standby receive line (e.g., fiber 842) using a programmable sensing interval of from approximately 1 nsec to approximately 10 nsec, a programmable time between sensings of from approximately 100 msec to approximately 1 minute and a programmable maximum tolerated silent time of from approximately 2 seconds to approximately 60 seconds. Suitable generic emitter coupled logic multiplexer chips are readily commercially available from Motorola, National Semiconductor and Phillips. The switching speeds that can be achieved using such off-the-shelf components is on the order of nanoseconds.

Still referring to FIGS. 8A and 8B, the wavelength division multiplexing (WDM) feature will now be described. It will be appreciated that the first mux/demux system 810 and a second mux/demux system 811 are combined in parallel. Systems 810 and 811 operate at different frequencies. (Because both of systems 810 and 811 include tie-line redundancy, the explanation of the WDM feature will be somewhat more involved than otherwise necessary.) Two wavelength division multiplexers 801 and 803 are each connected to both of the 1:2 splitters 850. The output signal from system 810 is carried by fibers 851 and 852. The output signal from system 811 is carried by fibers 853 and 854. Multiplexer 801 is fed by fibers 851 and 853. At the same time, multiplexer 803 is fed by fibers 852 and 854. In this way, the output signal from system 810 is multiplexed with the output signal from system 811, while tie-line redundancy is maintained at the transmitting end. At the receiving end, two wavelength division demultiplexers 802 and 804 are each connected to both of the 2:1 bypass switches 840. The input signal to system 810 is carried by fibers 841 and 842. The input signal to system 811 is carried by fibers 843 and 844. Demultiplexer 802 feeds an input signal to system 810 via fiber 841 and to system 811 via fiber 843. At the same time, demultiplexer 804 feeds an input signal to system 811 via fiber 844. In this way, the correct input signals are fed to the correct systems, while tie-line redundancy is maintained at the receiving end. Although almost any commercially available wavelength division multiplexerdemultiplexers can be used to multiply the data transfer capacity of the invention, a specific example that enables multiplexing and/or demultiplexing in the 1310 nm and 1550 nm regions are the dual-window IPITEX WDMs which are readily commercially available from IPITEK of Carlsbad, Calif.

Referring now to FIG. 9, a generic add/drop multiplexer-demultiplexer 910 (ADM) is shown. The ADM 910 is a generic representation of one of systems 810 and 811 of FIGS. 8A and 8B having drop-add switch 831. Referring again to FIG. 9, the ADM 910 is shown passing a first set of data 920 while dropping a second set of data 930 to a user (not shown) and adding a third set of data 940 from the user. In this way, the add/drop multiplexer 910 can replace one of the incoming streams with another. The second set of data 930 can be dropped, and the third set of data 940 can be added via a full duplex dedicated router interconnect 950. Thus, the "user" can be a network that includes a router. The interconnect 950 is connected both to a signal transmitting system and to a signal receiving subsystem of the add/drop multiplexer 910. The full duplex dedicated router interconnect can be a single full duplex wave division multiplexer optical fiber or a pair of simplex optical fibers. More generically, the second set of data 930 and the third set of data 940 can be exchanged over a connection that is equivalent to lines 832 and 833 of FIGS. 8A and 8B.

Figure 10:
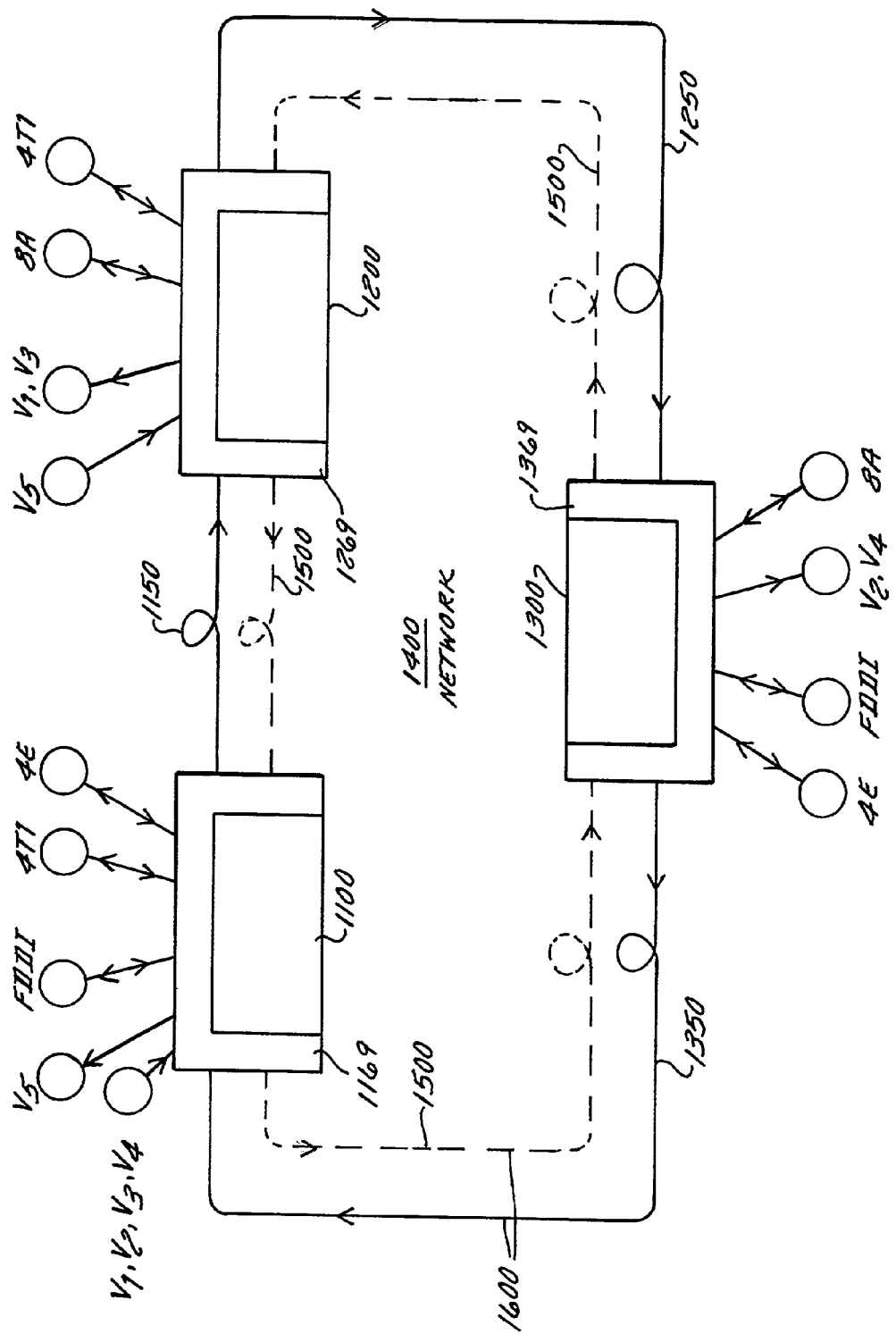
FIG. 10 illustrates a schematic block diagram of a network formed with a plurality of time division multiplexer-demultiplexer systems all of which have drop-add switches, representing an embodiment of the present invention.

Referring now to FIG. 10, the networkability that is enabled by the ADM concept will be appreciated. FIG. 10 shows a ring network 1400 formed through the interconnection of three of the ADMs 910 of FIG. 9. A first ADM 1100 is connected to a second ADM 1200 with a first tie-line 1150. The second ADM 1200 is connected to a third ADM 1300 with a second tie-line 1250. The third ADM 1300 is connected to the first ADM 1100 with a third tie-line 1350, thereby forming the ring network 1400. A second set of tie-lines 1500 is shown with a dashed line. In this way, a full duplex ring 1600 is formed.

Still referring to FIG. 10, a first network access port 1169 for simultaneous (1) full duplex messaging between a first user and a second user, and (2) management of the network 1400 including dynamic reallocation of network resources is a user accessible feature of the first ADM 1100. Dynamic reallocation of network resources enables time division multiplexing-demultiplexing of continuous and (bursty and/ or packetized data) so as to permit in-band/out-of-band control of one or more router switchers. In more detail, the control data may be considered to be in-band while is multiplexed with the continuous data. Once demultiplexed, the control data may be considered to be out of band and, of course, can be directed to the router switches and used to reallocate system resources, for example, to reconfigure the router switchers.

Still referring to FIG. 10, it is expected that Ethernet will be a commonly chosen subport medium for this purpose since many router switches and other networking hardware are controllable with the Ethernet protocol. In the depicted configuration, the first ADM 1100 is adding four video signals V1, V2, V3 and V4 while simultaneously dropping a single video signal V5. The first ADM 1100 is simultaneously transferring duplex data in the form of an FDDI signal, four T1 signals and 4 Ethernet signals. It will be appreciated that such an information intensive user may be a subnetwork, which may, or may not, include one or more router switchers. The second ADM 1200 and the third ADM 1300 are provided with a second network access port 1269 and a third network access port 1369, respectively. Any of the network access ports can include, or be reconfigured to include, one or more of an RS232 subport with a full hand shake interface, an RS422 subport, an RS485 subport, a SCSI subport and a full duplex 10 Mb/sec packetized data subport. The full hand shake interface for the RS232 subport allows various control signals, i.e., DTR (data terminal ready), DSR (data set ready), RTS (ready to send) and CTS (clear to send), to be transmitted across the RS232 interface. Of course, the network access ports can also include other structure for asynchronous data communication or packetized data communication.

Figure 11:
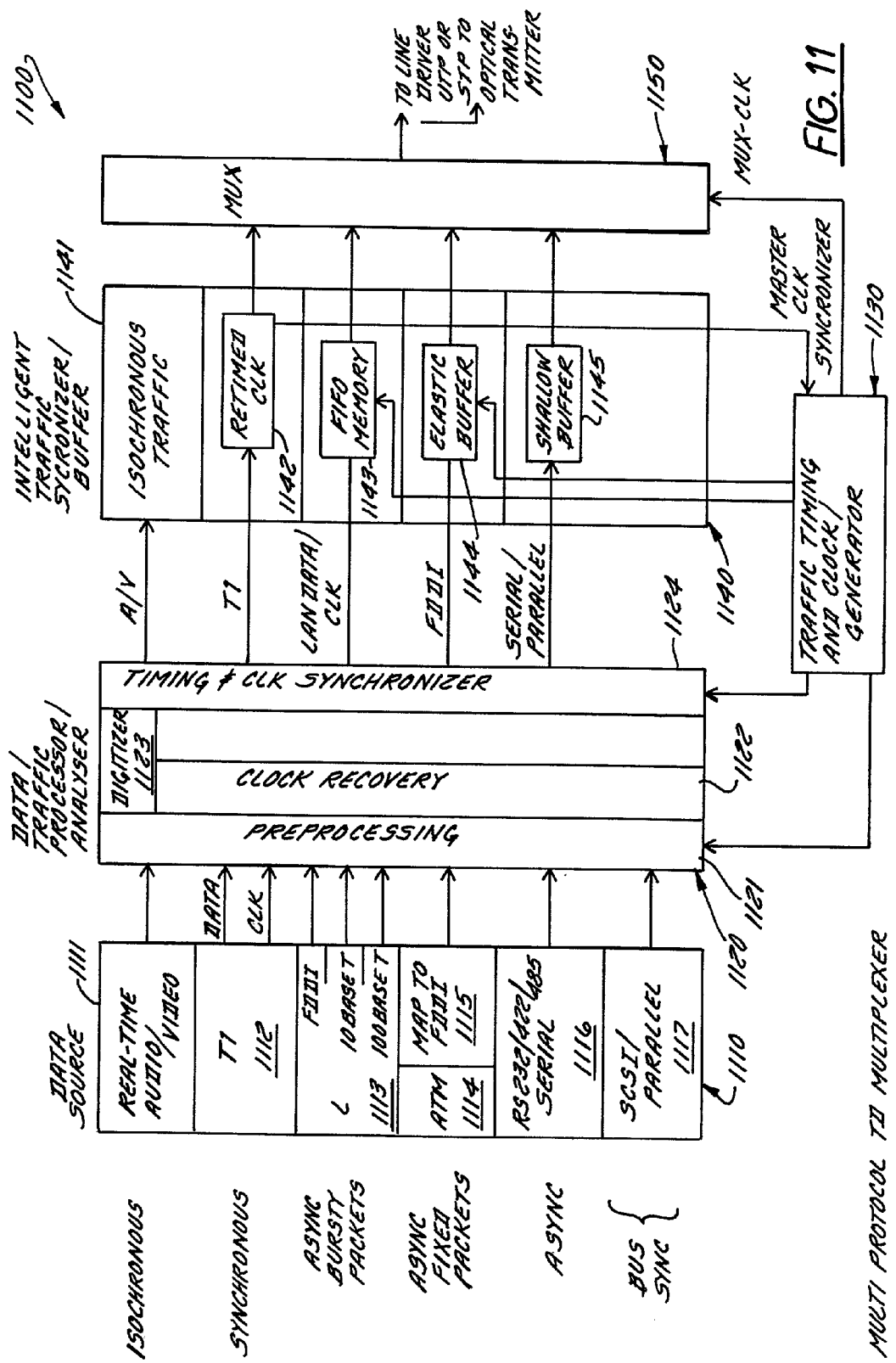
FIG. 11 illustrates a block diagram of another time division multiplexer, representing an embodiment of the present invention.
Figure 12:
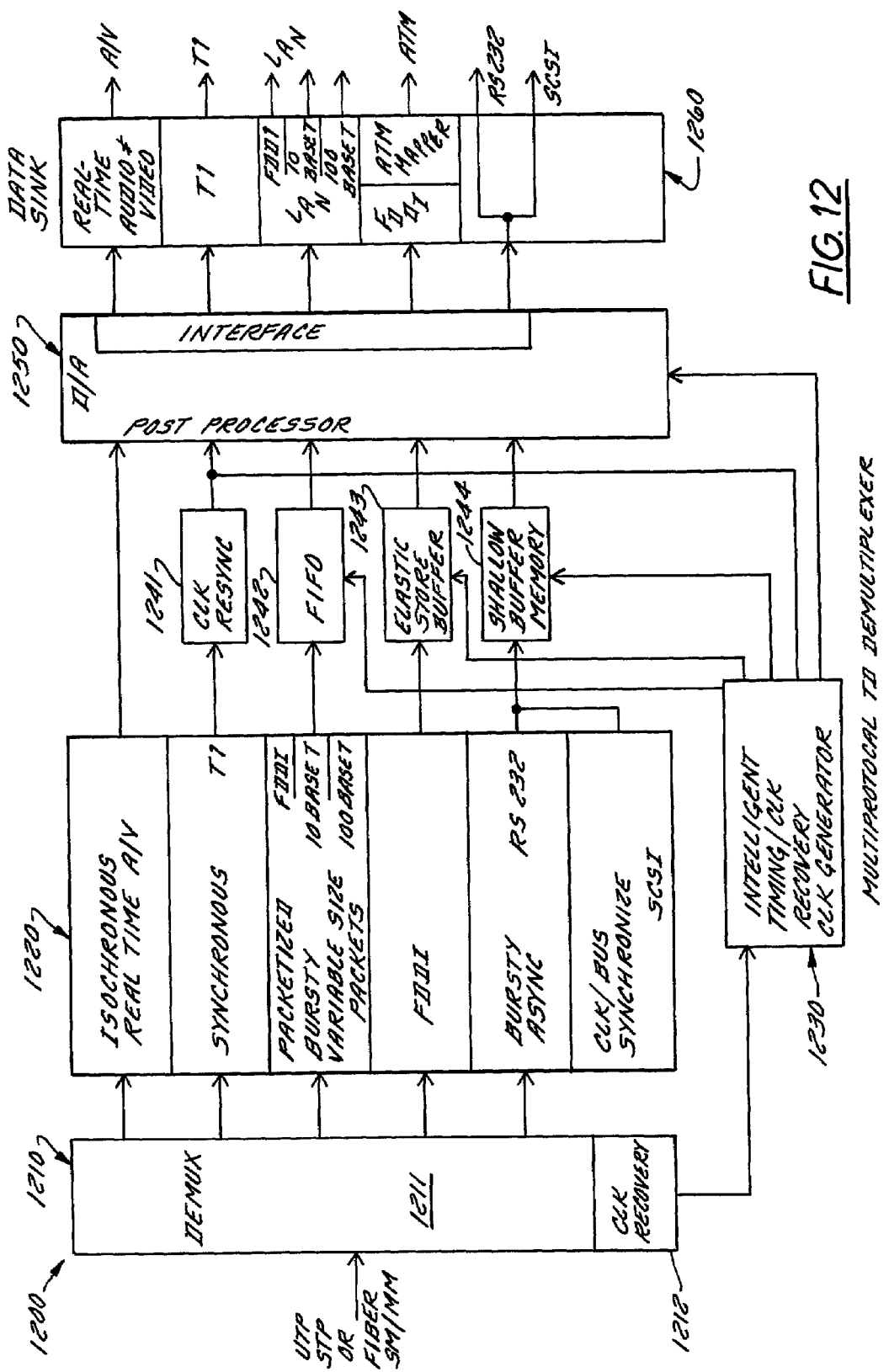
FIG. 12 illustrates a block diagram of another time division demultiplexer, representing an embodiment of the present invention.

Referring now to FIGS. 11–12, alternative embodiments of a time division multiplexer and a time division demultiplexer are illustrated.

Referring first to FIG. 11, the time division multiplexer 1100 comprises a data source block 1110, a data/traffic processor/analyzer block 1120, a traffic timing and clock output generator block 1130, a traffic synchronizer/buffer block 1140, and a multiplexer block 1150. The data source block 1110 generates (or receives) a plurality of different types of data.

The following data types are illustrative of the data types which could be handled by the multiplexer 1100 and the demultiplexer 1200.

First, the data source block 1110 generates real time audio and/or video data. This data originates as continuous analog data. However, this data is digitized and multiplexed, it becomes isochronous in format.

Second, the data source block 1110 generates a synchronous signal at block 1112. In the illustrated example the synchronous data is T1 data, which is a standard telephony signal with very stringent specific frequency and timing tolerances/requirements. The fact that the T1 signal has the most stringent frequency and timing requirements results in the T1 data clock being used as the master clock for the demultiplexer 1200, as described below.

Third, the data source block 1110 generates several different types of asynchronous data at a block 1113. The asynchronous data can include, for example, FDDI data, 10 Base T data and 100 Base T. The block 1113 could also generate other types of data which are asynchronous and which tend to be generated in the form of bursty packets. Also the different types of data which are generated at the block 1113 can have different clocking schemes (as is the case with FDDI data, 10 Base T Ethernet data and 100 Base T Ethernet data).

Fourth the data source block 1110 generates asynchronous data having fixed packet sizes, for example asynchronous transfer mode (ATM) data at block 1114. The ATM data packets are converted to FDDI data packets at block 1115.

Fifth, the data source block 1110 generates asynchronous data at block 1116. As illustrated, this data can be in the form of RS232, RS422, and RS485 serial data, or other types of asynchronous data which are generated by a computer. These data types are serial in nature and can have different bit rates and different protocols.

Finally, the data source 1110 generates parallel data having a clock which must be synchronized to a bus. For example, the data could be of the small computer system interface (SCSI) format, which is a standard interface throughout the computer industry used for handling memory transfers in conjunction with a parallel interface. The SCSI data must be synchronized to the bus for the interface used by the microprocessor of the computer.

The different data types generated by the data source 1110 are then processed and analyzed in the data/traffic processor/analyzer block 1120. Specifically, the block 1120 includes a pre-processing block 1121, a clock recovery block 1122, a digitizer block 1123, and a timing and clock synchronizer block 1124.

The pre-processing block 1121 filters the incoming data. With respect to the real time audio/video data, it is also necessary to use a digitizing block 1123 to digitize the data, since this data is originally in analog format.

With respect to all data types, clocking information is not provided by a separate clock signal but is rather embedded in the data. Therefore, it is necessary to run the different data types through the clock recovery block 1122 in order to extract the clocking information. This clocking information is necessary in order to synchronize the data traffic as performed by the traffic synchronizer/buffer block 1140.

The data/traffic processor/analyzer block also performs a multiplexing function. Thus, the number of data outputs from the data/traffic processor/analyzer block 1120 is reduced as compared to the number of data inputs to the data/traffic processor/analyzer block 1120.

The different data streams exiting the data/traffic processor/analyzer block 1120 have different data clocks. This clocking information is extracted by the processor block 1120, however, it is still necessary to re-synchronize and re-time this data so that their clocks are aligned with the clock of the multiplexer 1150. Notably, the re-timing is performed based on the clock of the T1 data, and thus the clock information from the T1 data stream is input into a traffic timing and clock control generator block 1130. The T1 data clock is therefore the master clock used to synchronize the different data streams. The T1 data clock is used as the master clock because the frequency and timing requirements of the T1 data are the most stringent.

The data streams are then fed to the multiplexer 1150. The multiplexer 1150 serializes the data, and encodes it using the 10B/12B encoding format as described above. The output of the multiplexer may be fed to an optical transmitter coupled to an optical fiber, coaxial cable, or a twisted pair cable, or other communication medium.

Referring now to FIG. 12, a time division demultiplexer 1200 which is used in conjunction with the time division multiplexer 1100 illustrated in FIG. 11 is depicted. The time division demultiplexer 1200 comprises a demultiplexer block 1210, a traffic desynchronizer block 1220, a post processor block 1250 and a data sync block 1260.

Functionally speaking, the time division demultiplexer 1200 is the mirror image of the time division multiplexer 1100. Thus, for whatever "processing" is done with respect to the individual data streams by the time division multiplexer 1100, there is a corresponding "deprocessing" performed by the time division demultiplexer 1200. For this reason, the discussion of the time division demultiplexer 1200 illustrated in FIG. 12 is less detailed then the discussion of the time division multiplexer 1100 illustrated in FIG. 11.

The demultiplexer 1210 receives the data streams transmitted over the communication medium from the multiplexer 1150. The demultiplexer 1210 deserializes the data and decodes from the 10B/12B encoding format. The deserialized data streams are then fed to the traffic desynchronizer block 1220 which restores the original timing of the data streams. This is done in conjunction with a clock recovery circuit 1212 which is coupled to an intelligent timing/clock recovery clock generator circuit 1230. Again, the clock generator circuit 1230 receives an input from the clock resynchronization circuit 1241, which is coupled to the T1 data stream.

The post processor block performs a further demultiplexing function. This demultiplexing function corresponds to the multiplexing function performed by the data/traffic processor/analyzer block 1120. The post processor block 1250 also performs digital to analog conversion for the real time audio/visual signal generated at the block 1111. The data streams from the post processor 1250 are then fed to the data sync 1260, where they are then ready for use.

Notably, a plurality of different types of memories are used for traffic synchronization/desynchronization. Thus, a FIFO 1242, an elastic store buffer 1243, and a shallow buffer are used in the illustrated embodiment of the multiplexer 1100.

The elastic buffer 1144 handles FDDI data, and is a very high speed memory which operates at 125 MHz (as compared to 10–12 MHz for the memory handling the 10 Base T data). The shallow buffer is used for bursty asynchronous data and is characterized in that data can be taken out in a different sequence than it is put in (unlike the FIFO memory buffer 1143).

A significant aspect of the time division multiplexer 1100 and demultiplexer 1200 is that store and forward operations are not utilized. Rather, the data is processed on the fly in real time. (The only reason for using memories such as the FIFO memory 1143, the elastic buffer 1144 and the shallow buffer 1145 is to match the different data rates that are used, e.g., the 10 bit data rate coming into the FIFO 1143 with the 12 bit data rate coming out of the FIFO memory 1143. These memories are not used for store and forward operations.

Using store and forward operations is disadvantageous because it increases the latency of the time division multiplexer 1100, and thereby precludes the transmission of the continuous data in laminar fashion. Further, latencies are disadvantageous because they can prevent two sides of a communication link from talking to each other (i.e., the communication link can "time out"). This is because one side of the communication link may expect to see an echo within a certain period of time, but when such an echo is not detected, the communication system times out.

Additionally, latencies are disadvantageous because when a bursty data file is transmitted in conjunction with continuous video data, motion artifacts start showing up in the video as a result of the high traffic data. Further, the video and the audio might lose synchronization with respect to each other. Thus, the present invention is highly advantageous because it is latency free with respect to all of the data streams which are transmitted.

The lack of latencies is achieved by the functional location of the memory buffers 1142–1145 just prior to the multiplexer 1150. Further, there are a plurality of data streams (of different protocols) which are transmitted in a latency free manner because of the plurality of buffers 1142–1145 in conjunction with the multiplexer 1150.

Advantageously, therefore, the time division multiplexer can be used in conjunction with a plurality of different types of protocols, and can transmit all of them in laminar fashion. FIGS. 13A and 13B illustrate some of the different protocols with which a multiplexer/demultiplexer combination can be used, and characteristics of the different protocols. The Ethernet control signals and continuous multi-media (i.e., at least audio and video) data can be combined on a single bit stream. Further, all the disclosed embodiments of the time division multiplexer/demultiplexer are useful in conjunction with the transfer of continuous data such as are used for the purpose of providing real-time video, or for the purpose of providing real-time audio, or the like.

Metropolitan Area Network

The following disclosure covers different network level embodiments of the invention. Each of the different embodiments uses different detail numbering to identify their component elements because these elements can be different.

Figure 14:
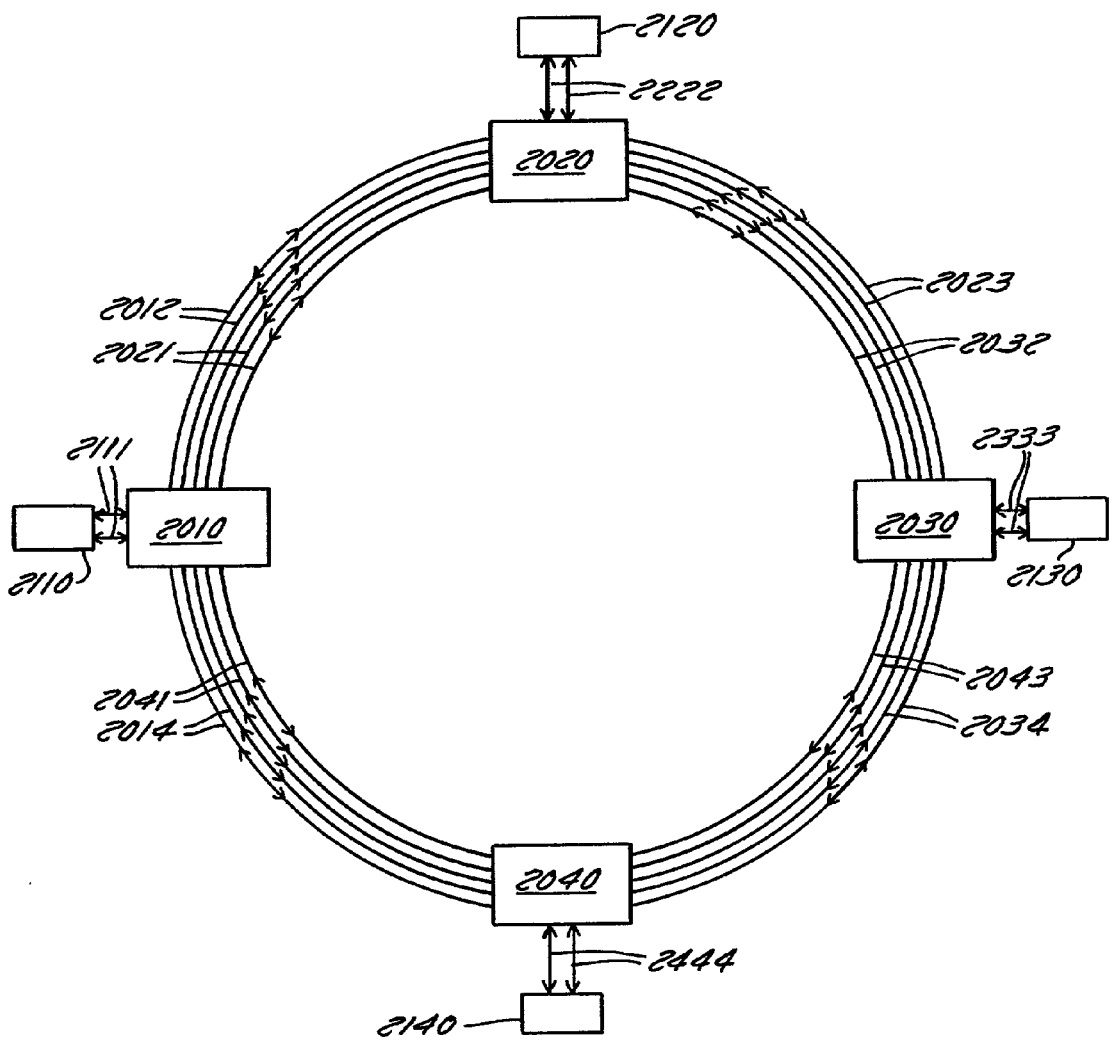
FIG. 14 illustrates a high level block diagram of a multi-media metropolitan area network, representing an embodiment of the present invention.

Referring to FIG. 14, an example of a quasi-contention-free point-to-point, full-duplex bidirectional MAN (Metropolitan Area Network) ring is shown, with M=4 number of routing switchers and N=4 number of nodes. The nodes can be individual users or local area networks composed of a number of users. The phrase "quasi-contention free" means that the network is contention-free as long as the number of active users is less than five.

Still referring to FIG. 14, a first routing switcher 2010 is connected to a second routing switcher 2020 with a tie-line having two full duplex dedicated router interconnects 2012 and 2021. A third routing switcher 2030 is connected to the second routing switcher 2020 with a tie-line having two full duplex dedicated router interconnects 2023 and 2032. A fourth routing switcher 2040 is connected to both the third routing switcher 2030 with a tie-line having two full duplex dedicated router interconnects 2034 and 2043 and also to the first routing switcher 2010 with a tie-line having two full duplex dedicated router interconnects 2014 and 2041. These switchers can also be termed matrix routers.

In the embodiment depicted in FIG. 14, each of the tie-lines includes four multi-mode optical fibers that are operated in duplex. However, in alternative embodiments, the tie-lines could just as easily contain hundreds, or even thousands of optical fibers, of single mode or multi mode construction operated in simplex or duplex, in unidirectional or bidirectional, or any combination thereof.

Still referring to FIG. 14, a first node 2110 is connected to the first routing switcher 2010 with a first full duplex loop 2111. A second node 2120 is connected to the second routing switcher 2020 with a second full duplex loop 2222. Similarly, a third node 2130 is connected to the third routing switcher 2030 with a first full duplex loop 2333. Finally, a fourth node 2140 is connected to the fourth routing switch 2040 with a fourth full duplex loop 2444.

In the embodiment depicted in FIG. 14, each of the routing switchers is directly connected to a single node. However, in alternative embodiments, each routing switcher could just as easily be connected to tens or even hundreds, of nodes or individual users, or combinations thereof.

Reconfiguring Routing Modal States

Figure 15:
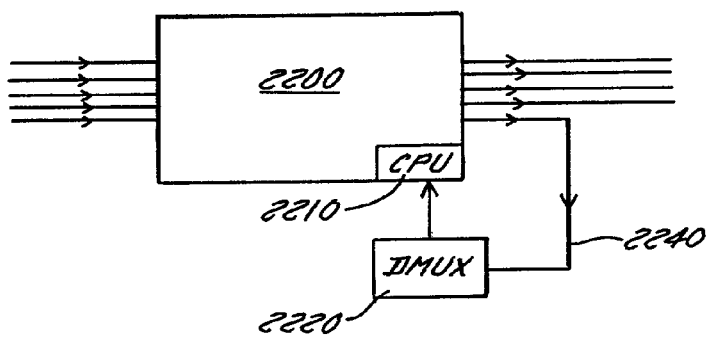
FIG. 15 illustrates a high level block diagram of a multi-media routing switcher being reconfigured, representing an embodiment of the present invention.

Referring now to FIG. 15, a router level embodiment of the invention is shown where different detail numerals are used to identify subcomponent elements because these elements can be different. Control information intended to change the modal state of a routing switcher 2200 is demultiplexed from a serialized signal being received by a user 2220 connected to the switcher 2200 through a full duplex loop. Only that portion of the full duplex loop that is necessary for conveying the control information is illustrated in FIG. 15 as a fractional element. This control information can then be transferred from the user 2220 to a central processing unit 2210 (CPU) that is part of, or at least controls the configuration of, the routing switcher 2200. The CPU 2210 can then function to alter the modal state of the routing switcher 2200. In this way, the router modal state is reconfigured with regard to data that is received by routing switcher 2200.

Figure 16:
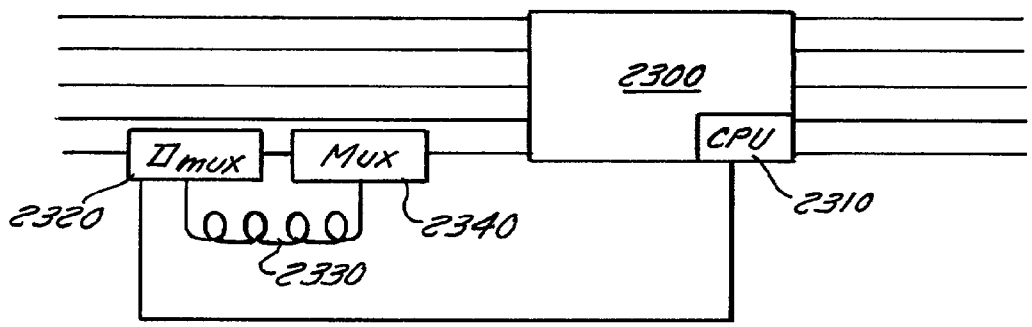
FIG. 16 illustrates a high level block diagram of a multi-media routing switcher being reconfigured on-the-fly, representing an embodiment of the present invention.

Referring now to FIG. 16, another router level embodiment of the invention is shown where different detail numbers are used to identify subcomponent elements because these elements can be different. In this embodiment, by incorporating a delay loop 2330, control information intended to change the modal state of a routing switcher 2300 can effect a reconfiguration of the routing switcher 2300 so as to transfer the serialized signal that incorporated the control information according to the reconfigured modal state. This type of reconfiguration can be termed on-the-fly.

Still referring to FIG. 16, a bit serial digital data stream bit stream is deserialized by a demultiplexer 2320. The pertinent control information is then routed to a CPU 2310, thereby reconfiguring the routing switcher 2300. Meanwhile, the deserialized data (which may or may not include a copy of the control information) passes through the delay loop 2330, thereby allowing time for the routing switcher 2300 to be reconfigured. The delayed deserialized data is then multiplexed by a multiplexer 2340 and conveyed to the routing switcher 2300, as reconfigured.

In general, and without reference to any particular figure, digital transparency within the inventive system can carry multiple/multi-protocol data streams (packetized) by traversing crossbar switches within the digital matrix router for point-to-point and point-to-multipoint and multipoint-to-multipoint connectivity. The transmission medium used for conveying data can include within each node: twisted wire pair; multimode optical fiber cabling, connectors and optical transmission/receiving systems; and single mode optical fiber cabling, connectors and optical transmission/receiving systems.

By structuring the network on high speed digital crossbar switching of bit serial data streams, the physical input and output can be selected port by port. This approach allows for very flexible systems architecture. Data streams can be delivered intact to each matrix router at up to the data rate for which that matrix router is capable of switching and performing clock recovery. Through the use of the previously described time division multiplexer/demultiplexer no latency of the laminarity of bit serial data stream is present due to no necessity to encode the separate streams, or store them in buffers to await header bits which would identify the packets and routing information.

EXAMPLES

Specific embodiments of routing switchers configured to define one or more modal states will now be further described by the following, nonlimiting prophetic examples which will serve to illustrate various features of significance. The examples are intended merely to facilitate an understanding of ways in which the present invention may be practiced and to further enable those of skill in the art to practice the present invention. Accordingly, the examples should not be construed as limiting the scope of the present invention.

Example 1

Figure 17:
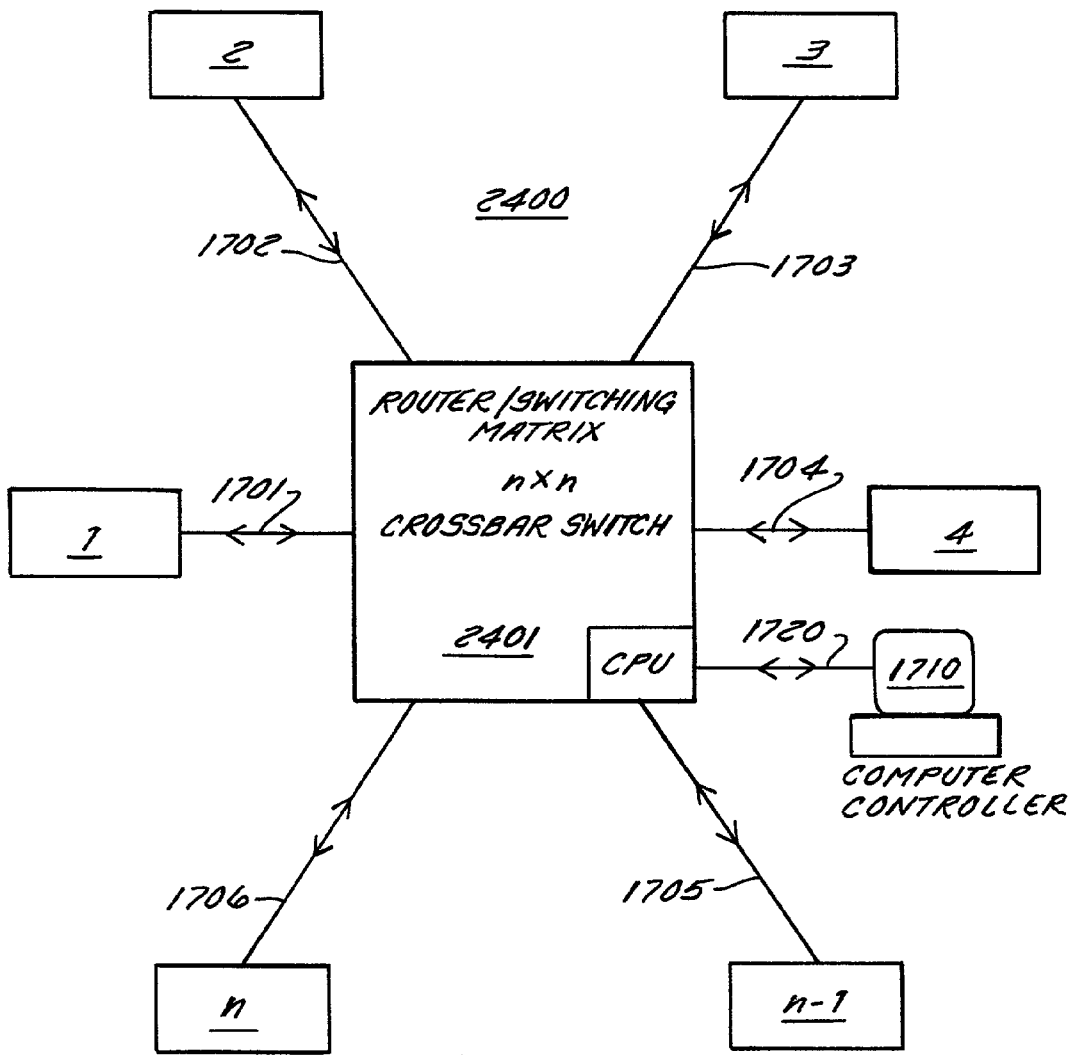
FIG. 17 illustrates a high level block diagram of a star mode router modal state, representing an embodiment of the present invention.

Referring now to FIG. 17, a first example uses different detail numerals to identify subcomponents which can be different. One of the most usefull router modal states is a star mode 2400. The star state depicted in FIG. 17 includes a router/switching matrix 2401 and is bidirectional and peer to peer. In more detail, (n) users in a star network require an nxn switch for noncontention. A first user 1 is connected to the matrix 2401 with a first bidirectional tie-line 1701. A second user 2 is connected to the matrix 2401 with a second bidirectional tie-line 1702. A third user 3 is connected to the matrix 2401 with a third bidirectional tie-line 1703. A fourth user 4 is connected to the matrix 2401 with a fourth bidirectional tie-line 1704. A fifth user N-1 is connected to the matrix 2401 with a fifth bidirectional tie-line 1705. A sixth user N is connected to the matrix 2401 with a sixth bidirectional tie-line 1706. Each of the bidirectional tie-lines 1701, 1702, 1703, 1704, 1705, and 1706 can be a full duplex loop.

The matrix 2401 includes an nxn crossbar switch and a central processing unit (CPU) for routing table setups. A computer control 1710 is connected to the CPU with a bidirectional tie-line 1720. Each of the n users can be equipped with full bandwidth uncompressed NTSC/PAL video, uncompressed digitized to 18 bits stereo audio pair, narrow band duplex data, 10 Base Ethernet and T1 AMI encoded data streams. Of course, the matrix 2401 can be one node in a MAN.

Example 2

Figure 18:
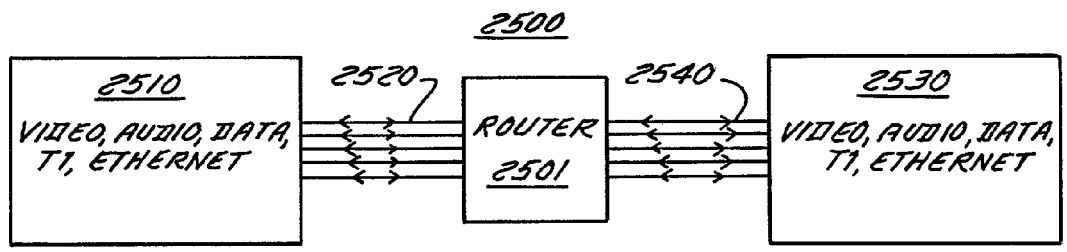
FIG. 18 illustrates a high level block diagram of a conferencing mode router modal state, representing an embodiment of the present invention.

Referring now to FIG. 18, a second example uses different detail numerals to identify subcomponents which can be different. Another router modal state is a conferencing mode 2500. The conferencing state depicted in FIG. 18 includes a router 2501 and is bidirectional. A first peer 2510 is connected to the router 2501 with a bidirectional tie-line 2520. A second peer 2530 is connected to the router 2501 with a bidirectional tie-line 2540. Both of the bidirectional tie-lines 2520 and 2540 can be multiconductor cables with simultaneously carrying video, audio, data, T1, and Ethernet. A first node 2610 is connected to the master node 2601 with a first unidirectional tie-line 2620. A second node 2630 is connected to the master node 2601 with a unidirectional tie-line 2640. A third node 2650 is connected to the master node 2601 with a unidirectional tie-line 2660. Each of the tie-lines 2620, 2640, and 2660 could be bidirectional simply by reconfiguring the router modal state. A conferencing state can be peer to peer, or peer to few peers, or few peers to many peers, or many peers to many peers. Of course the router 2501 can be one node in a MAN.

Example 3

Figure 19:
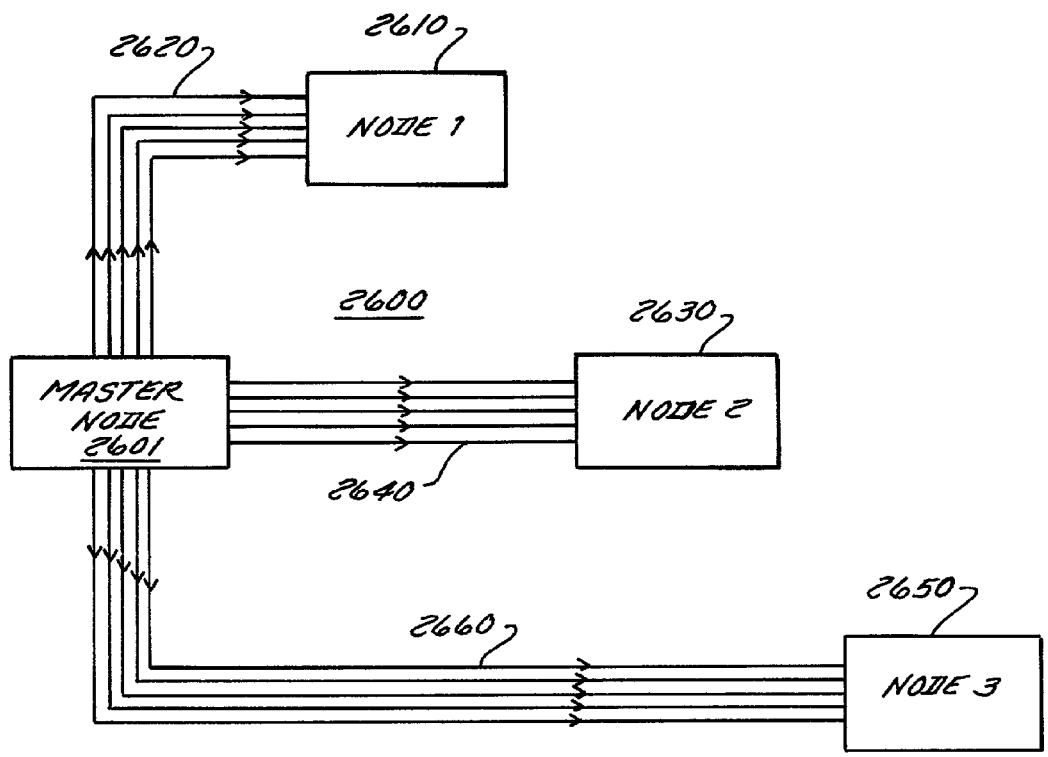
FIG. 19 illustrates a high level block diagram of a broadcast mode router modal state, representing an embodiment of the present invention.

Referring now to FIG. 19, a third example uses different detail numerals to identify subcomponents which can be different. Another router modal state is a broadcast mode 2600. The broadcast state depicted in FIG. 19 includes a master node 2601 and is unidirectional from one peer to many peers. Node 2610 is connected to the master node 2601 through a first tie-line 2620. The first tie-line 2620 is unidirectional. A second node 2630 is connected to the master node 2601 through a second tie-line 2640. The second tie-line 2640 is also unidirectional. A third node 2650 is connected to the master node 2601 through a third tie-line 2660. The third tie-line 2660 is also unidirectional. Of course, the master node 2601 can be a node in a MAN.

Example 4

Figure 20:
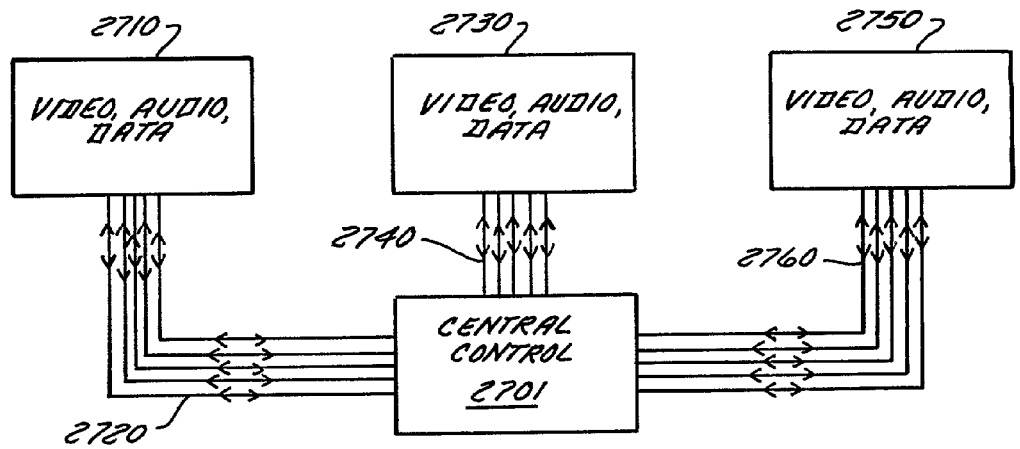
FIG. 20 illustrates a high level block diagram of a monitoring mode router modal state, representing an embodiment of the present invention.

Referring now to FIG. 20, a fourth example uses different detail numerals to identify subcomponents which can be different. Another modal state is a monitoring mode 2700. The monitoring state depicted in FIG. 20 includes a central control 2701 and is bidirectional from many peers to one peer. A first peer 2710 is connected to the central control 2701 with a bidirectional tie-line 2720. A second peer 2730 is connected to the central control 2701 with a bidirectional tie-line 2740. A third peer 2750 is connected to the central control 2701 with a bidirectional tie-line 2760. Each of the bidirectional tie-lines 2720, 2740, and 2760 can be a multiconductor cable for simultaneous transmission of video, audio, and data. Of course, the central control 2701 can be a node in a MAN.

Example 5

Figure 21:
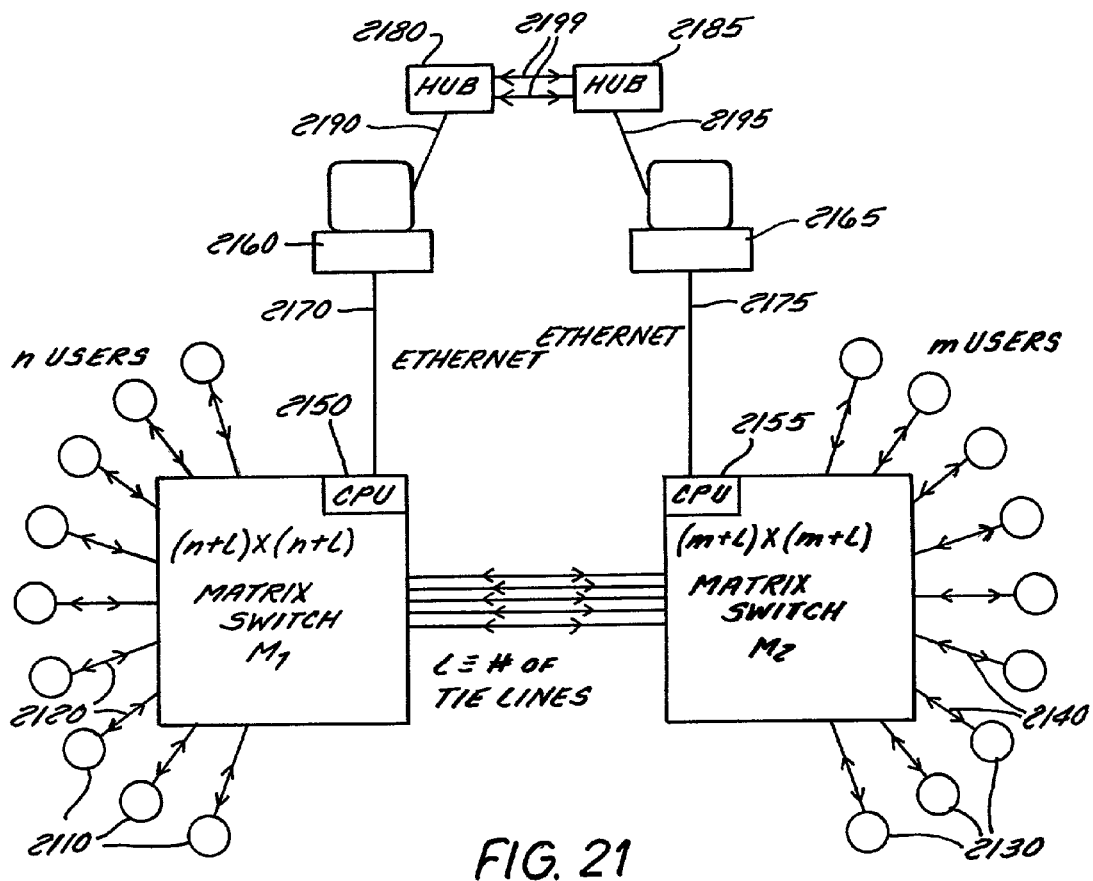
FIG. 21 illustrates a high level block diagram of a trunking mode router modal state, representing an embodiment of the present invention.

Referring now to FIG. 21, a fifth example uses different detail numerals to identify subcomponents which can be different. The construction of the two node star network architecture depicted in FIG. 21 requires two router modal states that are generally similar, but which can differ in detail. A first matrix switch $M_1$ is connected to a second matrix switch $M_2$ with a plurality of tie-lines L.

A first plurality of users 2110, whose number is represented by the variable n, are each individually connected to the matrix which $M_1$ with their own bidirectional tie-lines 2120. Each of the bidirectional tie-lines 2120 can be the full duplex loop. A second plurality of users 2130, whose number is represented by the variable m, are each individually connected to the matrix switch $M_2$ with their own individual bidirectional tie-line 2140. Each of the bidirectional tie-lines 2140 can be a full duplex loop. Matrix switch $M_1$ should be a router with a capacity of at least (n+L)×(n+L), where n is the number of users related (e.g., directly connected) to switch $M_1$ and L is the number of tie-lines directly connected to switch $M_1$. Similarly, matrix switch $M_2$ should be a router with a capacity of at least (m+L)× (m+L), where m is the number of users related (e.g., directly connected) to switch $M_2$ and L is the number of tie-lines directly connected to switch $M_2$. In this way, a contention free environment can be supported for any possible communication configuration. For absolute nonblocking (contention free) communication between any possible combination of users, the number of tie-lines L should be as large as the total number of users (n+m) where n is the number of users related to switch $M_1$ and m is the number of users related to switch $M_2$. For the purpose of this example, it is being assumed that the total number of users is greater than the number of matrix switches (2) and that the total number of tie-lines is at least as great as the total number of users.

The matrix switch $M_1$ includes a central processing unit 2150 for establishing and reconfiguring the corresponding switch table. An independent system managers terminal 2160 is connected to the CPU 2150 with an Ethernet line 2170. The terminal 2160 is connected to a hub 2180 with an Ethernet line 2190.

The matrix switch $M_2$ includes a central processing unit 2155 for establishing and reconfiguring the corresponding switch table. An independent system managers terminal 2165 is connected to the CPU 2155 with an Ethernet line 2175. The terminal 2165 is connected to a hub 2185 with an Ethernet line 2195. The hub 2180 is connected to the hub 2185 with a full duplex loop 2199.

Any user on any either matrix switch $M_1$ or $M_2$ can communicate with any other user, on the same, or the other, matrix switch, by either (1) operating his own terminal with the addresses) or alpha-numeric code, or (2) allowing an independent systems manager's terminal to accomplish the task for the selected users. This provides control redundancy.

The presence of the redundant Ethernet control link permits simultaneous in-band and out-of-band control. In this simultaneous control scheme, portions of the control information can be assigned to both the Ethernet and tie-line connections so as to distribute the control load. Alternatively, the same control information can be sent on both subsystems so as to provide a data check between redundant control instructions. In any event, the capacity, flexibility and robustness of the system is enhanced.

THEORY

The following theoretical consideration of the invention is simplified by assuming unidirectional traffic. This assumption is unnecessary, and is not a limitation of the invention, but is merely useful for simplifying the mathematical arguments. Further, the unidirectional traffic assumption can simplify the rendering of ring network structure and permits the formulation of a number of simple logic routing theorems.

The following discussion is directed primarily to ring networks rather than to multi-star networks. Parallel loop ring networks are of particular interest because of the potential self-healing properties of such rings.

In order to prove a number of logic routing (LR) theorems, it is useful to introduce specific symbolic language that is consistent with both mathematical logic and matrix algebra. An elementary router can be represented a number of ways, but only some of these representations are consistent with matrix algebra. Matrix algebra uses a specific right-left convention. Without this specific agreement, a table of rows and columns is not a matrix, but simply a mathematical object, called an array.[2] Regular matrix-vector multiplication takes the following form when applied to a binary matrix.

$$\begin{bmatrix} V_1 \\ V_2 \\ V_3 \\ V_4 \end{bmatrix} = \begin{bmatrix} 1001 \\ 0100 \\ 1000 \\ 0110 \end{bmatrix} \times \begin{bmatrix} U_1 \\ U_2 \\ U_3 \\ U_4 \end{bmatrix} = \begin{bmatrix} U_1 + U_4 \\ U_2 \\ U_1 \\ U_2 + U_3 \end{bmatrix} \qquad \text{Eq. (1)}$$

Significantly, the matrix in Eq. (1) can represent a switching router where the unit (1) valve represents a closed connection and the unit (0) represents an open connection.

Figure 22:
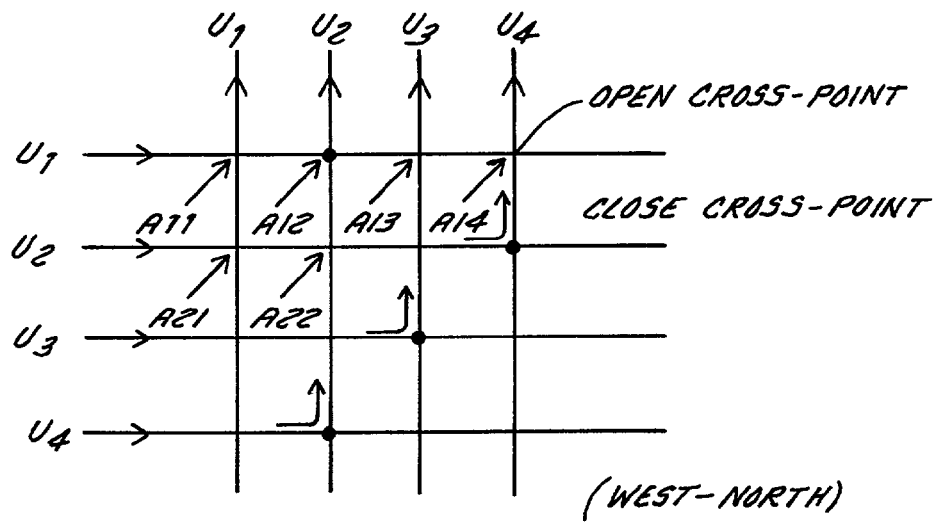
FIG. 22 illustrates an array diagram of a routing switcher, representing an embodiment of the present invention.

Among the many possible ways of depicting a switching router, the representation depicted in FIG. 22, which adopts a west-north convention, is an array and not a matrix because it is inconsistent with the conventions of matrix algebra.

Referring to FIG. 22, closed cross points are represented with a black dot and are equivalent to unit (1) value while open cross points are by the simple intersection of array lines and are equivalent to (0) values. By definition, the cross points in FIG. 22 define the following mathematical elements; $A_{11}=0$, $A_{12}=1$, $A_{13}=0$, $A_{14}=0$, etc., and, in the abbreviated notation, we have $$V = \hat{A} U \qquad \text{Eq. (2)}$$

Where: V and U are vectors and Â is the matrix. In more detail:

$$V = \begin{bmatrix} V_1 \\ V_2 \\ V_3 \\ V_4 \end{bmatrix}; \hat{A} = \begin{bmatrix} A_{11} & A_{12} & A_{13} & A_{14} \\ A_{21} & A_{22} & A_{23} & A_{24} \\ A_{31} & A_{32} & A_{33} & A_{34} \\ A_{41} & A_{42} & A_{43} & A_{44} \end{bmatrix}; U = \begin{bmatrix} U_1 \\ U_2 \\ U_3 \\ U_4 \end{bmatrix} \qquad \text{Eq. (3)}$$

Using a west-north convention as in FIG. 22, we obtain $$\begin{bmatrix} V_1 \\ V_2 \\ V_3 \\ V_4 \end{bmatrix} = \begin{bmatrix} 0100 \\ 0001 \\ 0010 \\ 0100 \end{bmatrix} \times \begin{bmatrix} U_1 \\ U_2 \\ U_3 \\ U_4 \end{bmatrix} = \begin{bmatrix} U_2 \\ U_1 \\ U_3 \\ U_2 \end{bmatrix} \qquad \text{Eq. (4)}$$

which is an incorrect result because the values that should be obtained in accordance with the router depicted in FIG. 22 are:

$$V_1=0,\ V_2=U_1+U_4,\ V_3=U_3,\ V_4=U_2. \qquad \text{Eq. (5)}$$

Thus, the west-north convention is not a proper representation method for matrix algebra.

Figure 23:
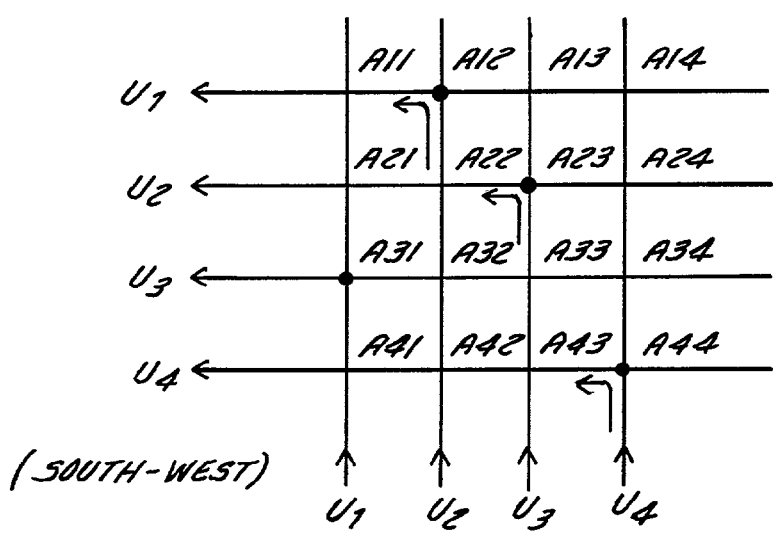
FIG. 23 illustrates a matrix diagram of a routing switcher, representing an embodiment of the present invention.

In contrast, depicting a matrix in a south-west convention yields correspondingly correct results. Referring to FIG. 23, depicting the matrix with south-west convention is correct as verified by the following matrix-vector multiplication process $$\begin{bmatrix} V_1 \\ V_2 \\ V_3 \\ V_4 \end{bmatrix} = \begin{bmatrix} 0100 \\ 0001 \\ 0010 \\ 0100 \end{bmatrix} \times \begin{bmatrix} U_1 \\ U_2 \\ U_3 \\ U_4 \end{bmatrix} = \begin{bmatrix} U_2 \\ U_4 \\ U_3 \\ U_2 \end{bmatrix} \qquad \text{Eq. (6)}$$

Therefore, representing a matrix switcher with the south-west convention depicted in FIG. 22 is correct. This proves that matrix algebra can be utilized for modeling router operation.

Figure 24:
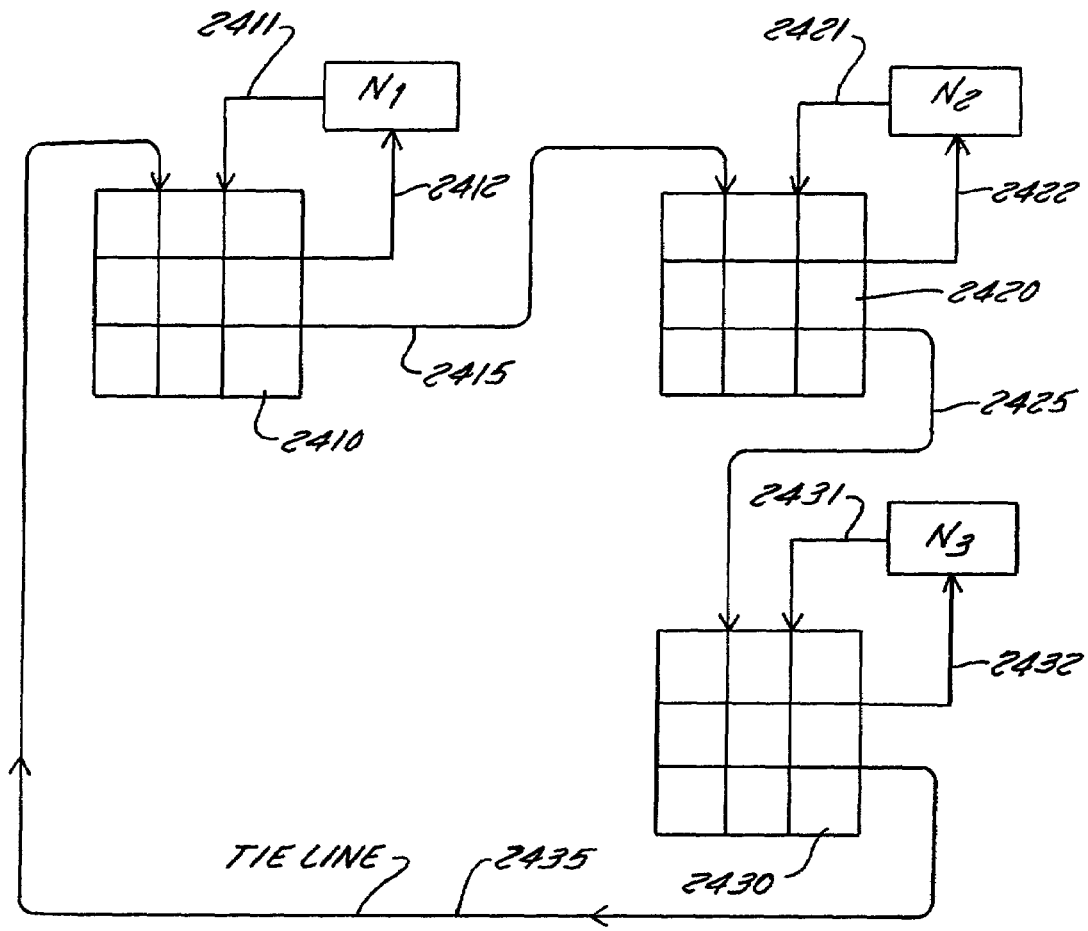
FIG. 24 illustrates a schematic view of a network, representing an embodiment of the present invention.

However, applying the graphic form of FIG. 23 to depict a set of routers is inconvenient. The graphic from of FIG. 23 can be termed a "natural graphic router form." Consider the very simple network depicted in FIG. 24. A first router 2410 is connected to a first node $N_1$ with a pair of unidirectional lines 2411 and 2412. The first router 2410 is connected to a second router 2420 with a unidirectional line 2415. A second node $N_2$ is connected to the second router 2420 with a pair of unidirectional lines 2421 and 2422. The second router 2420 is connected to a third router 2430 with a unidirectional tie-line 2425. A third node $N_3$ is connected to the third router 2430 with a pair of unidirectional lines 2431 and 2432. The third router 2430 is connected to the first router 2410 with a unidirectional line 2435. Although each of the routers depicted in FIG. 24 can be considered to be in a north-east configuration, it can be appreciated that by merely reorientating the router representation by rotating it 180°, all of the routers depicted in FIG. 24 follow the south-west convention of the router represented in FIG. 23. In FIG. 24, three matrix routers are arranged in a ring configuration with one node connected to each matrix router.

Figure 25:
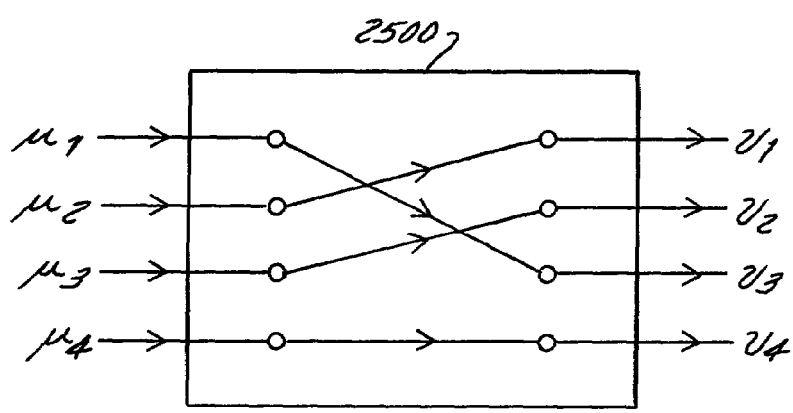
FIG. 25 illustrates a routing switch, representing an embodiment of the present invention.

Referring to FIG. 25, a router 2500 is provided with four inputs: $U_1$, $U_2$, $U_3$, and $U_4$. The router 25 is also provided with four output terminals: $V_1$, $V_2$, $V_3$, $V_4$. Any of the inputs can be connected to any one of the outputs without inhibiting the connection possibilities for the remaining inputs. Further, router 2500 can be a cross bar router which permits the non-blocking connection of any combination of inputs with any combination of outputs. FIG. 23 is precisely equivalent to the form of representation utilized in FIG. 25. FIG. 25 can be termed a shuffle-graphical form.

Figure 26:
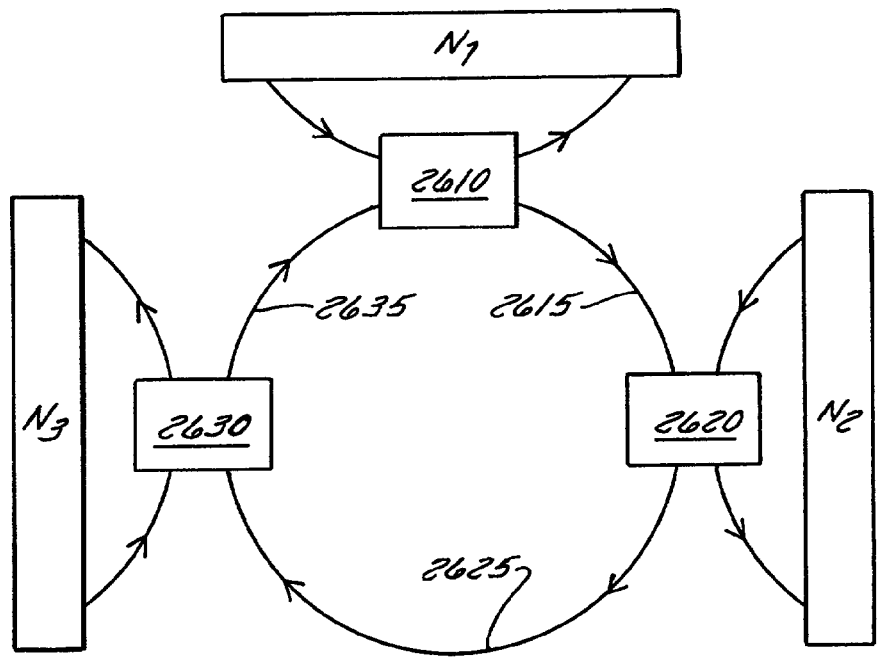
FIG. 26 illustrates a schematic view of a network, representing an embodiment of the present invention.
Figure 27:
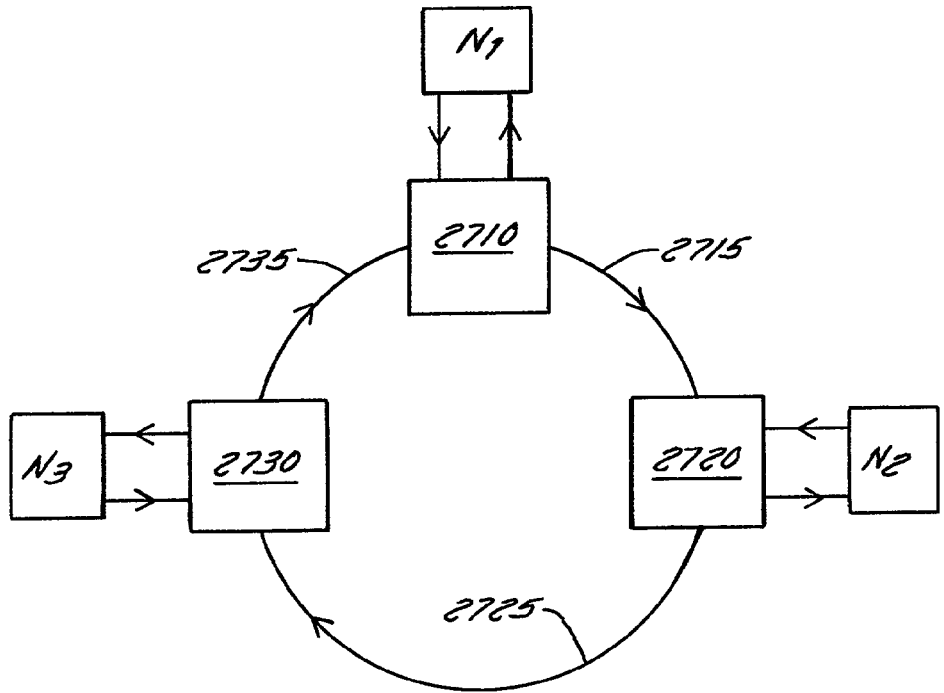
FIG. 27 illustrates a schematic view of a network, representing an embodiment of the present invention.

Referring to FIG. 26, A first router 2610 is connected to a second router 2620 with a first unidirectional tie-line 2615. The second router 2620 is connected to a third router 2530 with a second unidirectional tie-line 2625. The third router 2630 is connected to the first router 2610 with a third unidirectional line 2635. Each of the routers in FIG. 26 is depicted with a block schematic symbol that is based on the shuffle-graphical form introduced in FIG. 25. Thus, the inconvenient form of network representation shown in FIG. 24 can be replaced by the much more convenient form represented in FIG. 26. Referring to FIG. 27, a further simplification yields a more compact representation where the nodes are represented by small boxes in close proximity to the router boxes. A first router 2710 is connected to a second router 2720 with a first tie-line 2715. The second router 2720 is connected to a third router 2730 with a second tie-line 2725. The third router 2730 is connected to a first router 2710 with a third tie-line 2735. Each of the routers 2710, 2720, and 2730 is connected to a local area node $N_1$, $N_2$, and $N_3$, respectively. It can be appreciated that while the shuffle-graphical convention is maintained for the tie-lines 2715, 2725, and 2735, the nodes $N_1$, $N_2$, and $N_3$ are depicted as being connected to that facet of their associated router that is closest to the node at issue.

Using the above discussed conventions and representation techniques, a number of ring theorems can be formulated. The simplest examples will be discussed first.

Considering a point-to-point (no fan-out or fan-in) full duplex metropolitan area ring network (unidirectional) with N number of nodes, or users, arbitrarily located between M number of routers (non-blocking, crossbar), the optimum configuration is a contention free with a constant number of tie-lines between all the joining pairs of routers. In a completely contention free system, the number of tie-lines between each of the router pairs is equal to the number of users N and is independent of the number of routers N. For example, referring to FIG. 28, where N=4 and N=5, a network includes four routers $M_1$, $M_2$, $M_3$, and $M_4$ that are all connected together with a tie-ring $R_1$. A first node $N_1^{(1)}$ is connected to the router $M_1$. A second node $N_1^{(2)}$ is connected to the router $M_2$. A third node $N_1^{(3)}$ is connected to the router $M_3$. Similarly, a fourth node $N_2^{(3)}$ is also connected to the router $M_3$. Finally, a fifth node $N_1^{(2)}$ is connected to the router $M_4$. In the example depicted in FIG. 28 each of the routers is connected to its adjacent routers with five tie-lines. This is equal to the total number of nodes in the example. In this specific configuration, a tie-ring $R_1$ passes all the way around the ring and interconnects all of the routers. A contention free point-to-point full duplex unidirectional metropolitan area network ring with four routers and five nodes can be represented using the following notation. M is the total number of routers. $t_i^{(m)}$ is the ith tie-line after the mth-router. $N_i^{(m)}$ is the ith node connected to the mth router. It should be noted that each node $N_i^{(m)}$ can be a local area network. $M^{(m)}$ is the number of inputs/outputs (assuming, for simplicity, the same number of inputs and outputs) of the Nth matrix. Thus, a quadratic matrix is being explicitly considered. However, this constraint has been introduced solely for the purpose of simplification of the following description, and does not limit the scope of the invention, (i.e., the router matrices can also be non-quadratic). $N^{(m)}$ is the number of nodes connected to the mth router. N is the total number of nodes (total number of users). Thus, for non-contention, a combined condition is Eq. 7.

$$N = \sum_{m=1}^{M} N^{(m)} \qquad \text{Eq. (7)}$$

$T^{(m)}$ is the number of tie-lines, after M-matrix (router). In this theoretical modelling "tie-lines" means only those matrix inputs/outputs that are connected with other matrices and not with users (e.g., LANs). R is the number of dedicated tie-rings. In order to prove the non-contention theorem, it is sufficient to assume that each node has a dedicated tie-ring. The term "dedicated" means assigned in a specific configuration. Thus, the phrase "dedicated tie-ring" means that in a given configuration the same tie-lines form a closed loop. In such a case, simple point-to-point full duplex between any two nodes, can be realized by using this dedicated ring. Therefore, the dedicated ring theorem is For R number of rings, R=N, for the non-contention circumstance.

$$T^{(m)} = \text{constant} = T = N = \sum_{m=1}^{M} N^{(m)} \qquad \text{Eq. (8)}$$

TABLE 4-1

| Description | Symbol | Value |
| --- | --- | --- |
| Number of nodes in 1st router | $N^{(1)}$ | 1 |
| Number of nodes in 2nd router | $N^{(2)}$ | 1 |
| Number of nodes in 3rd router | $N^{(3)}$ | 2 |
| Number of nodes in 4th router | $N^{(4)}$ | 1 |
| Total number of nodes | N | 5 |
| Number of tie-rings | R | 5 |
| Number of inputs/outputs for 1st router | $M^{(1)}$ | 6 |
| 2nd router | $M^{(2)}$ | 6 |
| 3rd router | $M^{(3)}$ | 7 |
| 4th router | $M^{(4)}$ | 6 |

Full-duplex broadcasting has the same properties except that it is necessary to add an additional number of tie-rings that is equal to the maximum total number of fan-outs.

$$R < \sum_{m=1}^{M} N_1^{(m)} \qquad \text{Eq. (9)}$$

Eq. 9 indicates that if the number of tie-rings is less than the total number of users, then, in general, some contention cannot be avoided. Still for full duplex, it can be assumed that the first user is using $D_1^{(1)}$ fraction of time on the average and that the other users are utilizing similar fractions of time. Then, the arithmetic average time is $$\langle p \rangle = \frac{\sum_i \sum_m p_i^{(m)}}{\sum_{m=1}^{M} N^{(m)}} \qquad \text{Eq. (10)}$$

Then, if $$\frac{R}{\sum_{m=1}^{M} N^{(m)}} = \langle p \rangle \qquad \text{Eq. (11)}$$

then the metropolitan area network will be almost contention free, for a point-to-point connection. The precise response can only be given by combinatorics.[2]

Figure 29A:
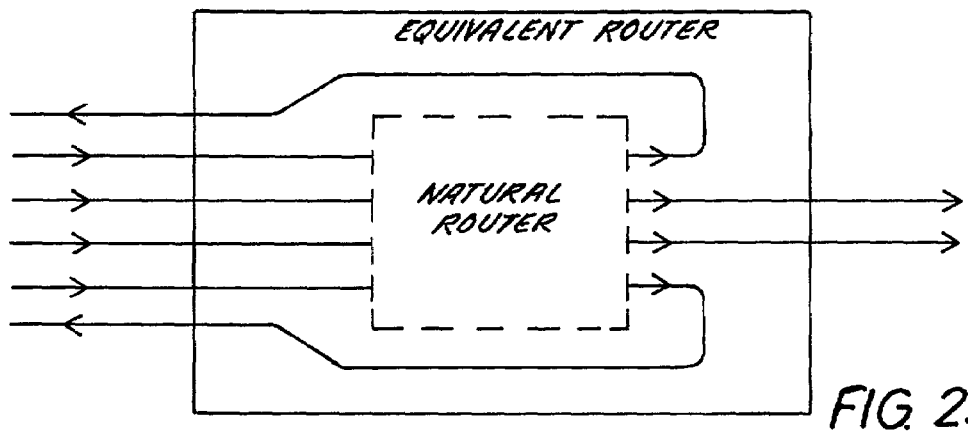
FIGS. 29A–29B illustrate equivalent schematic views of a router, representing an embodiment of the present invention.
Figure 29B:
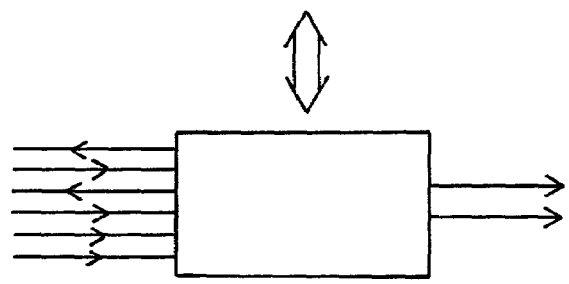

Before considering a specific example, it is useful to consider the equivalence between several symbolic representations of routers. Referring to FIGS. 29A–B, the functional equivalence of routers depicted by two different block schematic diagrams can be appreciated. Thus, FIG. 29B is a simplification of the router depicted in FIG. 29A. FIGS. 29A–29B depict asymmetric bi-directional equivalents between the two representational schemes.

Figure 30A:
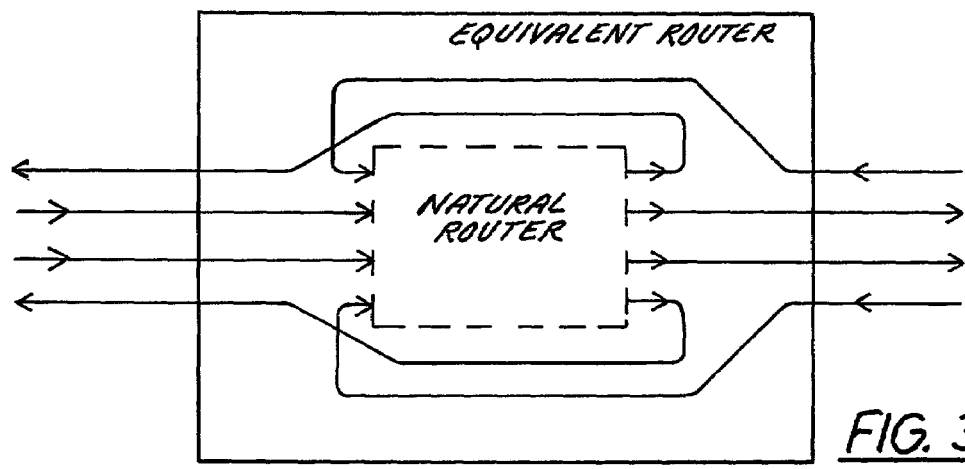
FIGS. 30A–30B illustrate equivalent schematic views of a router, representing an embodiment of the present invention.
Figure 30B:
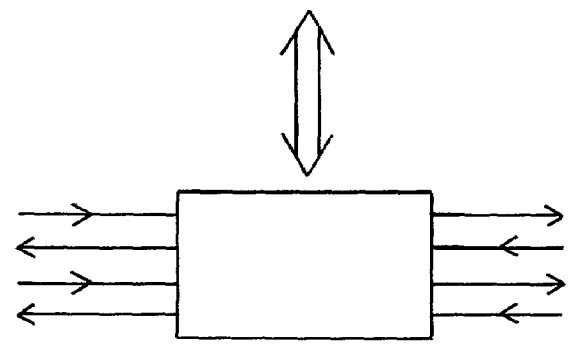

Similarly, referring to FIGS. 30A–30B, the functional equivalence of these two methods of representing the routers can be appreciated. Again, FIG. 30B is a simplification of the representation depicted in FIG. 30A. FIGS. 30A–30B represent symmetric bi-directional equivalents between the two representational schemes.

Figure 31:
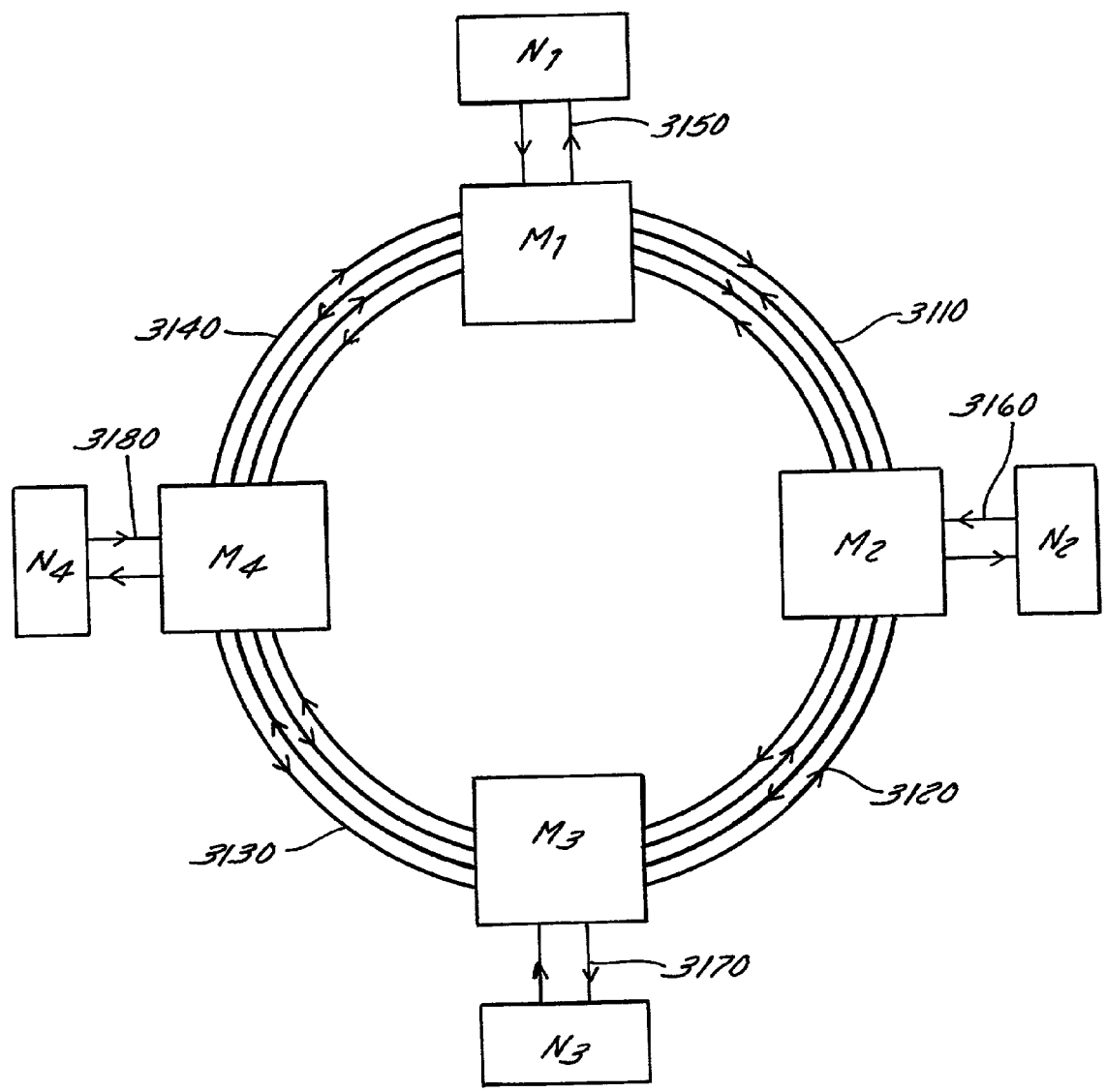
FIG. 31 illustrates a schematic view of a network, representing an embodiment of the present invention.

Referring to FIG. 31, a bidirectional ring can be depicted using the block schematic representations depicted in FIGS. 29B and 30B. FIG. 31 illustrates a bi-directional metropolitan area network ring. In this embodiment, a first router $M_1$ is connected to a second router $M_2$ with a first bidirectional tie-line 3110. The second router $M_2$ is connected to a third router $M_3$ with a second bidirectional tie-line 3120. The third router $M_3$ is connected to a fourth router $M_4$ with a third bidirectional tie-line 3130. The fourth router $M_4$ is connected to the first router $M_1$ with a fourth bidirectional tie-line 3140. A first node $N_1$ is connected to the first router $M_1$ with a first bidirectional drop/add line 3150. A second node $N_2$ is connected to the second router $M_2$ with a second bidirectional drop/add line 3160. A third node $N_3$ is connected to the third router $M_3$ with a third bidirectional drop/add line 3170. Finally, a fourth node $N_4$ is connected to the fourth router $M_4$ with a fourth bidirectional drop/add line 3180.

The following discussion concerns distributed (train) addressing. For contention free full duplex unidirectional metropolitan area network rings, a simple train addressing scheme can be produced which does not require any look-up tables. This is possible because the train addressing scheme includes dedicated tie-rings. Thus, it is sufficient to provide full duplex drop lines for each ring and each user. In more detail, when a dedicated tie-ring is taken, a precursor train addressing signal is sent to all users with the instruction that the ring should be dropped and inserted for only that specific user.

Figure 28:
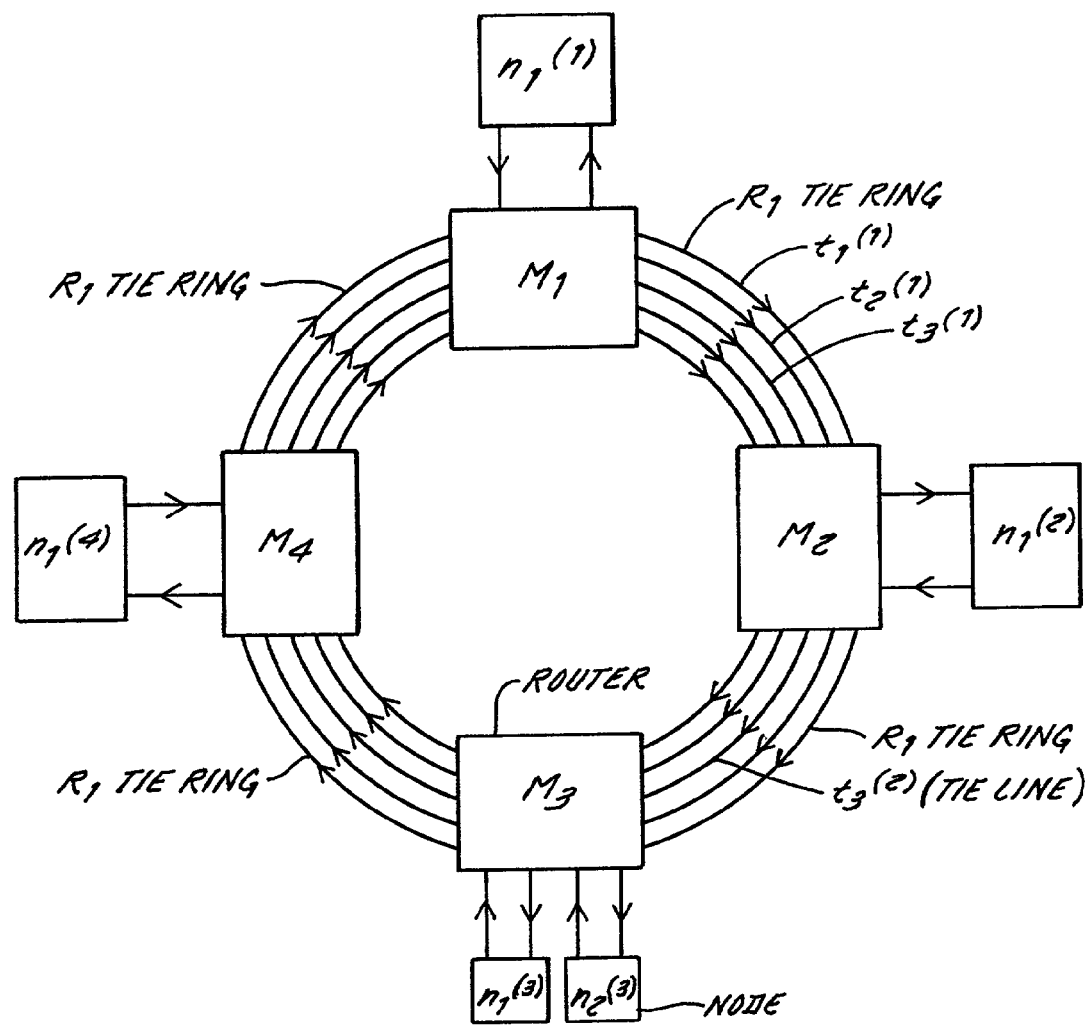
FIG. 28 illustrates a schematic view of a ring network, representing an embodiment of the present invention.
Figure 32A:
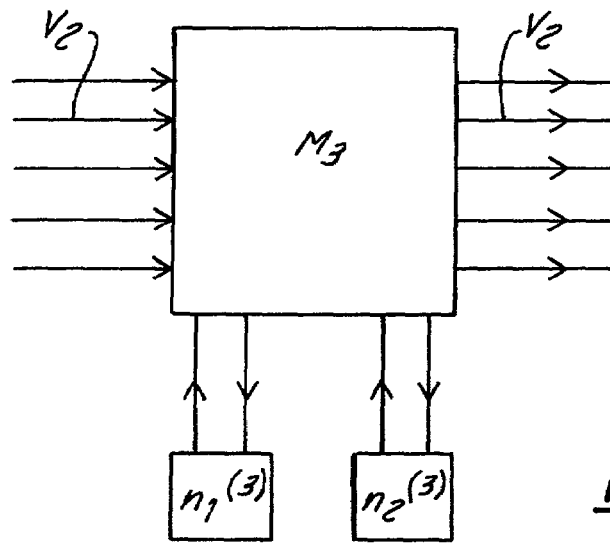
FIGS. 32A–32B illustrate equivalent schematic views of a router, representing an embodiment of the present invention.
Figure 32B:
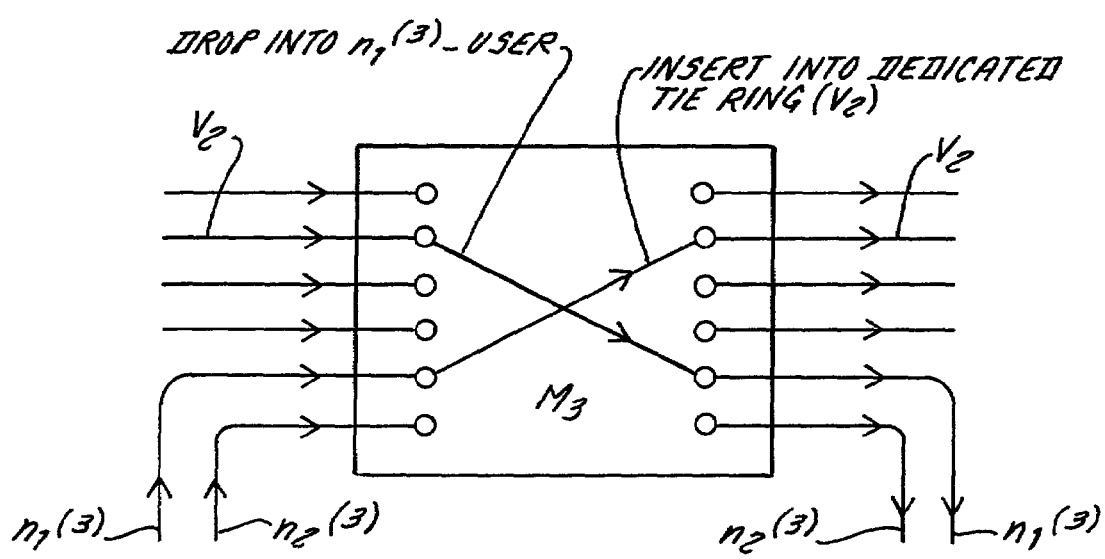
Figure 32C:
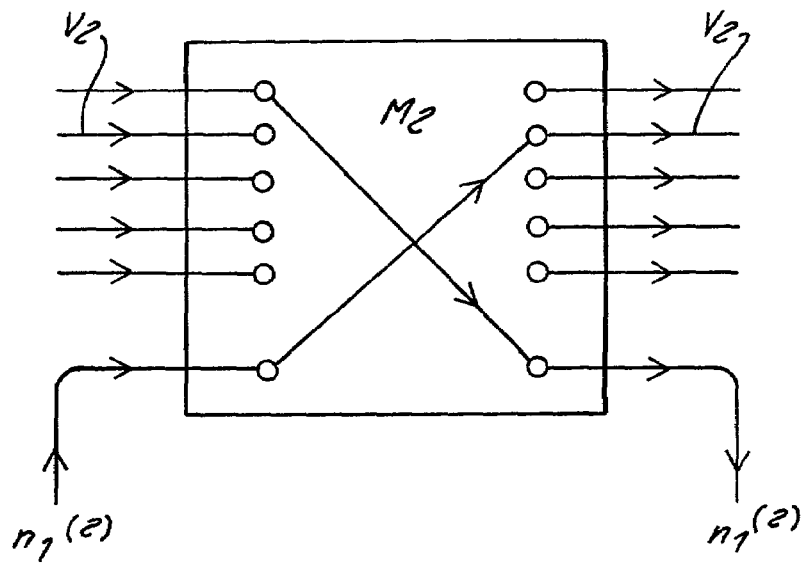
FIG. 32C illustrates a schematic view of a router, representing an embodiment of the present invention.

An example can be based on the consideration of the network depicted in FIG. 28, assuming that full duplex communication is required between user $N_1^{(3)}$ and that $N_1^{(3)}$ is the sender, then the address is sent through a dedicated ring with instructions, as illustrated in FIGS. 32A and 32B. FIG. 32A illustrates a switching matrix $M_3$ with two attached users demarcated $N_1^{(3)}$ and $N_2^{(3)}$. FIG. 32B illustrates a schematic representation that is equivalent to the representation in FIG. 32A. FIG. 32C illustrates a schematic representation for a router $M_2$.

Figure 32D:
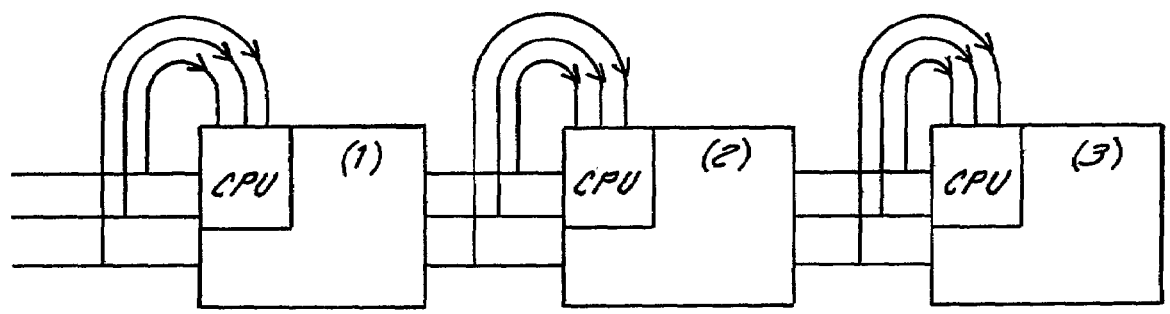
FIG. 32D illustrates a schematic view of a network, representing an embodiment of the present invention.

FIG. 32D illustrates train addressing. The addressed train includes the following instructions: (1) $N_1^{(3)}$ into $R_2$ (as in FIG. 32B); (2) drop $N_1^{(3)}$ from $R_2$ as in FIG. 32B, then $R_2$ is dedicated to $N_1^{(3)}$; (3) send signal around, dropping address to all users; (4) user $N_1^{(2)}$ is getting address, the others are getting blank address; (5) then $R_3$ goes to $N_1^{(2)}$ dropping and $N^{(2)}$ goes to $R_3$ insert is done in $M_2$; (6) now full duplex: $N_1^{(3)}$ and $N_1^{(2)}$ is ready.

A discussion of central processor unit addressing for general unidirectional ring follows. A basic matrix operation is insertion of a user into a ring. If the matrices are to be contention free (non-blocking) the first requirement is to find a free output as in FIG. 33, where $V_4$ is free.

Figure 33:
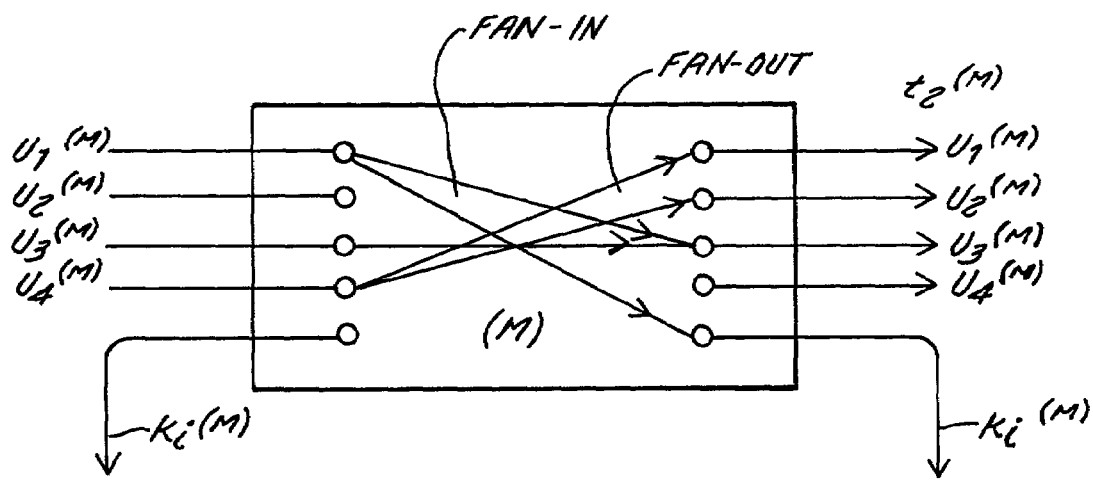
FIG. 33 illustrates a schematic view of a router, representing an embodiment of the present invention.
Figure 34:
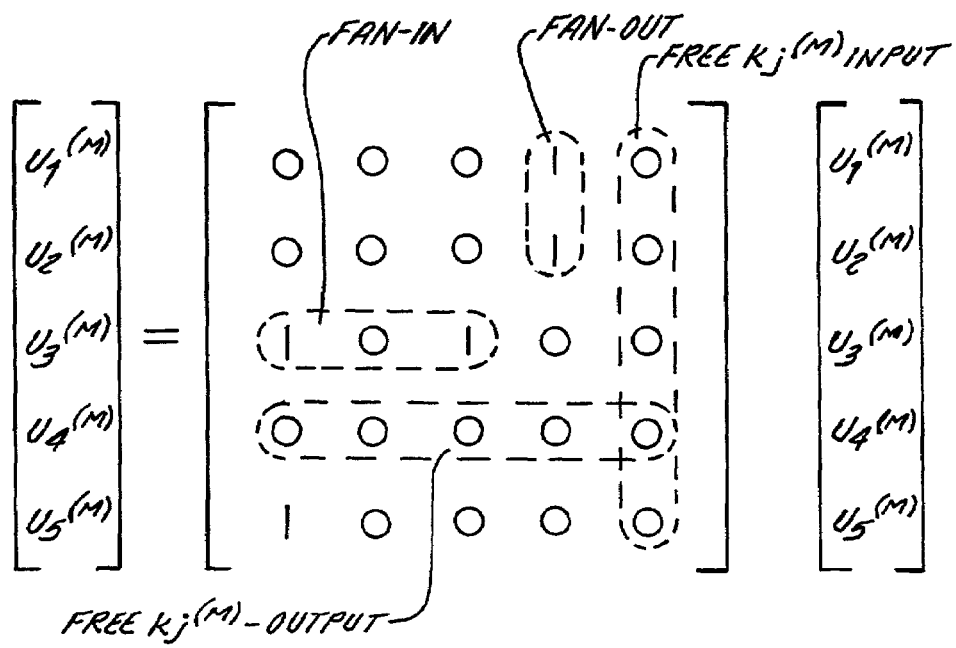
FIG. 34 illustrates a matrix view of a router, representing an embodiment of the present invention.

FIG. 34 is a matrix that is equivalent to FIG. 33. All of the $V_4^{(m)}$ row is free; thus $V_4^{(m)}$ output is free. All of the $U_5^{(m)}$ column is free; thus the $U_5$ input is free. There are two ones in $V_3^{(m)}$ row; thus there is fan-in into $V_3^{(m)}$. There are two ones in column $U_4^{(m)}$; thus there is fan-out from $U_4^{(m)}$.

Figure 35:
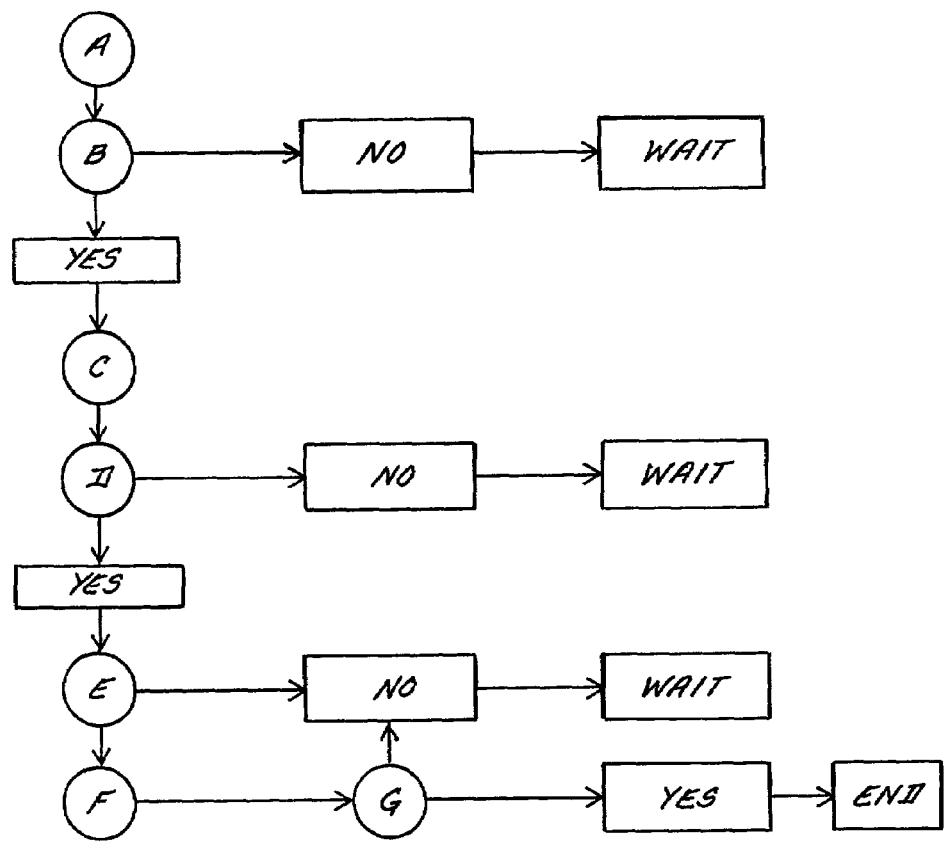
FIG. 35 illustrates a flow chart view of a router switching process, representing an embodiment of the present invention.

The following example is directed to any single connection. For example, consider the single connection from $N_2^{(3)}$ to $N_1^{(1)}$ in FIG. 28. The sequential instructions for establishing such a connection can be as follows: (1) look-up matrix for an initial matrix $M_3$ (step A in FIG. 35); (2) check if any row is free (all zeros) (step B in FIG. 35); (3) if, yes, for example $V_4^{(3)}$ as in FIG. 34 take it; (4) take look-up matrix for an intermediate matrix $M_4$ (step C in FIG. 35); (5) check if any row is free (step D in FIG. 35); (6) if, yes, take it (step E in FIG. 35); (7) take look-up matrix for a destination matrix $M_1$ (step F in FIG. 35); (8) check if $N_1^{(1)}$ drop is free (step G in FIG. 35); (9) if yes, take it; this corresponds to END in FIG. 35.

The following is a discussion of contention free ring theorems based on mathematical statistics. To define the term "almost" in the phrase "almost contention free," a consideration of combinatorials and mathematical statistics is useful.[2] Assuming that:

$$R < \sum_{m=1}^{M} N^{(m)} = N \qquad \text{Eq. (12)}$$

where R is the number of tie-rings, N is the total number of local area network users, for full duplex and point-to-point, and that each user, on average, uses the same p fraction of time, p is the probability that a particular LAN user wants to use a ring and q is the probability that he does not want to use a ring such that:

$$p+q=1 \qquad \text{Eq. (13)}$$

It is useful to know what is the probability, that within N-number of local area network users, N number requires duplex connectivity at the same time? This probability can be denoted as $$W_N(n) \qquad \text{Eq. (14)}$$

It is also useful to know what is the probability that, at a given time, none of the users finds all of the lines busy? This probability can be expressed as $$\sum_{n=0}^{R} W_N(n) \quad \text{Eq. (15)}$$

It can be appreciated that Newton's binomial expression in the form: (auxiliary)

$$(p+q)^N = \sum_{n=0}^{N} \binom{N}{n} p^n q^{N-n} \quad \text{Eq. (16)}$$

which, according to Eq. (12) reduces to $$1 = \sum_{n=0}^{N} \binom{N}{n} p^n q^{N-n} \quad \text{Eq. (17)}$$

where $$\binom{N}{n} \triangleq \frac{N!}{n!(N-n)!} \quad \text{Eq. (18)}$$

and $$n! = n(n-1)(n-2)(\ldots)(1) \quad \text{Eq. (19)}$$

The probability, that within N-number of local area network users, n number of them requires full duplex connectivity is equivalent to the probability that drawing one ball (white one with probability, p; or black one with probability q) from each of the N boxes, n of them will be white (i.e., Newton's binomial problem).[2] The answer for this Newton binomial problem is $$W_N(n) = \binom{N}{n} p^n q^{N-n} \quad \text{Eq. (20)}$$

The average number of users who want to talk is $$\bar{n} = Np \quad \text{Eq. (21)}$$

and the dispersion, δ, is $$\delta^2 \triangleq \langle n^2 \rangle - \langle n \rangle^2 = Npq \quad \text{Eq. (22)}$$

where <...> is the ensemble average.

In the following example, the number of local area network users N=5, the number of tie-rings is R=3, and the p fraction of time is 50%. Thus, Eq. 19 becomes $$W_5(n) = \binom{5}{n}(0.5)^5 = \frac{1}{32}\binom{5}{n} \quad \text{Eq. (23)}$$

but

-continued $$\binom{5}{0} = 1, \binom{5}{1} = 5, \binom{5}{2} = \frac{5!}{2!3!} = \frac{4 \cdot 5}{2} = 10$$

$$\binom{5}{3} = 10, \binom{5}{4} = 5, \binom{5}{5} = 1$$

| $\binom{5}{0}$ | $\binom{5}{1}$ | $\binom{5}{2}$ | $\binom{5}{3}$ | $\binom{5}{4}$ | $\binom{5}{5}$ |
|---|---|---|---|---|---|
| 1 | 5 | 10 | 10 | 5 | 1 |

$$W_5(0) = \frac{1}{32}\binom{5}{0} = \frac{1}{32} = 0.012 \quad \text{Eq. (24)}$$

$$W_5(1) = \frac{1}{32}\binom{5}{1} = \frac{5}{32} = 0.16 \quad \text{Eq. (25)}$$

$$W_5(2) = \frac{1}{32}\binom{5}{2} = \frac{5}{32} = 0.32 \quad \text{Eq. (26)}$$

$$W_5(3) = \frac{1}{32}\binom{5}{3} = \frac{10}{32} = 0.32 \quad \text{Eq. (27)}$$

$$W_5(4) = \frac{1}{32}\binom{5}{4} = \frac{5}{32} = 0.16 \quad \text{Eq. (28)}$$

$$W_5(5) = \frac{1}{32}\binom{5}{5} = \frac{1}{32} = 0.012 \quad \text{Eq. (29)}$$

We can see that the binomial expression in Eq. 16 is indeed satisfied, since:

$$\frac{1}{32} + \frac{5}{32} + \frac{10}{32} + \frac{10}{32} + \frac{5}{32} + \frac{1}{32} = 1 \quad \text{Eq. (30)}$$

also, $$\bar{n} = 5 \cdot 0.5 = 2.5 \quad \text{Eq. (31)}$$

and $$\delta = \sqrt{5 \cdot (0.5)^2} = \sqrt{1.25} = 1.11 \quad \text{Eq. (32)}$$

The probability that, at a given timne, none of the users finds all of the lines busy.

$$P_N(R) = \sum_{n=0}^{3} W_5(n) = \frac{1}{32} + \frac{5}{32} + \frac{10}{32} + \frac{10}{32} = \frac{26}{32} = 81\% \quad \text{Eq. (33)}$$

However, $$<p> = p = R/N \quad \text{Eq. (34)}$$

but $$\bar{n} = N \cdot p \quad \text{Eq. (35)}$$

Thus, $$R\bar{n} = n \quad \text{Eq. (36)}$$

or, $$R = 2.5 \quad \text{Eq. (37)}$$

is the condition "almost." But, here R=3, thus, the condition "almost" is well satisfied, and "almost," is 81%.

Figure 36:
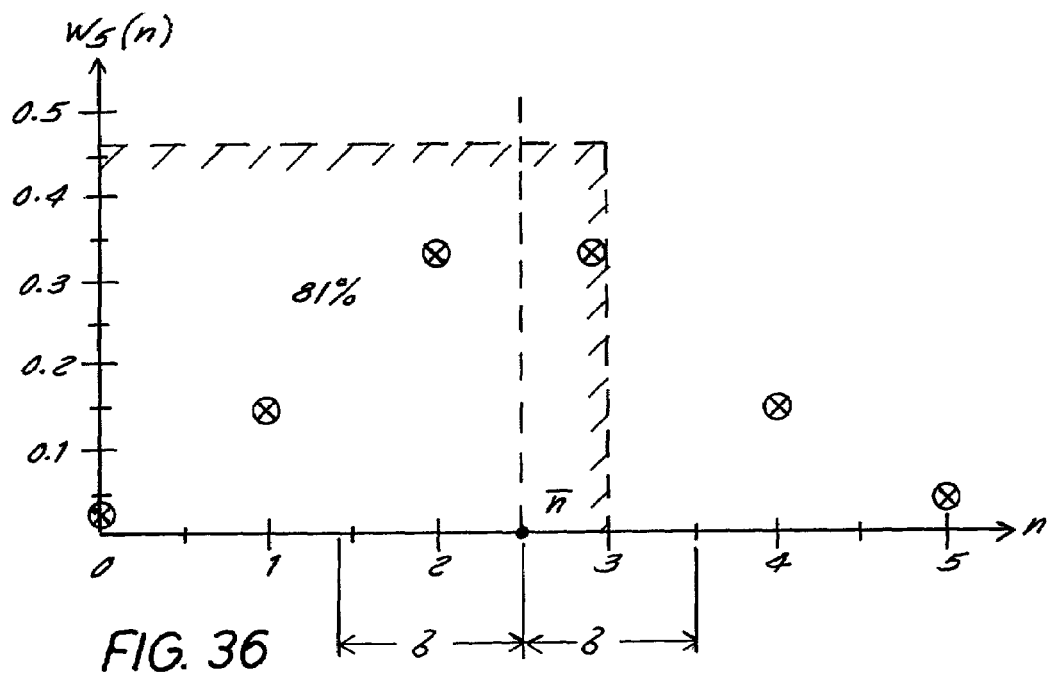
FIG. 36 illustrates the probability of an open tie-line being available as a function of the total number of users, representing an embodiment of the present invention.

Referring to FIG. 36, all of the relations:

$$P_N(R) = \sum_{n=0}^{R} W_N(n) = \sum_{n=0}^{3} W_5(n) \quad \text{Eq. (38)}$$

are illustrated. Therefore with 81% probability we can be sure that any time all local area network users that want to interact on the network will be able to interact.

ROUTER SYMBOLS

| Number | SYMBOL | DEFINITION |
|---|---|---|
| 1 | [Â] | Matrix (Mathematical) |
| 2 | $A_{ij}$ | Matrix elements |
| 3 |  | Router: right south-west convention natural representation |
| 4 | V: $V_1, V_2, V_3$ | Output vector |
| 5 | U: $U_1, U_2, U_3$ | Input vector |
| 6 | $M_{(i)}$ | Router: Shuffle-representation |
| 7 | $M_{(i)}$ | Router: LAN representation |

| Number | SYMBOL | DEFINITION |
|---|---|---|
| 1 | N, L, T, R | numbers (total) |
| 2 | $N_{(i)}, M_{(i)}$ | objects |
| 3 | $l_i$ | i-index |
| 4 | M | number of routers |
| 5 | N | number of LANS, total |
| 6 | $N^{(m)}$ | number of LANS belonging to m - router |
| 7 | $T^{(m)}$ | number of tie-lines after m-route |
| 8 | R | number of tie-rings |
| 9 | $M^{(m)}$ | number of inputs/outputs for m-th quadratic router |
| 10 | $t_i^{(m)}$ | i-th tie-lines belonging to m-th router |
| 11 | $R_i$ | i-th tie-ring |
| 12 | $N_i^{(m)}$ | i-th LAN belonging to m-th router |
| 13 | $M_i$ | i-th router |
| 14 | $p_i^{(m)}$ | fraction of time for i-th user belonging to m-th router |
| 15 | T, L | total number of tie lines |
| 16 | N, m | number of nodes |

Non-Quadratic Routers and their Matrix Representation

Figure 37:
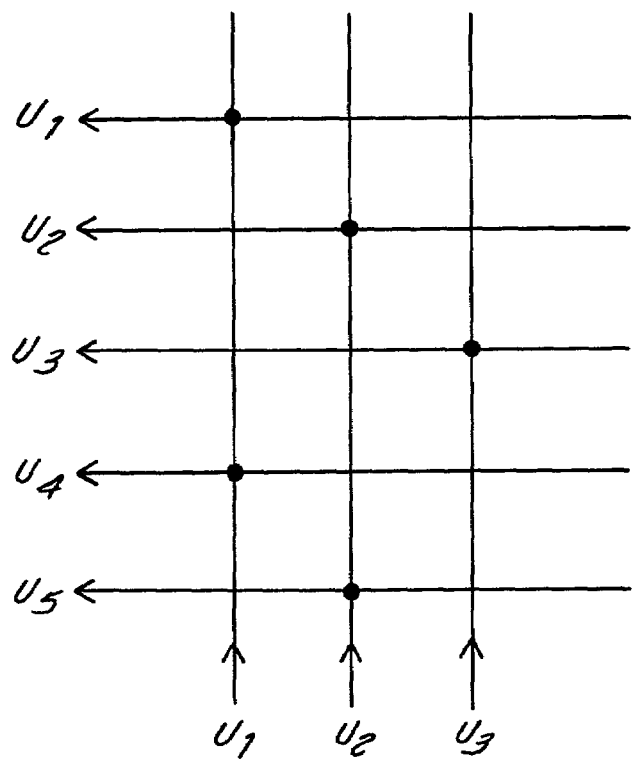
FIG. 37 illustrates a schematic view of a router, representing an embodiment o of the present invention.

Referring to FIG. 37, a first example of a non-quadratic router is illustrated. In this example three inputs are linked to five outputs. The following matrix is a mathematical method of representing the non-cross bar connections illustrated in FIG. 37.

$$\begin{bmatrix} V_1 \\ V_2 \\ V_3 \\ V_4 \\ V_5 \end{bmatrix} = \begin{bmatrix} A_{11} & A_{12} & A_{13} \\ A_{21} & A_{22} & A_{23} \\ A_{31} & A_{32} & A_{33} \\ A_{41} & A_{42} & A_{43} \\ A_{51} & A_{52} & A_{53} \end{bmatrix} \times \begin{bmatrix} U_1 \\ U_2 \\ U_3 \end{bmatrix} = \begin{bmatrix} 100 \\ 010 \\ 001 \\ 100 \\ 010 \end{bmatrix} \times \begin{bmatrix} U_1 \\ U_2 \\ U_3 \end{bmatrix} = \begin{bmatrix} U_1 \\ U_2 \\ U_3 \\ U_1 \\ U_2 \end{bmatrix}$$

Figure 38:
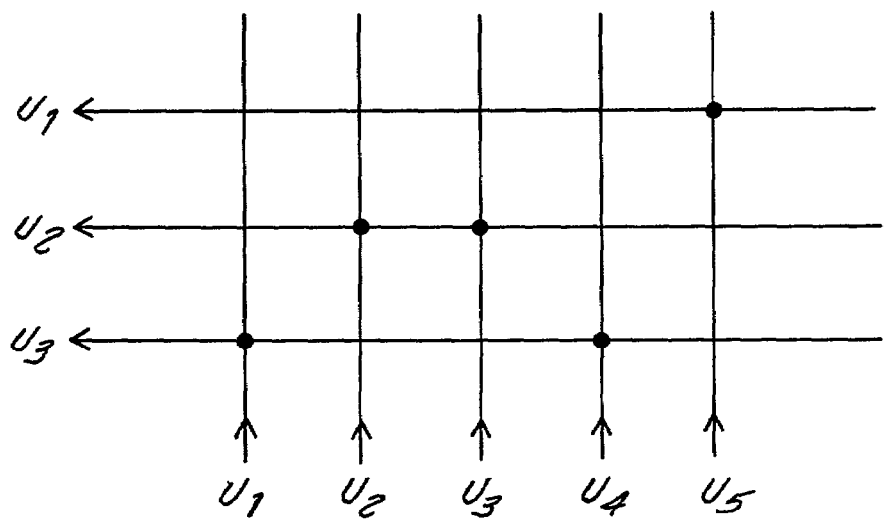
FIG. 38 illustrates a schematic view of a router, representing an embodiment of the present invention.

Referring to FIG. 38, a second example of a non-quadratic router is illustrated. In this example there are five inputs and three outputs. The following matrix provides a mathematical representation of the non-cross bar connections illustrated in FIG. 38.

$$\begin{bmatrix} V_1 \\ V_2 \\ V_3 \end{bmatrix} = \begin{bmatrix} A_{11} & A_{12} & A_{13} & A_{14} & A_{15} \\ A_{21} & A_{22} & A_{23} & A_{24} & A_{25} \\ A_{31} & A_{32} & A_{33} & A_{34} & A_{35} \end{bmatrix} \times \begin{bmatrix} U_1 \\ U_2 \\ U_3 \end{bmatrix} =$$

$$\begin{bmatrix} 00001 \\ 01100 \\ 10010 \end{bmatrix} \times \begin{bmatrix} U_1 \\ U_2 \\ U_3 \\ U_5 \\ U_5 \end{bmatrix} = \begin{bmatrix} U_5 \\ U_2 + U_3 \\ U_1 + U_4 \end{bmatrix}$$

FIG. 37 represents a fan-out situation and FIG. 38 represents a fan-in situation.

Multimedia Switched Digital Network

A novel flexible digital network for multimedia communication that is described herein offers several features and advantages over recently proposed or standardized architectures and protocols in use today. High speed multimedia, multiprotocol networks utilize ATM technology over SONET networks to achieve communication between end user up to the desk top using (fast packet) cell switching with considerable design complexity and cost associated with its implementation. Issues of traffic congestion and the resultant delays in data (packet) transfers will be achieved in the foreseeable future as these networks become more widely accepted and designed in.

The switched digital network described herein follows fiber channel techniques, while adding considerable cost advantage, flexibility and, elegant design simplicity that covers multimedia communication for realtime audio, full bandwidth uncompressed video, narrow band (ISDN) T1 data, RS232/422 combination with full duplex/half duplex 10 BaseT Ethernet. This network delivers the lowest latency for point-to-point or multi-point communication compared to any existing network.

The basic elements of this network consist of multiplexers at the user site, a crossbar (switching matrix) router with electrical and fiber optic input/output interfaces that are modular and can be very easily expanded and many tie-lines that can be used to expand the basic star network to provide larger networks with the added redundant link between adjacent physical architectural topology. This network can grow from building size to local area size, such as a campus, and to city wide area coverage.

The architecture follows a fiber channel technique that utilizes only circuit switching in the switch fabric with physical layer data rates from approximately 150 Mbps to approximately 1.2 Gbps. Implementations of the invention with low speed multiplexers can be based on AMD's TAXI chipset utilizing a 10B/12B encoding/decoding scheme.

Higher bit rate multiplexers at the user sites can operate up to 1.2 Gbps based on HP's G-link chipset utilizing 20B/24B encoding/decoding scheme (condition and invert encoding technique). These larger multiplexers can be equipped with drop and insert capabilities for added flexibility and features that are highly desirable in high performance networks.

Figure 39:
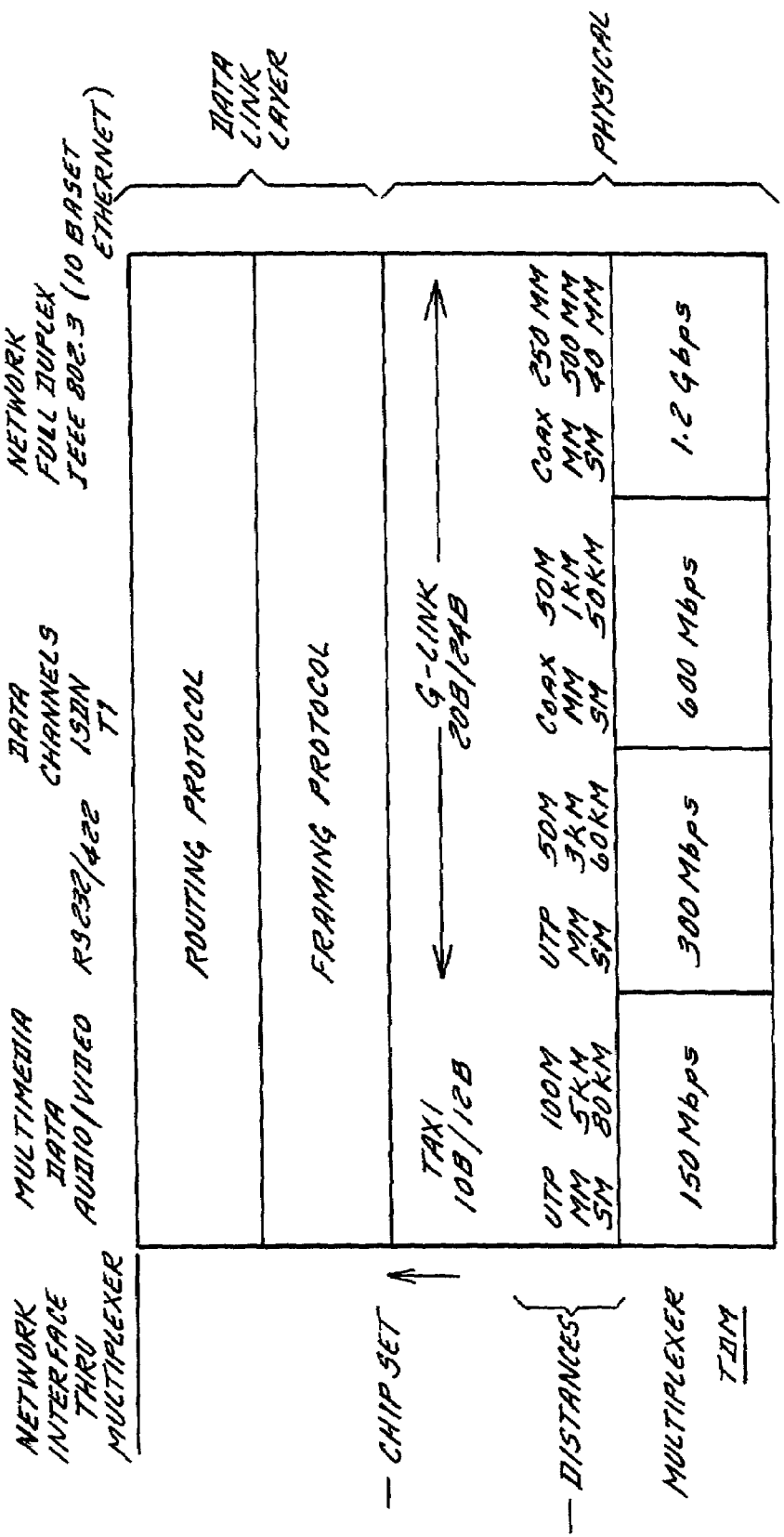
FIG. 39 illustrates a schematic view of the control layers of a network, representing an embodiment of the present invention.

Referring to FIG. 39, a protocol layered diagram for a network embodiment of the invention is illustrated. The physical layers are based on the aforementioned chipsets. The datalink layers are based on framing and routing protocols.

Figure 40:
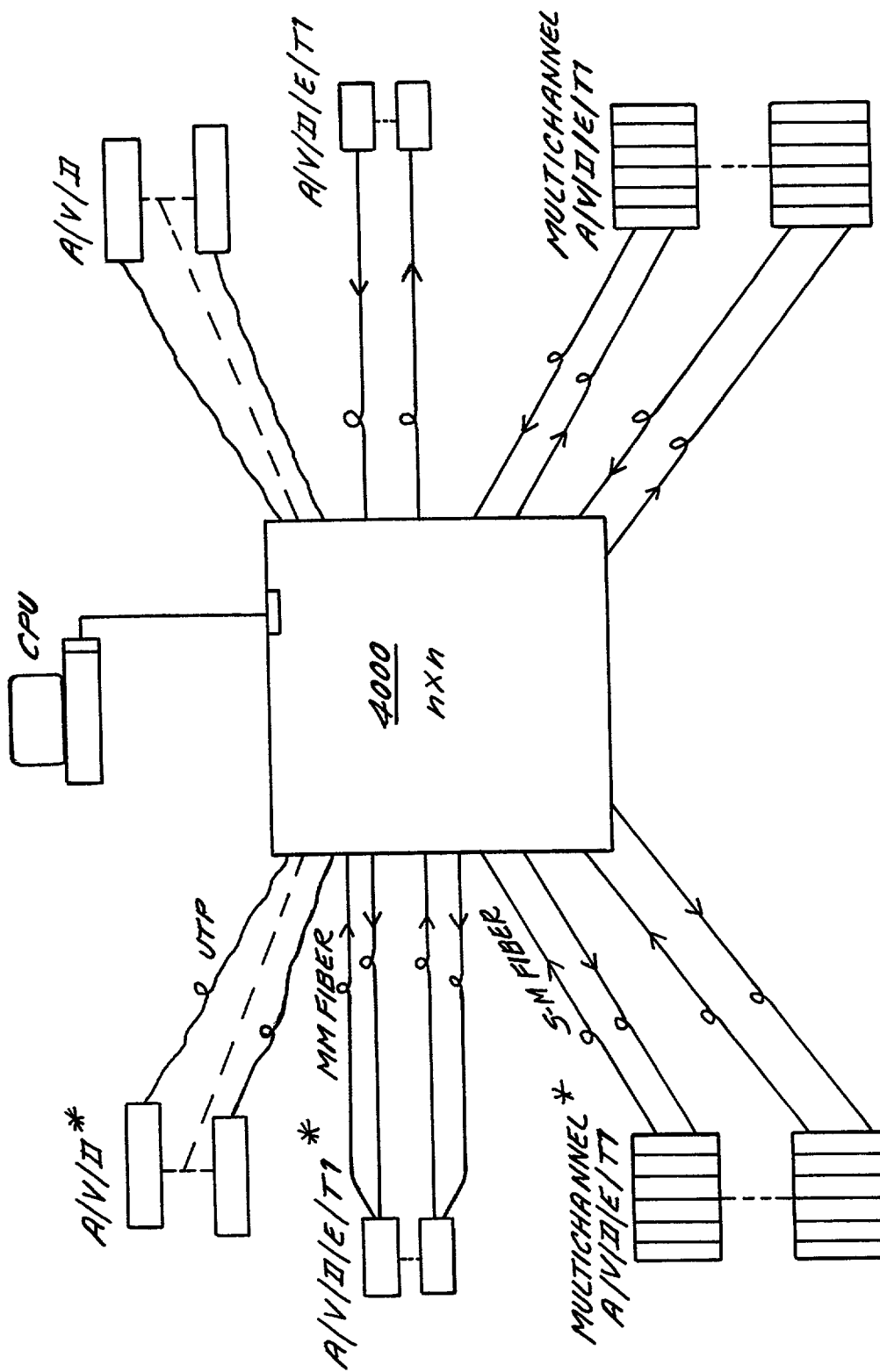
FIG. 40 illustrates a schematic view of a network, representing an embodiment of the present invention.

In a minimum latency application, a multiplexer can be provided that utilizes time division with a minimum amount of buffering for realtime audio, video, low speed data RS232/422, narrow band ISDN T1 channel and IEEE 802.3 half duplex/full duplex. Referring to FIG. 40, a simple multiuser star network is depicted. A cross bar switch 4000 is under software control and the end can be reconfigured on the fly. The cross bar switch 4000 is an NXN switch that is non-blocking and transparent to the user, with minimum latency. A typical switch matrix size can be 128×128. The following table indicates appropriate transmission medium for various area coverages and the scalar distances associated with these coverages.

Figure 41:
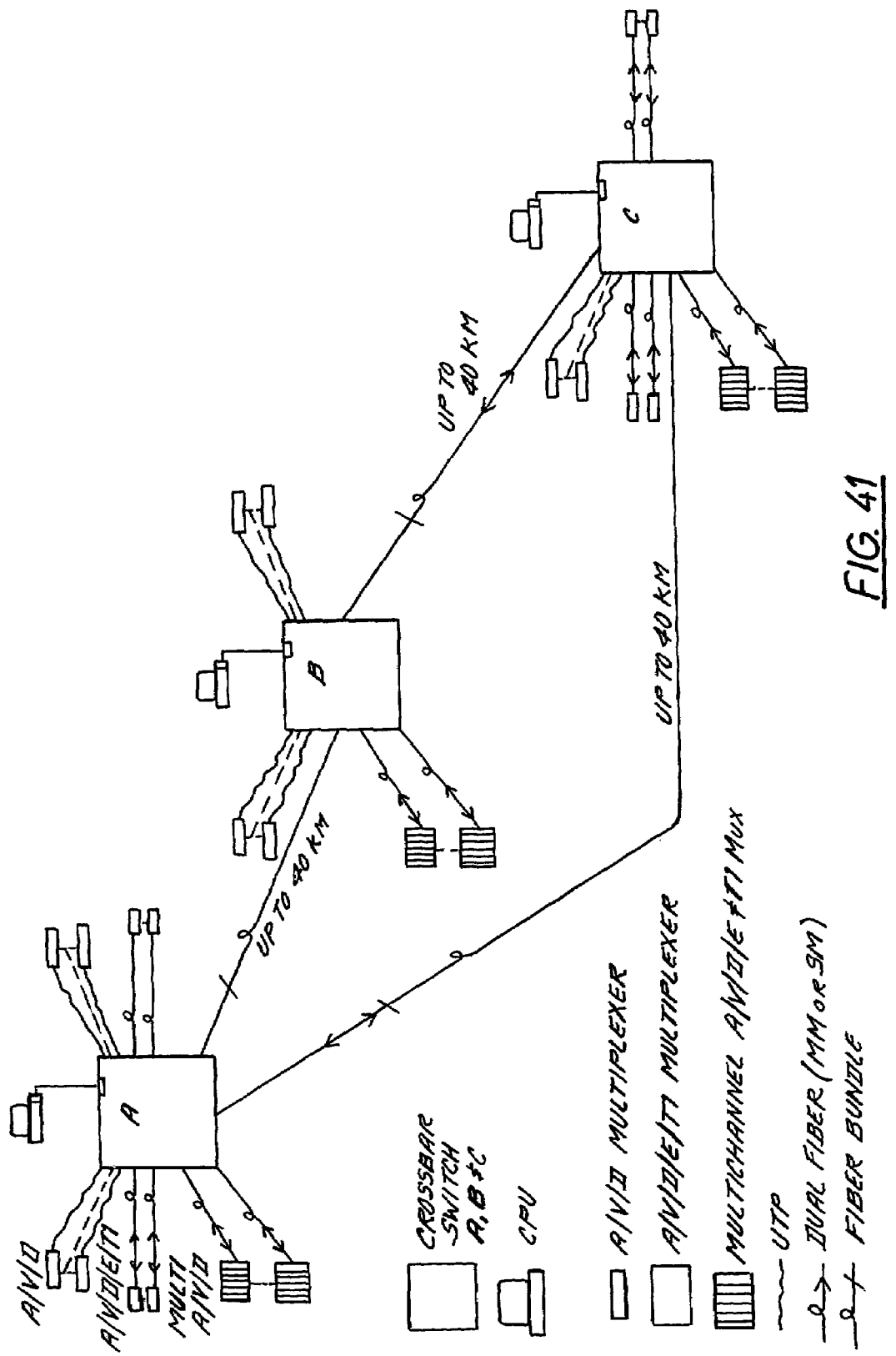
FIG. 41 illustrates a schematic view of a network, representing an embodiment of the present invention.

Referring to FIG. 41, a sample multimedia network is illustrated. This network is configured as a ring and is formed by using tie-lines between switches A, B, C and back to switch A. Switches A, B, and C can be cross bar switches.

Figure 42:
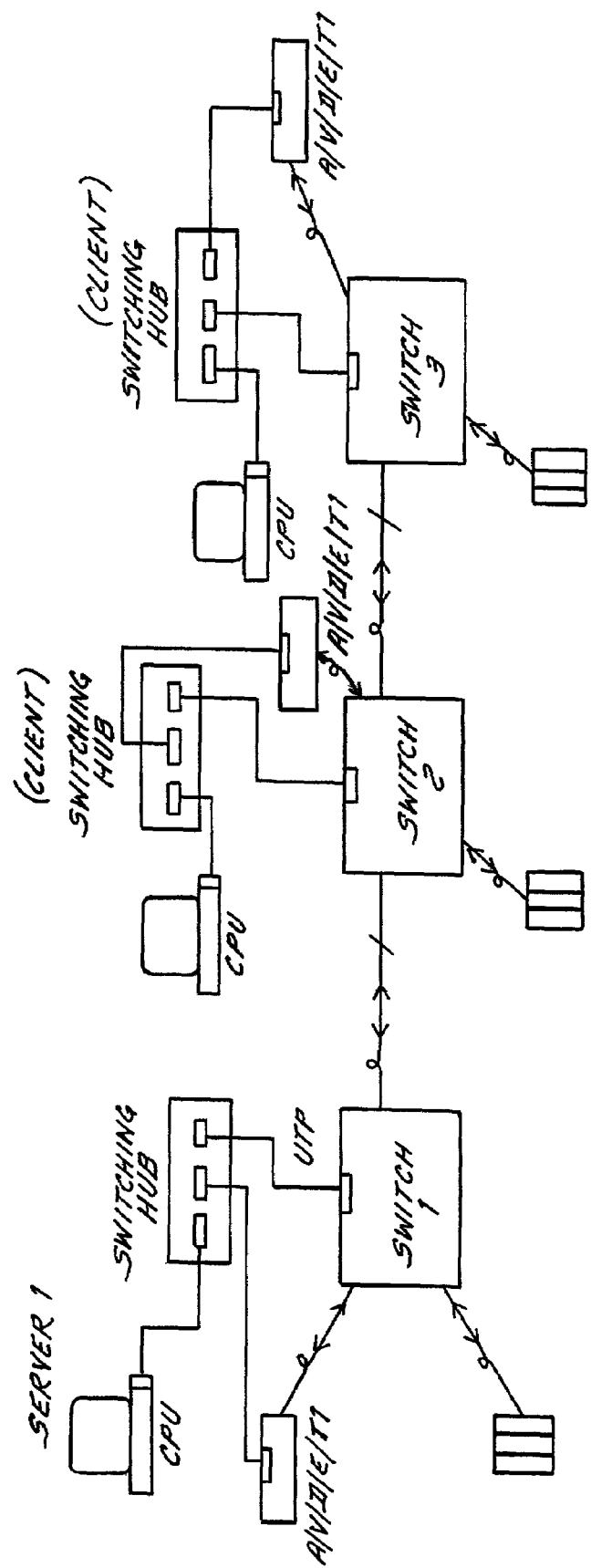
FIG. 42 illustrates a schematic view of a network, representing an embodiment of the present invention.

Referring to FIG. 42, a sample multimedia network using IN-band/10 base T (full duplex) for client establishment is depicted. In this network, a client/server model is used with full duplex Ethernet (10 base T) network to program the various switches. The server updates the program for the individual switches. The client devices (e.g., CPU) negotiate new routes through the server which keep, the updated master routing table at all times.

| Transmission Medium | Area Coverage | Distance |
|---|---|---|
| UTP | building/user groups | up to 100 m |
| Multimode fiber | Campus | up to 5 Km |
| Single Mode fiber | City | up to 40 Km |

The features of simple star multimedia network include the following: Non blocking cross bar-switch allows any two users (nodes) to communicate bi-directionally. (CPU driven routing) Circuit switched. Any user can broadcast to all other users or some unidirectional. Connections between users can be prioritized and/or timed based on certain rules. Distance between users and switch will vary depending on transmission medium and transceivers.

| Departmental | for | <100 m | use | twisted pair wire |
| LAN | for | <2 Km | use | multimode fiber + optics |
| WAN | for | <40 Km | use | single mode fiber + optics | users can transmit and receive audio, video, data like text/graphics, networked data (Ethernet) plus one T1 channel.

The features of simple two star network assuming n>m and m≧1 follow, where n is a number of user related (e.g., directly connected) to switch A and m is a number of users related (e.g., directly connected) to switch B, and 1 is a number of any (e.g., all) users. Any n on A user can communicate to any on A. Any m user on B switch can communicate to any on B. Maximum 1 number of any m or n user can communicate between A & B at any given time. (n−1) users are blocked for communications between A & B user. For fully non-blocking communication 1 should be=n (i.e., A is now $(2n)^2$ and B is $(n+m)^2$). Two disjoint n & m users have $A=n^2$ & $B=m^2$. Two fully connected stars with n & m=(n+m) users need $$A=4\ n^2 \rightarrow n^2+3n^2\ \&\ B=n^2+m^2 \rightarrow m^2+n^2+2nm$$

Figure 43:
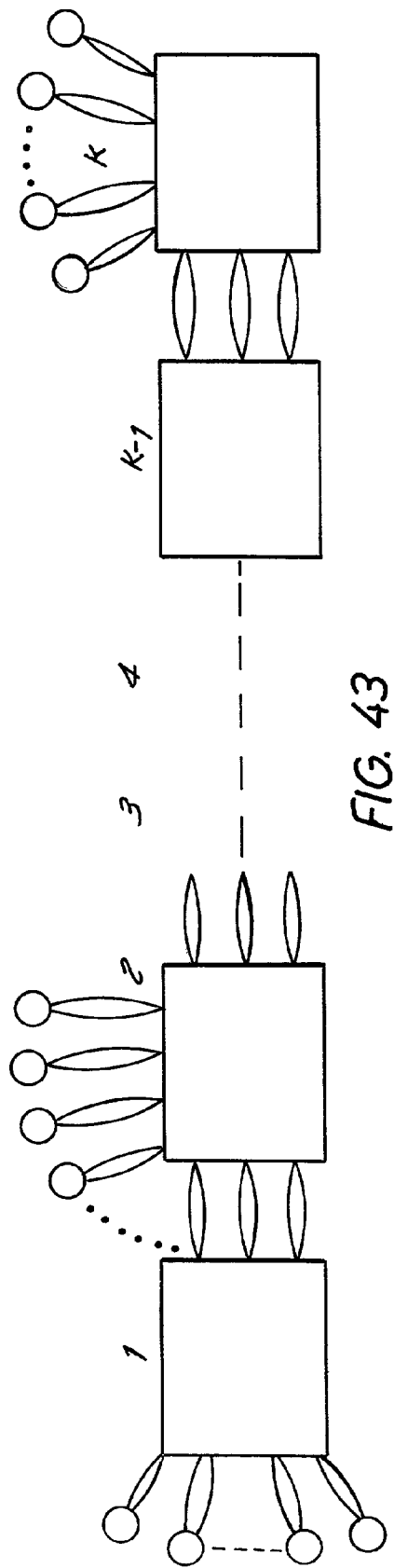
FIG. 43 illustrates a schematic view of a network, representing an embodiment of the present invention.

Referring to FIG. 43, a more complex network consisting of K star subnetworks is depicted. This represents a form of network extension.

Figure 44:
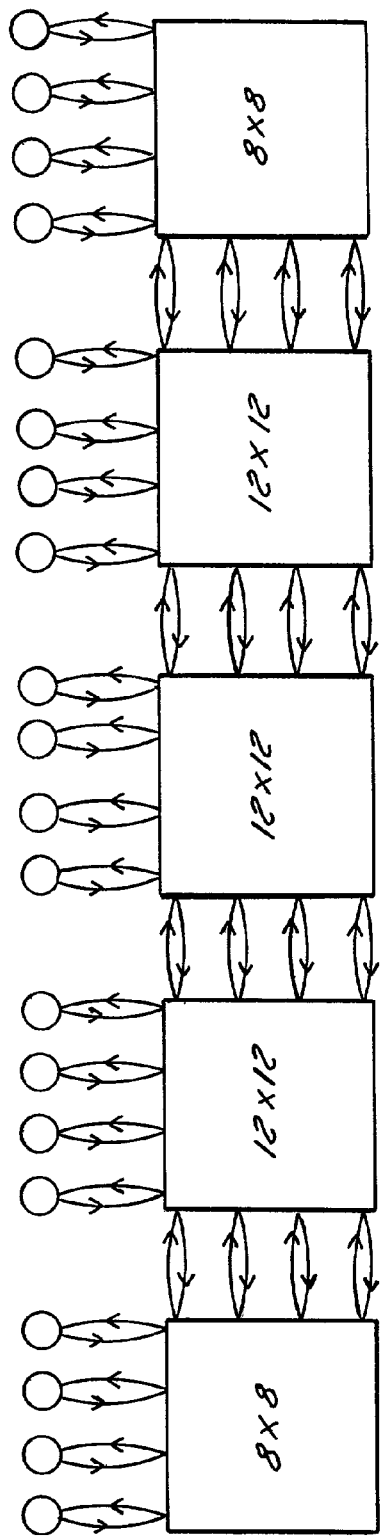
FIG. 44 illustrates a schematic view of a network, representing an embodiment of the present invention.

Referring to FIG. 44, a network consisting of five star networks is depicted. There are four tie-lines between each of the star networks.

Figure 45:
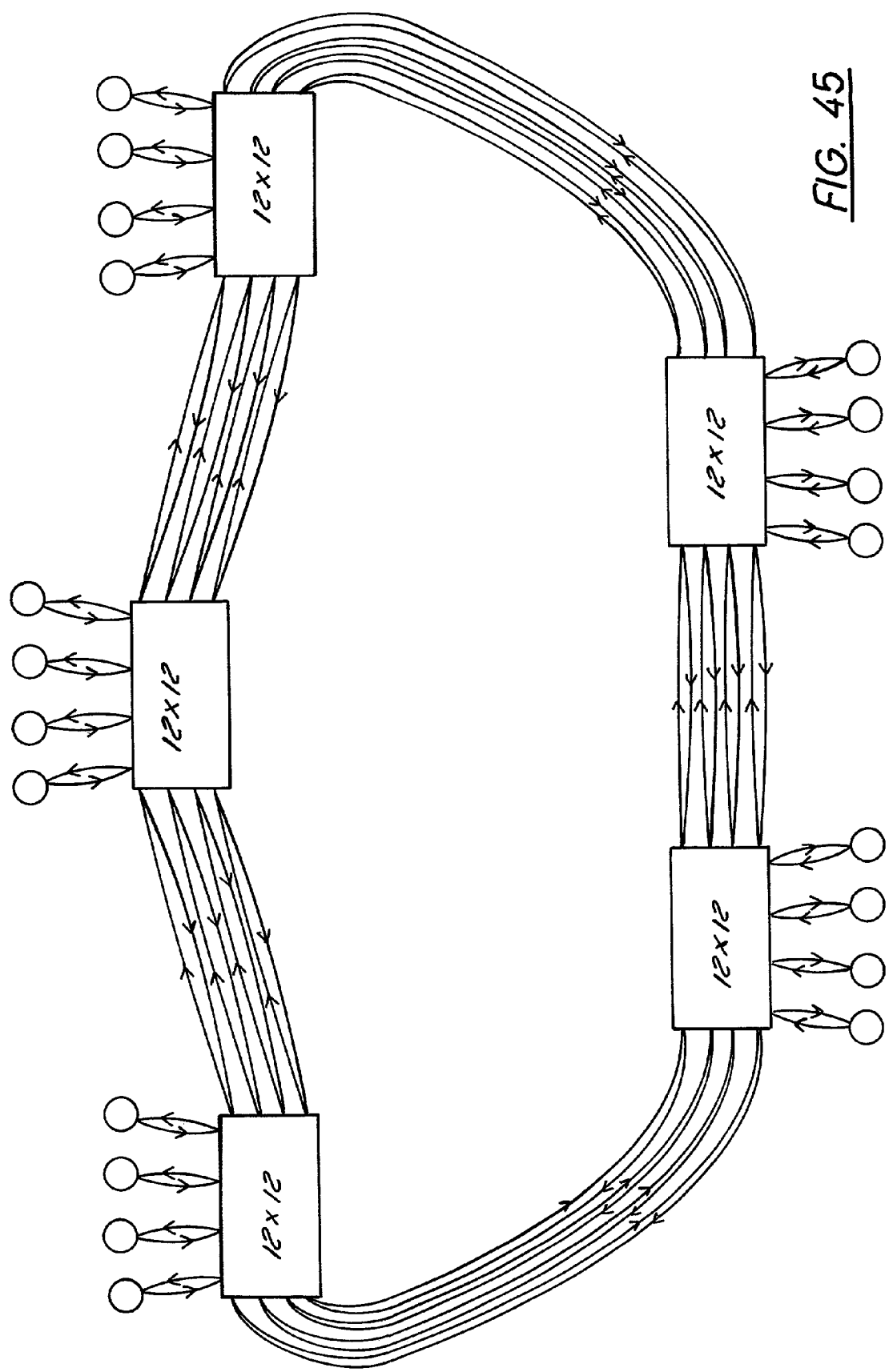
FIG. 45 illustrates a schematic view of a network, representing an embodiment of the present invention.

Referring to FIG. 45, a more complex network consisting of five stars arranged in a ring configuration is depicted. There is a variable number of tie-lines between each of the star networks.

Figure 46:
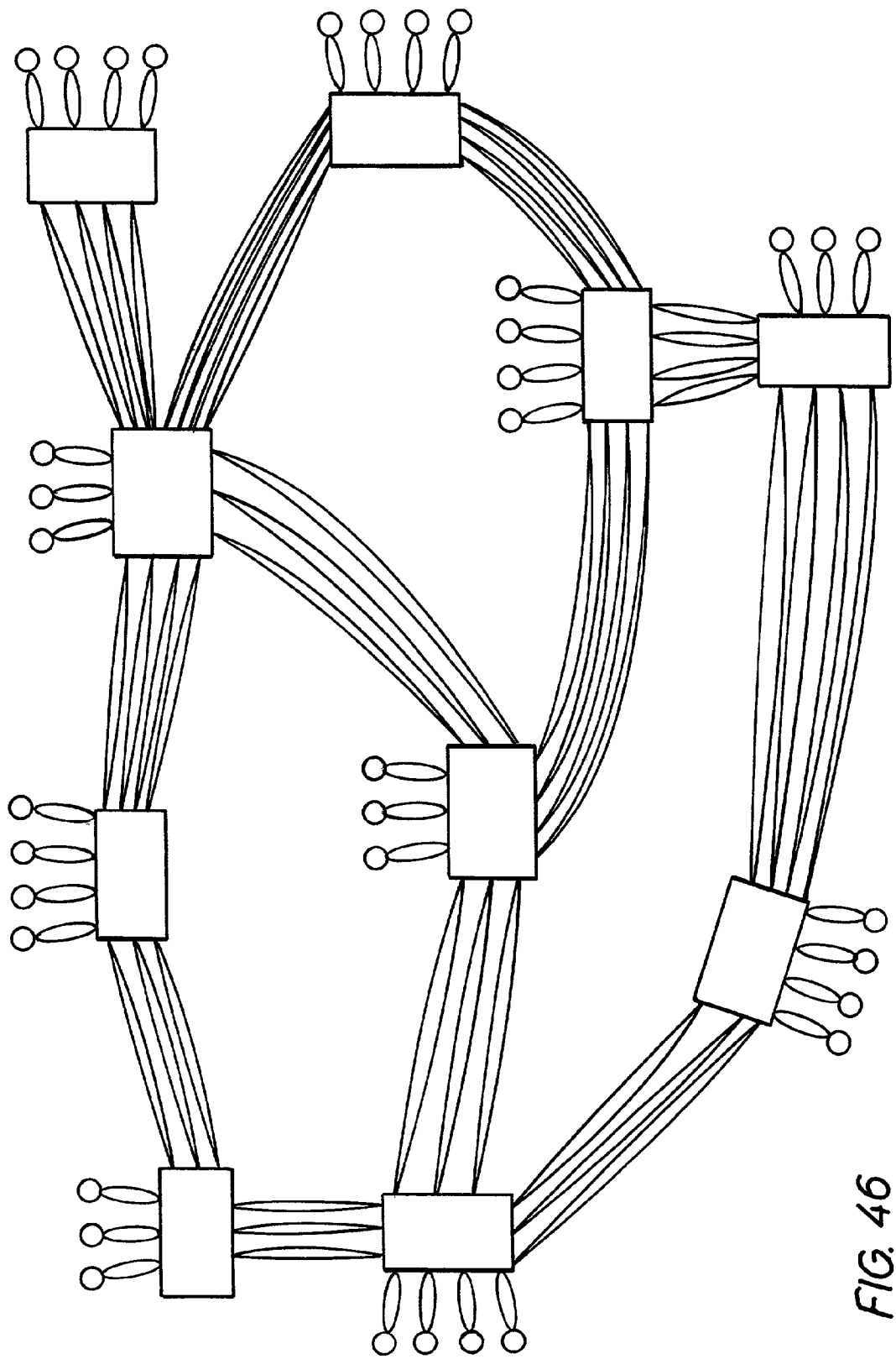
FIG. 46 illustrates a schematic view of a network, representing an embodiment of the present invention.

Referring to FIG. 46, a more general network topology is depicted. This topology includes a plurality of rings and at least one point to point connection between subnetworks.

Advantages of the Invention

A network, representing an embodiment of the present invention is cost effective and advantageous for at least the following reasons. Unique feature set of multimedia communication network include the following.

The network is digital transparent and carries multiplel-multiprotocol data streams (packetized) by traversing crossbar switches/router for point-to-point and point-to-multipoint broadcast. The network uses hybrid transmission media consisting of twisted pair, multimode fiber optics and fmally single mode fiber plus optics. This allows flexibility and easy expansion capability and reduces overall system/network cost. The network can use a simple star network in the local area and extend to a wide area by joining stars with tie-lines (fiber optic interconnected matrices). The network has minimum latency compared to any existing network protocol to pre-assigned circuit switch route and no buffering/storage of information. The network provides full motion, full bandwidth (uncompressed) real time video and communication. The network can utilize TDM technology and the ultra wide bandwidth of fiber optic communications technology. The network is economically feasible, viable and affordable as compared to any competing wide area communication network technology such as fiber channel and ATM. The network can use simpler circuitry and inherently has ease of implementation. The network permits much simpler routing and network management because individual crossbar switches are electronically programmed under software and constantly polled and communicated amongst the various matrix switches with minimum latency. The network has a drop and insert capability built into the packet data stream. The network permits easy network configuration and expansion because the matrix switch is modular. Redundancy can be achieved by increasing the number of tie-lines which will in turn increase overall routing efficiency. The network uses transparent digitalized multiprotocol data stream over hybrid transmission media with in-band routing of networked data streams that are circuit switched with minimum latency. The routing information for call setup can be established on a full duplex client/server 10Base T distributed network utilizing rule bases routing table/configuration. The network has minimum latency compared to any existing network protocol due to pre-assigned circuit switched route through the various switches with minimum buffering/storage of information due to realtime operation of data network. The network provides full bandwidth audio, video (uncompressed) communication between any user. Audio/video communication between users can be in unicast, multicast or broadcast mode. The network is based on a simple switch architecture coupled with ease of expansion of the network with tie-lines with minimum software overhead on the switch make this network both highly flexible and reconfigurable in case of link breakage. The network has built in redundancy and fault tolerance. The network provides simple routing and network management because individual crossbar switches are electronically programmed under software that are constantly polled and communicated amongst the various matrix switches on a collision free full duplex Ethernet network. The network provides an economically viable and affordable multimedia network architecture as compared to any competing LAN/MAN/WAN network such as Frame Relay, ATM, or standardized Fiber Channel. The invention permits on-the-fly reconfiguration of virtual routers by user commands that are time division multiplexed with continuous multi-media data on a single bit serial data. This interconnectivity between a plurality of matrices enables individual users to independently create virtual router modes. Further, the present invention is useful in conjunction with the self-routing transfer of continuous data where no preexisting connection exists.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. Accordingly, it will be appreciated by those skilled in the art that, within the scope of the appended claims, the invention may be practiced otherwise than as specifically described herein.

Moreover, the individual components need not be assembled in the disclosed configuration, but could be assembled in virtually any configuration, which cooperate so as to provide a metropolitan area network. Further, although the routing switchers and time division multiplexers are described herein as physically separate modules, it will be manifest that these components may be integrated into the apparatus with which they are associated. Furthermore, all the disclosed elements and features of each disclosed embodiment can be combined with, or substituted for, the disclosed elements and features of every other disclosed embodiment except where such elements or features are mutually exclusive.

It is intended that the appended claims cover all such additions, modifications and rearrangements. Expedient embodiments of the present invention are differentiated by the appended subclaims.

REFERENCES

1. *The Electrical Engineering Handbook*, CRC Press (Richard C. Dorf et al. eds., 1993).
2. *The Mathematics of Physics and Chemistry*, Robert E. Krieger Publishing Corporation (H. Margenau and G. M. Murphy, 1976).

What is claimed is:

1. A multi-format adaptive plesiochronous network, comprising:
    a first router;
    a topology adaptive tie-line having a plurality of full duplex dedicated router interconnects connected to said first router, the topology adaptive tie-line transmitting at least non-packetized latency free continuous data;
    a second router connected to said plurality of full duplex dedicated router interconnects; and
    a user connected to said first router with a full duplex loop;
    I) a signal transmitting system for transmittal of a serialized signal including (A) latency free continuous data, and (B) at least one member selected from the group consisting of bursty data and packetized data, said signal transmitting system including a multiplexer and a timing control block; and
    II) a signal receiving system for reception of said signal without disrupting the laminarity of the latency free continuous data, said signal receiving system including a demultiplexer and a seguence detector,
    so as to establish full duplex communications between the user and another user on one of said plurality of full duplex dedicated router interconnects;
    wherein (I) said multiplexer includes a clock multiplier, an encoder, a framer and a parallel to serial convertor, and (II) the user includes an analog-to digital converter, a first-in-first-out memory buffer having an almost empty flag, a digital to analog convertor, a counter register and a latch.

2. An apparatus, comprising a network, said network including:
    a first router;
    a tie-line having a plurality of full duplex dedicated router interconnects connected to said first router, the tie line transmitting at least non-packetized latency free continuous data;
    a second router connected to said plurality of full duplex dedicated router interconnects; and
    a user connected to said first router with a full duplex loop;
    I) a signal transmitting system for transmittal of a serialized signal including (A) latency free continuous data, and (B) at least one member selected from the group consisting of bursty data and packetized data, said signal transmitting system including a multiplexer and a timing control block; and
    II) a signal receiving system for reception of said signal without disrupting the laminarity of the latency free continuous data, said signal receiving system including a demultiplexer and a seguence detector,
    so as to establish full duplex communications between the user and another user on one of said plurality of full duplex dedicated router interconnects;

wherein (I) said multiplexer includes a clock multiplier, an encoder, a framer and a parallel to serial convertor, and (II) the user includes an analog-to digital converter, a first-in-first-out memory buffer having an almost empty flag, a digital to analog convertor, a counter register and a latch.

3. A multi-format adaptive plesiochronous network, comprising:
   a first router;
   a topology adaptive tie-line having a plurality of full duplex dedicated router interconnects connected to said first router, the topology adaptive tie-line transmitting at least latency free continuous data, the topology adaptive tie-line also transmitting router reconfiguration data multiplexed with the latency free continuous data;
   a second router connected to said plurality of full duplex dedicated router interconnects; and
   a user connected to said first router with a full duplex loop;
   I) a signal transmitting system for transmittal of a serialized signal including (A) latency free continuous data, and (B) at least one member selected from the group consisting of bursty data and packetized data, said signal transmitting system including a multiplexer and a timing control block; and
   II) a signal receiving system for reception of said signal without disrupting the laminarity of the latency free continuous data, said signal receiving system including a demultiplexer and a seguence detector,
   so as to establish full duplex communications between the user and another user on one of said plurality of full duplex dedicated router interconnects;
   wherein (I) said multiplexer includes a clock multiplier, an encoder, a framer and a parallel to serial convertor, and (II) both the user and the another user include an analog-to digital converter, a first-in-first-out memory buffer having an almost empty flag, a digital to analog convertor, a counter register and a latch.

4. An apparatus, comprising a network, said network including:
   a first router;
   a tie-line having a plurality of full duplex dedicated router interconnects connected to said first router, the tie line transmitting router reconfiguration data multiplexed with latency free continuous data;
   a second router connected to said plurality of full duplex dedicated router interconnects; and
   a user connected to said first router with a full duplex loop;
   I) a signal transmitting system for transmittal of a serialized signal including (A) latency free continuous data, and (B) at least one member selected from the group consisting of bursty data and packetized data, said signal transmitting system including a multiplexer and a timing control block; and
   II) a signal receiving system for reception of said signal without disrupting the laminarity of the latency free continuous data, said signal receiving system including a demultiplexer and a seguence detector,
   so as to establish full duplex communications between the user and another user on one of said plurality of full duplex dedicated router interconnects;
   wherein (I) said multiplexer includes a clock multiplier, an encoder, a framer and a parallel to serial convertor, and (II) the user includes an analog-to digital converter, a first-in-first-out memory buffer having an almost empty flag, a digital to analog convertor, a counter register and a latch.

* * * * *